United States Patent
Dybala et al.

(10) Patent No.: US 7,657,474 B1
(45) Date of Patent: Feb. 2, 2010

(54) METHOD AND SYSTEM FOR THE DETECTION OF TRADING COMPLIANCE VIOLATIONS FOR FIXED INCOME SECURITIES

(75) Inventors: Tomasz Grzegorz Dybala, Fairfax, VA (US); William John Nosal, Herndon, VA (US); Patrick Kiplinger Hyde, Falls Church, VA (US); Steven Kirk Donoho, Chantilly, VA (US)

(73) Assignee: Mantas, Inc., Herndon, VA (US)

( * ) Notice: Subject to any disclaimer, the term of this patent is extended or adjusted under 35 U.S.C. 154(b) by 560 days.

(21) Appl. No.: 10/983,310

(22) Filed: Nov. 4, 2004

Related U.S. Application Data

(63) Continuation-in-part of application No. 10/379,425, filed on Mar. 4, 2003.

(60) Provisional application No. 60/517,336, filed on Nov. 4, 2003.

(51) Int. Cl.
G06Q 40/00 (2006.01)

(52) U.S. Cl. .......................................... 705/35; 705/37

(58) Field of Classification Search .................. 705/35, 705/37, 1, 36, 34, 26, 7, 9, 44; 707/10, 5, 707/4, 6, 101, 200; 709/246, 227; 455/418, 455/452
See application file for complete search history.

(56) References Cited

U.S. PATENT DOCUMENTS 5,819,226 A    10/1998    Gopinathan et al.
5,930,764 A    7/1999    Melchione et al.
6,119,103 A    9/2000    Basch et al.
6,192,347 B1 *    2/2001    Graff ........................ 705/36 R
6,298,348 B1    10/2001    Eldering
6,470,335 B1    10/2002    Marusak
6,920,432 B1 *    7/2005    Carey ........................ 705/36 R
2002/0019791 A1    2/2002    Goss et al.
2002/0059107 A1    5/2002    Reich et al.
2002/0073018 A1    6/2002    Mulinder et al.
2002/0082979 A1    6/2002    Sands et al.
2002/0133721 A1    9/2002    Adjaoute
2002/0138461 A1    9/2002    Sinclair et al.
2003/0033228 A1 *    2/2003    Bosworth-Davies et al. .. 705/35
2003/0084053 A1 *    5/2003    Govrin et al. ............... 707/100

FOREIGN PATENT DOCUMENTS

EP              1 308 855 A2    5/2003

(Continued)

OTHER PUBLICATIONS

Goldberg-H-G and Wong-R-W-H. "Restructuring transactional datafor link analysis in the FinCEN AI system.".*

(Continued)

*Primary Examiner*—Mary Cheung
*Assistant Examiner*—John H Holly
(74) *Attorney, Agent, or Firm*—Pepper Hamilton LLP

(57) ABSTRACT

A computer based method and system for advanced scenario based alert generation and processing is presented, with the specific ability to identify trading compliance violations in fixed income securities trading. Advanced scenarios that describe such trading compliance violations are specifically defined. By applying these scenarios to fixed income security transaction data from a variety of financial institutions, trading compliance violations can be detected on an automated basis.

26 Claims, 43 Drawing Sheets

FOREIGN PATENT DOCUMENTS

| WO | WO 98/59307 A1 | 12/1998 |
|---|---|---|
| WO | WO 00/58900 A1 | 10/2000 |
| WO | WO 00/62210 A1 | 10/2000 |
| WO | WO 00/63824 A2 | 10/2000 |
| WO | WO 01/48626 A2 | 7/2001 |
| WO | WO 01/95225 A1 | 12/2001 |
| WO | WO 02/25537 A1 | 3/2002 |
| WO | WO 02/27423 A2 | 4/2002 |
| WO | WO 02/44986 A2 | 6/2002 |
| WO | WO 02/062437 A2 | 8/2002 |
| WO | WO 02/075476 A2 | 9/2002 |

OTHER PUBLICATIONS

Kirkland et al. "The NASD Regulation Advanced-Detection System (ADS)", AI Magazine vol. 20 No. 1, 1999, American Association for Artificial Intelligence.*

Mantas, Inc., The Mantas Advantage, http://www.mantas.com/website/solutions/solutions_advantage.html, Dec. 3, 2001.

Mantas, Inc., What is Knowledge Discovery?, http://www.mantas.com/website/solutions/solutions_whatis.html, Dec. 3, 2001.

Mantas, Inc., Products, http://www.mantas.com/website/solutions/solutions_products.html, Dec. 3, 2001.

Mantas, Inc., Mantas Best Execution, http://www.mantas.com/website/solutions/solutions_best_execut.html, Dec. 3, 2001.

Mantas, Inc., The Mantas Equities Trading Compliance, http://www.mantas.com/website/solutions/solutions_equ_trd_comp.html, Dec. 3, 2001.

Mantas, Inc., Fraud and Money Laundering Detection for Securities Firms, http://www.mantas.com/website/solutions/solutions_fraud_ml_sec_firms.html, Dec. 3, 2001.

Mantas, Inc., Fraud and Money Laundering Detection for Banks, http://www.mantas.com/website/solutions/solutions_fraud_ml_banks.html, Dec. 3, 2001.

Affidavit of Steven Kirk Donoho, Nov. 14, 2003.

* cited by examiner

1600 ~ EXAMPLE #1:

FIND AAA IN THE FOLLOWING STREAM OF EVENTS: ~ 1612
ABCBACBCAAABCBACBBCCBAAAABBC ~ 1616
              ‾‾‾ ‾‾‾‾
              1620  1624
                    ‾‾‾‾
                    1628

1604 ~ EXAMPLE #2:

AB*A MEANS "FIND AN A FOLLOWED BY ZERO OR MORE B'S FOLLOWED BY AN A": ~ 1632
CADAACDBADADABABBBBBACDABDABDCABDB ~ 1636
‾‾   ‾‾‾‾‾‾‾‾  ‾‾
1640  1644     1648

1608 ~ EXAMPLE #3:

A(BC)+ MEANS "FIND AN A FOLLOWED BY ONE OR MORE BC PAIRS": ~ 1652
DCBCABDCABCBCBCBCBBD ~ 1656
‾‾‾ ‾‾‾‾‾  ‾‾‾‾‾‾‾‾‾
1660 1664    1668
     1672
             1676

FIG. 16

| Parameter Name | Description | Value Default (Min, Max) |
|---|---|---|
| Included Product Categories | The list of codes describing product categories covered by the scenario. Allowable values:<br>D – debt instruments     F – futures<br>R – rights     M – Miscellaneous/Other<br>O – options | D |
| Included Product Types | The list of codes describing product types within the selected product categories covered by the scenario. Allowable values are defined by the customer, for instance<br>CORP – corporate debt instruments<br>MUNI – municipal debt instruments<br>GOV – government debt instruments | CORP |
| Included Product Sub-types | The list of codes describing product sub-types within the selected product categories and types covered by the scenario. Allowable values are defined by the customer, for instance<br>BOND – bond. | BOND |
| Included Currency Codes | The list of product issuing currency codes covered by the scenario. Allowable values are defined by FDIS, for instance USD. | USD |
| Included Trade Desk Ids | The list of trading desk Ids covered by the scenario. Allowable values are defined by the customer. | |
| Excluded Trading Account Types | The list of firm proprietary account types excluded from the scenario. Allowable values are defined by FDIS:<br>FT – firm proprietary trading account<br>FA – firm administrative account<br>FB – firm block facilitation account<br>FE – firm error/suspense account | FA |
| Excluded Opposite Party Types | The list of party types opposite to a trader excluded from the scenario. Allowable values are defined by FDIS:<br>CI – institutional customer     CR – retail customer<br>IB – inter-dealer-broker     RB – registered broker | IB, RB |
| Excluded Trade Purpose Types | The list of trade purpose codes excluded from the scenario. Allowable values are defined by FDIS:<br>REPO – repo trades     LOAN – stock loans<br>OTHER – other trade purposes | REPO |
| Max Current Day Trade Count | The number of executions found on the current day cannot be greater than this threshold. | 5 (1, 100) |
| Max Look-back Period Trade Count | The number of executions found during the look-back period (excluding current day) may not be greater than this threshold. | 5 (1, 100) |
| Max Parking Percentage | The net amount exchanged during the look-back period must be within this percentage of the current day net amount exchanged. | 5% (1, 100) |
| Max Trading Day Count | Maximum number of days on which trading occurred between two parties in the given security during the look-back period. | 2 (1, 5) |
| Max Price Spread Percentage | The price spread percentage between the volume weighted average price for the current day buys and sells and the volume weighted average price for the look-back period buys and sells should not exceed this threshold. | 5% (0, 100) |
| Min Net Amount Exchanged | The net amount exchanged between the two parties on the current day must exceed this threshold to be considered significant. | 20000 (0, 100000) |
| Max Rerun Range | A threshold limiting how far back in time the scenario will allow corrected or As-Of trades to be processed. | 10 (1, 30) |

FIG. 22

| Display Name | Description |
| --- | --- |
| Prty Opp Trdr Acct | Account number of the counter party |
| Tot Val Parked | Net amount exchanged during current day |
| % Delta Amt | Percentage difference in principal between the net principal on current day and the rest of the look back period (in the opposite direction) |

FIG. 23

| Parameter Name | Description | Value Default (Min, Max) |
|---|---|---|
| Included Product Categories | The list of codes describing product categories covered by the scenario. Allowable values:<br>D – debt instruments      F – futures<br>R – rights      M – Miscellaneous/Other<br>O – options | D |
| Included Product Types | The list of codes describing product types within the selected product categories covered by the scenario. Allowable values are defined by the customer, for instance<br>CORP – corporate debt instruments<br>MUNI – municipal debt instruments<br>GOV – government debt instruments | CORP |
| Included Product Sub-types | The list of codes describing product sub-types within the selected product categories and types covered by the scenario. Allowable values are defined by the customer, for instance<br>BOND – bond. | BOND |
| Included Currency Codes | The list of product issuing currency codes covered by the scenario. Allowable values are defined by FDIS, for instance USD. | USD |
| Included Trade Desk Ids | The list of trading desk Ids covered by the scenario. Allowable values are defined by the customer. | |
| Excluded Trading Account Types | The list of firm proprietary account types excluded from the scenario. Allowable values are defined by FDIS:<br>FT – firm proprietary trading account<br>FA – firm administrative account<br>FB – firm block facilitation account<br>FE – firm error/suspense account | FA |
| Excluded Opposite Party Types | The list of party types opposite to a trader excluded from the scenario. Allowable values are defined by FDIS:<br>CI – institutional customer      CR – retail customer<br>IB – inter-dealer-broker      RB – registered broker | IB, RB |
| Excluded Trade Purpose Types | The list of trade purpose codes excluded from the scenario. Allowable values are defined by FDIS:<br>REPO – repo trades      LOAN – stock loans<br>OTHER – other trade purposes | REPO |
| Max Current Day Trade Count | The number of executions found on the current day cannot be greater than this threshold. | 5 (1, 100) |
| Max Current Day Trade Count | The number of executions found on the current day cannot be greater than this threshold. | 5 (1, 1000) |
| Max Parking Percentage | The net amount bought must be within this percentage of the net amount sold. | 5 (1, 100) |
| Max Price Spread Percentage | The price spread percentage of net buys to net sells should not exceed this threshold. | 5% (0, 100%) |
| Min Amount Sold | The sum of all sell trade amounts on the current day must exceed this threshold to be considered significant. | 20,000 (0, 1 bln) |

FIG. 24

| Display Name | Description |
|---|---|
| Prty Opp Trdr Acct | Account number of the counter party |
| Tot Val Parked | Sum of all sell trades on the current day |
| % Delta Amt | Percentage difference in principal between the sum of all sells and the sum of all buys on the current day. |

FIG. 25

| Parameter Name | Description | Value Default (Min, Max) |
|---|---|---|
| Included Product Categories | The list of codes describing product categories covered by the scenario. Allowable values:<br>D – debt instruments     F – futures<br>R – rights     M – Miscellaneous/Other<br>O – options | D |
| Included Product Types | The list of codes describing product types within the selected product categories covered by the scenario. Allowable values are defined by the customer, for instance<br>CORP – corporate debt instruments<br>MUNI – municipal debt instruments<br>GOV – government debt instruments | CORP |
| Included Product Sub-types | The list of codes describing product sub-types within the selected product categories and types covered by the scenario. Allowable values are defined by the customer, for instance<br>BOND – bond. | BOND |
| Included Currency Codes | The list of product issuing currency codes covered by the scenario. Allowable values are defined by FDIS, for instance USD. | USD |
| Included Trade Desk Ids | The list of trading desk Ids covered by the scenario. Allowable values are defined by the customer. | |
| Excluded Trading Account Types | The list of firm proprietary account types excluded from the scenario. Allowable values are defined by FDIS:<br>FT – firm proprietary trading account<br>FA – firm administrative account<br>FB – firm block facilitation account<br>FE – firm error/suspense account | FA |
| Excluded Opposite Party Types | The list of party types opposite to a trader excluded from the scenario. Allowable values are defined by FDIS:<br>CI – institutional customer     CR – retail customer<br>IB – inter-dealer-broker     RB – registered broker | IB, RB |
| Excluded Trade Purpose Types | The list of trade purpose codes excluded from the scenario. Allowable values are defined by FDIS:<br>REPO – repo trades     LOAN – stock loans<br>OTHER – other trade purposes | REPO |
| Min Principal Amount | The minimum Principal Amount on the trade to be covered by the scenario. | 1000 |
| Max Time Difference | The maximum number of hours between the two wash trades. The parameter allows to set fractions of hours. | 10 |
| Max Principal Amount Spread | The maximum difference in principals between the compared wash trades | 0 |
| Max Trade Count | The maximum number of trades occurring between a trader and a customer account. | 6 |
| Inter Trades Flag | The flag indicating if trades executed between the trader and a customer account between the identified wash trades should cause that an alert is not generated.<br>Y – generate an alert,<br>N – do not generate an alert | Y |

FIG. 26

| Display Name | Description |
|---|---|
| Opposite Prty Acct | The identifier of an opposite party (customer, broker) account that was involved in wash trades identified in the alert. |
| Mutual Trade Ct | The total number of trades between a trader and an opposite part account identified in the alert. |
| Prin Amt Spread | The principal amount spread between the pair of trades identified as wash trades. If there are multiple pairs of wash trades, then the minimum spread between principal amounts is displayed. |
| Time Diff | The time difference between the pair of trades identified as the wash trades. If there are multiple pairs of wash trades, then the minimum time difference is displayed. |

FIG. 27

| Parameter Name | Description | Value Default (Min, Max) |
|---|---|---|
| Included Product Categories | The list of codes describing product categories covered by the scenario. Allowable values:<br>D – debt instruments      F – futures<br>R – rights      M – Miscellaneous/Other<br>O – options | D |
| Included Product Types | The list of codes describing product types within the selected product categories covered by the scenario. Allowable values are defined by the customer, for instance<br>CORP – corporate debt instruments<br>MUNI – municipal debt instruments<br>GOV – government debt instruments | CORP |
| Included Product Sub-types | The list of codes describing product sub-types within the selected product categories and types covered by the scenario. Allowable values are defined by the customer, for instance<br>BOND – bond. | BOND |
| Included Currency Codes | The list of product issuing currency codes covered by the scenario. Allowable values are defined by FDIS, for instance USD. | USD |
| Included Trade Desk Ids | The list of trading desk Ids covered by the scenario. Allowable values are defined by the customer. | |
| Excluded Trading Account Types | The list of firm proprietary account types excluded from the scenario. Allowable values are defined by FDIS:<br>FT – firm proprietary trading account<br>FA – firm administrative account<br>FB – firm block facilitation account<br>FE – firm error/suspense account | FA |
| Excluded Opposite Party Types | The list of party types opposite to a trader excluded from the scenario. Allowable values are defined by FDIS:<br>CI – institutional customer      CR – retail customer<br>IB – inter-dealer-broker      RB – registered broker | IB, RB |
| Excluded Trade Purpose Types | The list of trade purpose codes excluded from the scenario. Allowable values are defined by FDIS:<br>REPO – repo trades      LOAN – stock loans<br>OTHER – other trade purposes | REPO |
| Low Quantity Delta Percentage | The threshold that is compared to the difference of the unit quantity between the two trades. If the difference is < to this value, compare the spread % to the Low Price Spread Pct. | 1% (1%, 100000%) |
| Medium Quantity Delta Percentage | The threshold that is compared to the difference of the unit quantities between the two trades. If the difference is <= this value, but >= than the Low Quantity Delta Percentage, compare the spread % to the Medium Price Spread Pct. | 20% (1%, 100000%) |
| High Quantity Delta Percentage | The threshold that is compared to the difference of the unit quantities between the two trades. If the difference is <= this value, but > than the Medium Quantity Delta Percentage, compare the spread % to the High Price Spread Pct. If the High Quantity Delta Percentage is exceeded, the comparison is not made and no alert is generated. | 200% (1%, 100000%) |
| Trade Time Difference In Minutes | The difference between the trade times for the compared transactions. If the time difference of the two trades is < this parameter, the spread percentages for comparison are the 'near time' spread percentages. If the difference is >= to this time, then the spread percentage is compared to the 'longer time' | 5min (0, 1440 min) |

FIG. 28A

| | | |
|---|---|---|
| Coverage | This parameter defines which trades should be covered by the scenario:<br>1 – 'near time' window only.<br>2 – 'longer time' window only<br>3 – both windows<br>The 'short time' window only covers pairs of trades that occur in a period of time less than the time period captured in the *Trade Time Difference In Minutes* threshold. The 'longer time' window covers only pairs that occur in the time period greater than or equal to the *Trade Time Difference In Minutes* threshold. | 3 (1, 3) |
| Exclude Riskless Principal Transactions | This parameter allows control over the inclusion/exclusion of RPT trades.<br>Y – exclude RPT trades<br>N – include RPT trades | Y (N, Y) |
| Exclude First Trade Comparison | This parameter defines whether the first trade (or set of trades) needs to be compared to a reference price prices or if the pattern should skip that comparison.<br>Y – exclude the first trade(s) from a reference price comparison<br>N – compare the first trade(s) to the appropriate reference price. | Y (N, Y) |
| Near Time Low Spread Percentage | The spread percentage allowed by the firm for this product type when the quantity delta is less than the *Low Quantity Delta Percentage* threshold value and the time difference of the two trades is less than the *Trade Time Difference In Minutes* threshold value | 1% |
| Near Time Medium Spread Percentage | The spread percentage allowed by the firm for this product type when the quantity delta is greater than or equal to the *Low Quantity Delta Percentage* threshold value but less than or equal to the *Medium Quantity Delta Percentage* threshold value and the time difference of the two trades is less than the *Trade Time Difference In Minutes* value. | 2% |
| Near Time High Spread Percentage | The spread percentage allowed by the firm for this product type when the quantity delta is greater than the *Medium Quantity Delta Percentage* threshold value but less than or equal to the *High Quantity Delta Percentage* threshold value and the time difference of the two trades is less than the *Trade Time Difference In Minutes* threshold value. | 3% |
| Longer Time Low Spread Percentage | The spread percentage allowed by the firm for this product type when the quantity delta is less than the *Low Quantity Delta Percentage* threshold value and the time difference of the two trades is greater than or equal to the *Trade Time Difference In Minutes* threshold value. | 2% |
| Longer Time Medium Spread Percentage | The spread percentage allowed by the firm for this product type when the quantity delta is greater than or equal to the *Low Quantity Delta Percentage* threshold value but less than or equal to the *Med Quantity Delta Percentage* threshold value and the time difference of the two trades is greater than or equal to the *Trade Time Difference In Minutes* threshold value. | 4% |
| Longer Time High Spread Percentage | The spread percentage allowed by the firm for this product type when the quantity delta is greater than the *Medium Quantity Delta Percentage* threshold value but less than or equal to the *High Quantity Delta Percentage* threshold value and the time difference of the two trades is greater than or equal to the *Trade Time Difference In Minutes* threshold value. | 6% |

FIG. 28B

| Display Name | Description |
|---|---|
| Maximum Price Spread % | The price spread between the pair of trades identified. If there are multiple pairs of trades, then the maximum spread between prices is displayed. |
| Number of Markups | The number of Markups executed by this trader in a given security. |
| Number of Markdowns | The number of Markdowns executed by this trader in a given security. |

FIG. 29

| Parameter Name | Description | Value Default (Min, Max) |
|---|---|---|
| Included Product Categories | The list of codes describing product categories covered by the scenario. Allowable values:<br>D – debt instruments    F – futures<br>R – rights    M – Miscellaneous/Other<br>O – options | D |
| Included Product Types | The list of codes describing product types within the selected product categories covered by the scenario. Allowable values are defined by the customer, for instance<br>CORP – corporate debt instruments<br>MUNI – municipal debt instruments<br>GOV – government debt instruments | CORP |
| Included Product Sub-types | The list of codes describing product sub-types within the selected product categories and types covered by the scenario. Allowable values are defined by the customer, for instance<br>BOND – bond. | BOND |
| Included Currency Codes | The list of product issuing currency codes covered by the scenario. Allowable values are defined by FDIS, for instance USD. | USD |
| Included Trade Desk Ids | The list of trading desk Ids covered by the scenario. Allowable values are defined by the customer. | |
| Excluded Trading Account Types | The list of firm proprietary account types excluded from the scenario. Allowable values are defined by FDIS:<br>FT – firm proprietary trading account<br>FA – firm administrative account<br>FB – firm block facilitation account<br>FE – firm error/suspense account | FA |
| Excluded Opposite Party Types | The list of party types opposite to a trader excluded from the scenario. Allowable values are defined by FDIS:<br>CI – institutional customer    CR – retail customer<br>IB – inter-dealer-broker    RB – registered broker | IB, RB |
| Excluded Trade Purpose Types | The list of trade purpose codes excluded from the scenario. Allowable values are defined by FDIS:<br>REPO – repo trades    LOAN – stock loans<br>OTHER – other trade purposes | REPO |
| Low Quantity Delta Percentage | The threshold that is compared to the difference of the unit quantity between the two trades. If the difference is < to this value, compare the spread % to the Low Price Spread Pct. | 1% (1%, 100000%) |
| Medium Quantity Delta Percentage | The threshold that is compared to the difference of the unit quantities between the two trades. If the difference is <= this value, but >= than the Low Quantity Delta Percentage, compare the spread % to the Medium Price Spread Pct. | 20% (1%, 100000%) |
| High Quantity Delta Percentage | The threshold that is compared to the difference of the unit quantities between the two trades. If the difference is <= this value, but > than the Medium Quantity Delta Percentage, compare the spread % to the High Price Spread Pct. If the High Quantity Delta Percentage is exceeded, the comparison is not made and no alert is generated. | 200% (1%, 100000%) |
| Low Spread Percentage | The spread percentage allowed by the firm for this product type when the quantity delta is less than the *Low Quantity Delta Percentage* value. | 0% (0%, 100%) |
| Medium Spread Percentage | The spread percentage allowed by the firm for this product type when the quantity delta exceeds or equals the *Low Quantity Delta Percentage* value but is less than or equals the *Med Quantity Delta Percentage* value. | 0% (0%, 100%) |
| High Spread Percentage | The spread percentage allowed by the firm for this product type when the quantity delta exceeds the *Medium Quantity Delta Percentage* value but is less than or equals the *High Quantity Delta Percentage* value. | 0% (0%, 100%) |

FIG. 30

| Display Name | Description |
|---|---|
| Max Price Spread % | The price spread between the pair of trades identified. If there are multiple pairs of trades, then the maximum spread between prices is displayed. |
| Num of Markups | The number of Markups executed by this trader in a given security. |
| Num of Markdowns | The number of Markdowns executed by this trader in a given security. |

FIG. 31

| Parameter Name | Description | Value Default (Min, Max) |
|---|---|---|
| Included Product Categories | The list of codes describing product categories covered by the scenario. Allowable values:<br>D – debt instruments   F – futures<br>R – rights   M – Miscellaneous/Other<br>O – options | D |
| Included Product Types | The list of codes describing product types within the selected product categories covered by the scenario. Allowable values are defined by the customer, for instance<br>CORP – corporate debt instruments<br>MUNI – municipal debt instruments<br>GOV – government debt instruments | CORP |
| Included Product Sub-types | The list of codes describing product sub-types within the selected product categories and types covered by the scenario. Allowable values are defined by the customer, for instance<br>BOND – bond. | BOND |
| Included Currency Codes | The list of product issuing currency codes covered by the scenario. Allowable values are defined by FDIS, for instance USD. | USD |
| Included Trade Desk Ids | The list of trading desk Ids covered by the scenario. Allowable values are defined by the customer. | |
| Excluded Trading Account Types | The list of firm proprietary account types excluded from the scenario. Allowable values are defined by FDIS:<br>FT – firm proprietary trading account<br>FA – firm administrative account<br>FB – firm block facilitation account<br>FE – firm error/suspense account | FA |
| Excluded Opposite Party Types | The list of party types opposite to a trader excluded from the scenario. Allowable values are defined by FDIS:<br>CI – institutional customer   CR – retail customer<br>IB – inter-dealer-broker   RB – registered broker | IB, RB |
| Excluded Trade Purpose Types | The list of trade purpose codes excluded from the scenario. Allowable values are defined by FDIS:<br>REPO – repo trades   LOAN – stock loans<br>OTHER – other trade purposes | REPO |
| Correction Min Amount | The minimum amount of economic impact due to the correction at or above which an alert is generated. | 100,000 (1000, 1 bln) |
| Market Preference Time Window | Within this time window, market prices are preferred even if a firm price is closer in time. | 1 hour |
| Reference Price Relevance Time Window | Outside this time window, the reference price is irrelevant and should be ignored. | 7 days |

FIG. 32

| Display Name | Description |
|---|---|
| Counterparty Acct | The identifier of a customer account identified in the alert. |
| Correction Type | A code that represents one of the following changes:<br>PRQ - Price or quantity change.<br>ACCT - Customer account ID change.<br>B/S - Buy-sell indicator change.<br>SEC - Security ID change.<br>DATE - Trade date change.<br>MANY – more than one change |
| Correction Significance Amt | This amount represents an economic impact of the correction measured as a monetary value represented in the security issuing currency |
| Reference Price 1 | The reference price at the time of either the original trade or the previous correction. |
| Reference Price 2 | The reference price at the time of the last correction. |
| Trade-Correction Time Delta | The time difference between the last correction and either the previous correction or the original trade. |

FIG. 33

| Parameter Name | Description | Focus | Value Default (Min, Max) |
|---|---|---|---|
| Included Product Categories | The list of codes describing product categories covered by the scenario. Allowable values:<br>D – debt instruments     F – futures<br>R – rights     M – Miscellaneous/Other<br>O – options | TR<br><br>AC | D |
| Included Product Types | The list of codes describing product types within the selected product categories covered by the scenario.<br>Allowable values are defined by the customer, for instance<br>CORP – corporate debt instruments<br>MUNI – municipal debt instruments<br>GOV – government debt instruments | TR<br><br>AC | CORP |
| Included Product Sub-types | The list of codes describing product sub-types within the selected product categories and types covered by the scenario. Allowable values are defined by the customer, for instance<br>BOND – bond. | TR<br><br>AC | BOND |
| Included Currency Codes | The list of product issuing currency codes covered by the scenario. Allowable values are defined by FDIS, for instance USD. | TR<br><br>AC | USD |
| Included Trade Desk Ids | The list of trading desk Ids covered by the scenario. Allowable values are defined by the customer. | TR<br><br>AC | |
| Excluded Trading Account Types | The list of firm proprietary account types excluded from the scenario. Allowable values are defined by FDIS:<br>FT – firm proprietary trading account<br>FA – firm administrative account<br>FB – firm block facilitation account<br>FE – firm error/suspense account | TR<br><br>AC | FA |
| Excluded Opposite Party Types | The list of party types opposite to a trader excluded from the scenario. Allowable values are defined by FDIS:<br>CI – institutional customer     CR – retail customer<br>IB – inter-dealer-broker     RB – registered broker | TR<br><br>AC | IB, RB |
| Excluded Trade Purpose Types | The list of trade purpose codes excluded from the scenario. Allowable values are defined by FDIS:<br>REPO – repo trades     LOAN – stock loans<br>OTHER – other trade purposes | TR<br><br>AC | REPO |
| Min Principal Amount | The Principal Amount at or above which a trade can be considered by the scenario. | TR<br><br>AC | 100,000 (0, 1 bln) |
| Min Number of Cancels | The minimum number of cancelled trades required to generate an alert. The cancellation types are identified in the scenario logic. | TR<br><br>AC | 5 (1, 100,000) |
| Min Percent of Cancels | The minimum percentage of cancelled trades required to generate an alert. The covered cancellation types are identified in the scenario logic. | TR<br><br>AC | 25% (1, 100%) |

FIG. 34

| Display Name | Description | Focus |
|---|---|---|
| % Cancellations | The percentage of trades occurring during the look-back period that had been cancelled. | TR & AC |
| Trade Ct | The total number of trades performed during the look-back period. | TR & AC |
| Accounts Involved | The distinct number of accounts involved in the corrections identified in the alert. | TR |
| Traders Involved | The distinct number of traders involved in the shortened/extended settlements identified in the alert. | AC |

FIG. 35

| Parameter Name | Description | Focus | Value Default (Min, Max) |
|---|---|---|---|
| Included Product Categories | The list of codes describing product categories covered by the scenario. Allowable values:<br>D – debt instruments     F – futures<br>R – rights     M – Miscellaneous/Other<br>O – options | TR<br><br>AC | D |
| Included Product Types | The list of codes describing product types within the selected product categories covered by the scenario. Allowable values are defined by the customer, for instance<br>CORP – corporate debt instruments<br>MUNI – municipal debt instruments<br>GOV – government debt instruments | TR<br><br>AC | CORP |
| Included Product Sub-types | The list of codes describing product sub-types within the selected product categories and types covered by the scenario. Allowable values are defined by the customer, for instance<br>BOND – bond. | TR<br><br>AC | BOND |
| Included Currency Codes | The list of product issuing currency codes covered by the scenario. Allowable values are defined by FDIS, for instance USD. | TR<br><br>AC | USD |
| Included Trade Desk Ids | The list of trading desk Ids covered by the scenario. Allowable values are defined by the customer. | TR<br><br>AC | |
| Excluded Trading Account Types | The list of firm proprietary account types excluded from the scenario. Allowable values are defined by FDIS:<br>FT – firm proprietary trading account<br>FA – firm administrative account<br>FB – firm block facilitation account<br>FE – firm error/suspense account | TR<br><br>AC | FA |
| Excluded Opposite Party Types | The list of party types opposite to a trader excluded from the scenario. Allowable values are defined by FDIS:<br>CI – institutional customer    CR – retail customer<br>IB – inter-dealer-broker    RB – registered broker | TR<br><br>AC | IB, RB |
| Excluded Trade Purpose Types | The list of trade purpose codes excluded from the scenario. Allowable values are defined by FDIS:<br>REPO – repo trades    LOAN – stock loans<br>OTHER – other trade purposes | TR<br><br>AC | REPO |
| Min Principal Amount | The Principal Amount at or above which a trade can be considered by the scenario. | TR<br><br>AC | 100,000 (0, 1 bln) |
| Min Number of Corrects | The minimum number of corrected trades required to generate an alert. The covered correction types are identified in the scenario logic. | TR<br><br>AC | 5 (1, 100,000) |
| Min Percent of Corrects | The minimum percentage of corrected trades required to generate an alert. The covered correction types are identified in the scenario logic. | TR<br><br>AC | 25% (1, 100%) |

FIG. 36

| Display Name | Description | Focus |
|---|---|---|
| % Corrections | The percentage of trades occurring during the look-back period that had corrections. | TR & AC |
| Trade Ct | The total number of trades performed during the look-back period. | TR & AC |
| Accounts Involved | The distinct number of accounts involved in the corrections identified in the alert. | TR |
| Traders Involved | The distinct number of traders involved in the shortened/extended settlements identified in the alert. | AC |

FIG. 37

| Parameter Name | Description | Focus | Value Default (Min, Max) |
|---|---|---|---|
| Included Product Categories | The list of codes describing product categories covered by the scenario. Allowable values:<br>D – debt instruments    F – futures<br>R – rights    M – Miscellaneous/Other<br>O – options | TR<br><br>AC | D |
| Included Product Types | The list of codes describing product types within the selected product categories covered by the scenario. Allowable values are defined by the customer, for instance<br>CORP – corporate debt instruments<br>MUNI – municipal debt instruments<br>GOV – government debt instruments | TR<br><br>AC | CORP |
| Included Product Sub-types | The list of codes describing product sub-types within the selected product categories and types covered by the scenario. Allowable values are defined by the customer, for instance<br>BOND – bond. | TR<br><br>AC | BOND |
| Included Currency Codes | The list of product issuing currency codes covered by the scenario. Allowable values are defined by FDIS, for instance USD. | TR<br><br>AC | USD |
| Included Trade Desk Ids | The list of trading desk Ids covered by the scenario. Allowable values are defined by the customer. | TR<br><br>AC | |
| Excluded Trading Account Types | The list of firm proprietary account types excluded from the scenario. Allowable values are defined by FDIS:<br>FT – firm proprietary trading account<br>FA – firm administrative account<br>FB – firm block facilitation account<br>FE – firm error/suspense account | TR<br><br>AC | FA |
| Excluded Opposite Party Types | The list of party types opposite to a trader excluded from the scenario. Allowable values are defined by FDIS:<br>CI – institutional customer    CR – retail customer<br>IB – inter-dealer-broker    RB – registered broker | TR<br><br>AC | IB, RB |
| Excluded Trade Purpose Types | The list of trade purpose codes excluded from the scenario. Allowable values are defined by FDIS:<br>REPO – repo trades    LOAN – stock loans<br>OTHER – other trade purposes | TR<br><br>AC | REPO |
| Included Issuing Country Codes | The list of issuing country codes covered by this scenario. Allowable values are defined in the FDIS, for instance US. | TR<br><br>AC | US |
| Included Settlement Types | The list of settlement type codes covered by this scenario. Allowable values are defined in the FDIS:<br>CSH – Cash; MGN – Margin; DVP - Delivery Versus Payment | TC<br><br>AC | 'CSH', 'MGN' |
| Desk Location Country Codes | The list of country codes for trading desks that are qualified for the Regulation T. | TR<br><br>AC | US |
| Reg T Days | The number of days allowed for a trade settlement. Trades that do not settle within this timeframe will result in an alert. | TR<br><br>AC | 5 (US Reg T+5) |

FIG. 38

| Display Name | Description | Focus |
|---|---|---|
| Reg T Violation Ct | The number of trades for the most recent day on which the settlement period exceeded the day count limit allowed by Regulation T | TR & AC |
| Trade Ct | The total number of trades performed by the focal entity on the most recent day for which Regulation T settlement requirements are applicable. | TR & AC |
| Accounts Involved | The distinct number of accounts involved in the shortened/extended settlements identified in the alert. | TR |
| Traders Involved | The distinct number of traders involved in the shortened/extended settlements identified in the alert. | AC |

FIG. 39

| Parameter Name | Description | Focus | Value Default (Min, Max) |
|---|---|---|---|
| Included Product Categories | The list of codes describing product categories covered by the scenario. Allowable values:<br>D – debt instruments  F – futures<br>R – rights  M – Miscellaneous/Other<br>O – options | TR<br><br>AC | D |
| Included Product Types | The list of codes describing product types within the selected product categories covered by the scenario. Allowable values are defined by the customer, for instance<br>CORP – corporate debt instruments<br>MUNI – municipal debt instruments<br>GOV – government debt instruments | TR<br><br>AC | CORP |
| Included Product Sub-types | The list of codes describing product sub-types within the selected product categories and types covered by the scenario. Allowable values are defined by the customer, for instance<br>BOND – bond. | TR<br><br>AC | BOND |
| Included Currency Codes | The list of product issuing currency codes covered by the scenario. Allowable values are defined by FDIS, for instance USD. | TR<br><br>AC | USD |
| Included Trade Desk Ids | The list of trading desk Ids covered by the scenario. Allowable values are defined by the customer. | TR<br><br>AC | |
| Excluded Trading Account Types | The list of firm proprietary account types excluded from the scenario. Allowable values are defined by FDIS:<br>FT – firm proprietary trading account<br>FA – firm administrative account<br>FB – firm block facilitation account<br>FE – firm error/suspense account | TR<br><br>AC | FA |
| Excluded Opposite Party Types | The list of party types opposite to a trader excluded from the scenario. Allowable values are defined by FDIS:<br>CI – institutional customer  CR – retail customer<br>IB – inter-dealer-broker  RB – registered broker | TR<br><br>AC | IB, RB |
| Excluded Trade Purpose Types | The list of trade purpose codes excluded from the scenario. Allowable values are defined by FDIS:<br>REPO – repo trades  LOAN – stock loans<br>OTHER – other trade purposes | TR<br><br>AC | REPO |
| Min S/E Settlements Ct | The minimum number of trades that must have shortened or extended settlements in order to qualify for an alert. | TR<br><br>AC | 5 (1, 10000) |
| Min S/E Settlements Pct | The minimum percentage of trades that must have shortened or extended settlements in order to qualify for an alert. | TR<br><br>AC | 10% (1%, 100%) |

FIG. 40

| Display Name | Description | Focus |
|---|---|---|
| % S/E Settlements | The percentage of trades occurring during the look-back period that had shortened or extended settlement periods. | TR & AC |
| Trade Ct | The total number of trades performed during the look-back period. | TR & AC |
| Accounts Involved | The distinct number of accounts involved in the shortened/extended settlements identified in the alert. | TR |
| Traders Involved | The distinct number of traders involved in the shortened/extended settlements identified in the alert. | AC |

FIG. 41

METHOD AND SYSTEM FOR THE DETECTION OF TRADING COMPLIANCE VIOLATIONS FOR FIXED INCOME SECURITIES

CLAIM OF PRIORITY

This application is a continuation-in-part of and claims priority to U.S. patent application Ser. No. 10/379,425, filed Mar. 4, 2003, entitled "Method and System for Advanced Scenario Based Alert Generation and Processing," which is incorporated herein by reference in its entirety. This application also claims priority to Provisional Application No. 60/517,336 filed Nov. 4, 2003

TECHNICAL FIELD

The present invention generally relates to computer-implemented behavior detection methods and systems. More particularly, the present invention relates to behavior detection methods and systems that determine whether data that is representative of behavior fits a pre-determined advanced scenario that represents a risk related to trading non-compliance for fixed income securities.

BACKGROUND

The invention of the computer and the development of the Internet has ushered in an era frequently referred to as the "Information Age" in which information is traded as a commodity and used in ways previously unimaginable. The low cost for storage and transmission of data means that all of the details of numerous daily transactions can be recorded and subsequently analyzed.

One area in which data is created and stored on a large scale is in the financial arena. The tremendous volume of financial transactions necessitates automated inspection of transaction records, both to comply with legal requirements and to identify probable illicit behavior. Simple monitoring of transfer activities is not sufficient and specific tests and combinations of tests can be required to provide an indication of the possibility of illicit or questionable activities.

Fixed income securities trading represents one portion of the financial transaction market in which trading violations may occur. The Securities and Exchange Commission (SEC) regulates the fixed income security trading market. However, the complexity of the transactions in the market makes it difficult for previous systems to identify violations that occur across a number of transactions. Trading compliance violations undermine the integrity of the fixed income security market. The identification of such violations would bolster investors' security in trading in the fixed income security trading market.

Currently no system exists for automatically detecting or providing alerts about potential violations in the fixed income securities market. No previous system could examine the vast amount of data created by the trading of fixed income securities every day to determine if a trading violation had occurred across multiple transactions.

What is needed is a system and method for automatically detecting trading compliance violations in the fixed income securities market.

A further need exists for a system and method for providing alerts about trading compliance violations in the fixed income securities market to ensure the integrity of the market.

SUMMARY

In an embodiment, the system and method presented allow for the automated detection of selected patterns of financial transactions (characterized as customer or trader behaviors and activities, and specific events or sequence of events) in order to identify trading compliance violations for transactions involving fixed income securities. By applying advanced scenario descriptions to sets of financial institution transaction data, alerts can be generated. These alerts provide an indication that the behavior, event and/or activity representing a trading compliance violation is taking place. Preferably, the alerts also provide links to the specific types of data that are indicative of the behavior of interest. Embodiments of the invention may analyze vast amounts of data in identifying behavior, events and/or activities that may conflict with governmental or market-based regulations or with internal policies to provide for strong marketplace integrity.

Accordingly, in an embodiment, a computer-based method for generating alerts to fixed income security trading compliance violations includes the steps of: (i) periodically receiving data having a first format from at least one source; (ii) transforming the data from the first format to a second format; (iii) retrieving an advanced scenario associated with a trading compliance violation, wherein the advanced scenario defines one or more behaviors of interest that are indicative of the trading compliance violation; (iv) using the advanced scenario to perform detection processing on a dataset to detect the trading compliance violation. The situation is preferably a predetermined activity, and specifically, an undesired activity relating to fixed income securities trading. The dataset may include a portion of the data having the second format, and it may include one or more events and entities. The trading compliance violation is detected when the detection processing finds at least one instance of the violation in the dataset.

Optionally, the method may generate one or more alerts based on the discovery of one or more behaviors of interest. The method may also prioritize the behaviors of interest based on user-defined logic and values. It may also group the behaviors of interest, prioritize the groups, and generate one or more alerts based on the existence of groups or prioritized groups.

The method may be embodied in a computer program residing on a computer-readable medium.

BRIEF DESCRIPTION OF THE DRAWINGS

The accompanying drawings, which are incorporated in and form a part of the specification, illustrate preferred embodiments of the present invention and, together with the description serve to explain the principles of the invention. The embodiments illustrated in the drawings should not be read to constitute limiting requirements, but instead are intended to assist the reader in understanding the invention.

FIG. 6 illustrates the lower half of a graphical user interface for viewing of alert detail.

FIG. 7 illustrates a graphical user interface for workload management.

FIG. 11 illustrates a graphical user interface for a threshold definer.

FIG. 16 is a representation of sequence matching.

FIG. 22 illustrates exemplary parameters for the Parking to Conceal Position scenario.

FIG. 23 illustrates exemplary highlights for the Parking to Conceal Position scenario.

FIG. 24 illustrates exemplary parameters for the Parking via Settlement Date scenario.

FIG. 25 illustrates exemplary highlights for the Parking via Settlement Date scenario.

FIG. 26 illustrates exemplary parameters for the Wash Trades scenario.

FIG. 27 illustrates exemplary highlights for the Wash Trades scenario.

FIG. 28a and FIG. 28b illustrate exemplary parameters for the Excessive Markups and Markdowns scenario.

FIG. 29 illustrates exemplary highlights for the Excessive Markups and Markdowns scenario.

FIG. 30 illustrates exemplary parameters for the Excessive Markups and Markdowns for Riskless Principal Trades scenario.

FIG. 31 illustrates exemplary highlights for the Excessive Markups and Markdowns for Riskless Principal Trades scenario.

FIG. 32 illustrates exemplary parameters for the Significant Corrections scenario.

FIG. 33 illustrates exemplary highlights for the Significant Corrections scenario.

FIG. 34 illustrates exemplary parameters for the Cancellation Trend scenario.

FIG. 35 illustrates exemplary highlights for the Cancellation Trend scenario.

FIG. 36 illustrates exemplary parameters for the Correction Trend scenario.

FIG. 37 illustrates exemplary highlights for the Correction Trend scenario.

FIG. 38 illustrates exemplary parameters for the Regulation T Extended Settlements scenario.

FIG. 39 illustrates exemplary highlights for the Regulation T Extended Settlements scenario.

FIG. 40 illustrates exemplary parameters for the Trend of Shortened or Extended Settlements scenario.

FIG. 41 illustrates exemplary highlights for the Trend of Shortened or Extended Settlements scenario.

DETAILED DESCRIPTION

Figure 1:
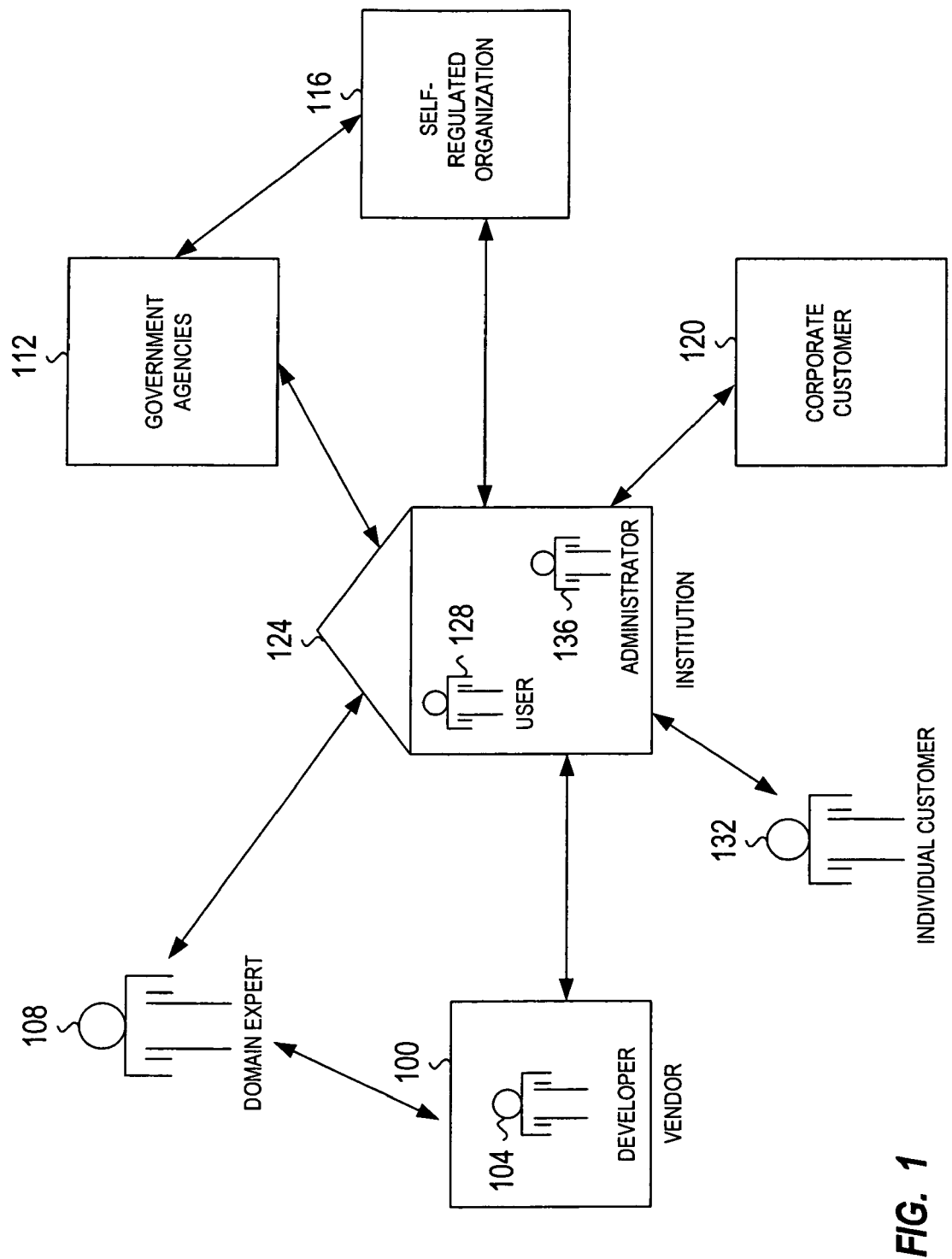
FIG. 1 illustrates a user-relationship diagram of an embodiment of the advanced scenario based alert generation and processing system.

In describing an embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose. In addition, the drawings illustrate examples of preferred embodiments of the invention and should not be construed as limiting or requiring certain features.

FIG. 1 illustrates a user-relationship diagram for an embodiment of the advanced scenario based alert generation and processing system. As can be seen in FIG. 1, a vendor 100 with a developer 104 may work directly with a domain expert 108, institution 124, administrator 136 and/or user 128 in developing, creating and implementing information based products and services. Domain expert 108 has, generally speaking, specialized knowledge about the application and may act as a subject matter expert. Administrator 136 and user 128 may monitor both individual customer 132 as well as a corporate customer 120. A self-regulated organization 116 develops rules and regulations that its members (e.g. institution 124) adhere to, either for preservation of the industry or to comply with government regulations.

As an example, institution 124 may be a U.S. securities brokerage that services individuals as well as corporations. The Securities and Exchange Commission (SEC) requires such an institution 124 to perform self-monitoring, which it does by performing that monitoring according to the standards set by National Association of Securities Dealers (NASD), a self-regulated organization 116.

Institution 124 or self-regulated organization 116 may be subject to regulation by a variety of government agencies 112, examples of which are the Internal Revenue Service (IRS), Federal Bureau of Investigation (FBI), U.S. Treasury, SEC and Bureau of Citizenship and Services (BCIS). Institution 124 may be subject to and/or a member of a self-regulating organization 116, such as professional or financial associations that provide operating guidelines for their members with the goal of being self-regulating as opposed to government regulated.

Understanding behaviors may be important to institution 124 for purposes of better understanding or protecting their customer or for reporting certain behaviors to government agencies. Self-regulated organization 116 may also require its member institutions to perform a specific level and/or type of behavior monitoring in order to ensure that all members are compliant with the organization's rules.

Figure 2:
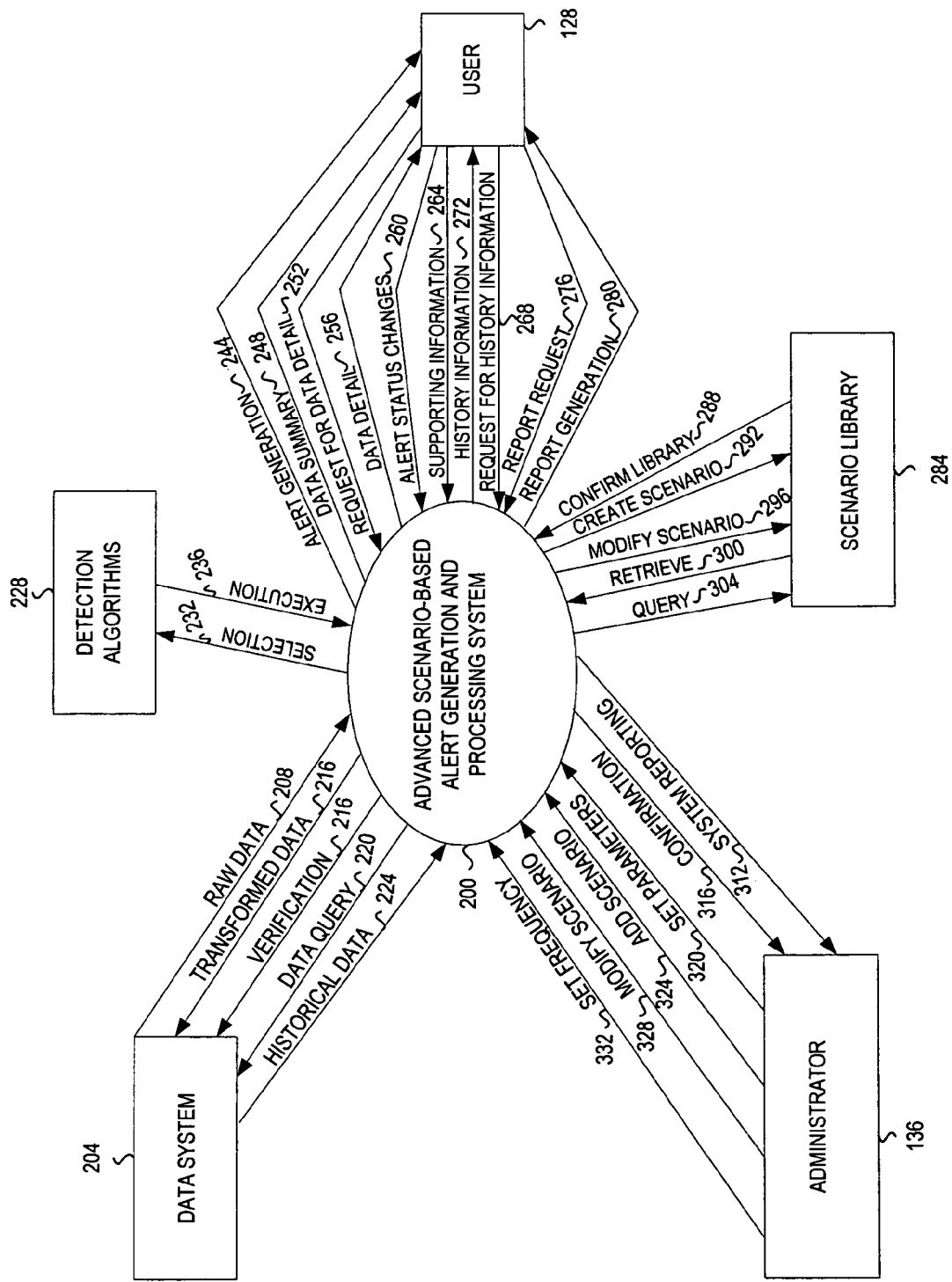
FIG. 2 represents a context diagram.

FIG. 2 illustrates a context-diagram for an embodiment of the advanced scenario-based alert generation and processing system 200. The main elements of this environment include, but are not limited to, data system 204, detection algorithms 228, user 128, scenario library 284 and administrator 136.

In interfacing with the advanced scenario-based alert generation and processing system 200, the administrator 136 may set a frequency 332 which determines the time and frequency that the advanced scenario-based alert generation and processing system 200 performs its advanced capabilities. Furthermore, the administrator 136 may modify a scenario 328 by accessing an existing scenario from the scenario library 284 in order to make and save desired changes. Additional scenarios may be added by the administrator 136 through an add scenario 324 capability thereby allowing for continuous upgrading and enhancing of the advanced scenario-based alert generation and processing system 200. The administrator 136 may also set parameters 320 enabling greater flexibility and capability in detecting desired behaviors, transactions or relationships across entities and events. The advanced scenario-based alert generation and processing system 200 is preferably capable of sending confirmation 316 of the set frequency 332, modify scenario 328, add scenario 324 and set parameters 320 actions. The advanced scenario-based alert generation and processing system 200 may also provide system reporting 312, which could include information such as error reporting, system performance or other desired and relevant information.

Figure 14A:
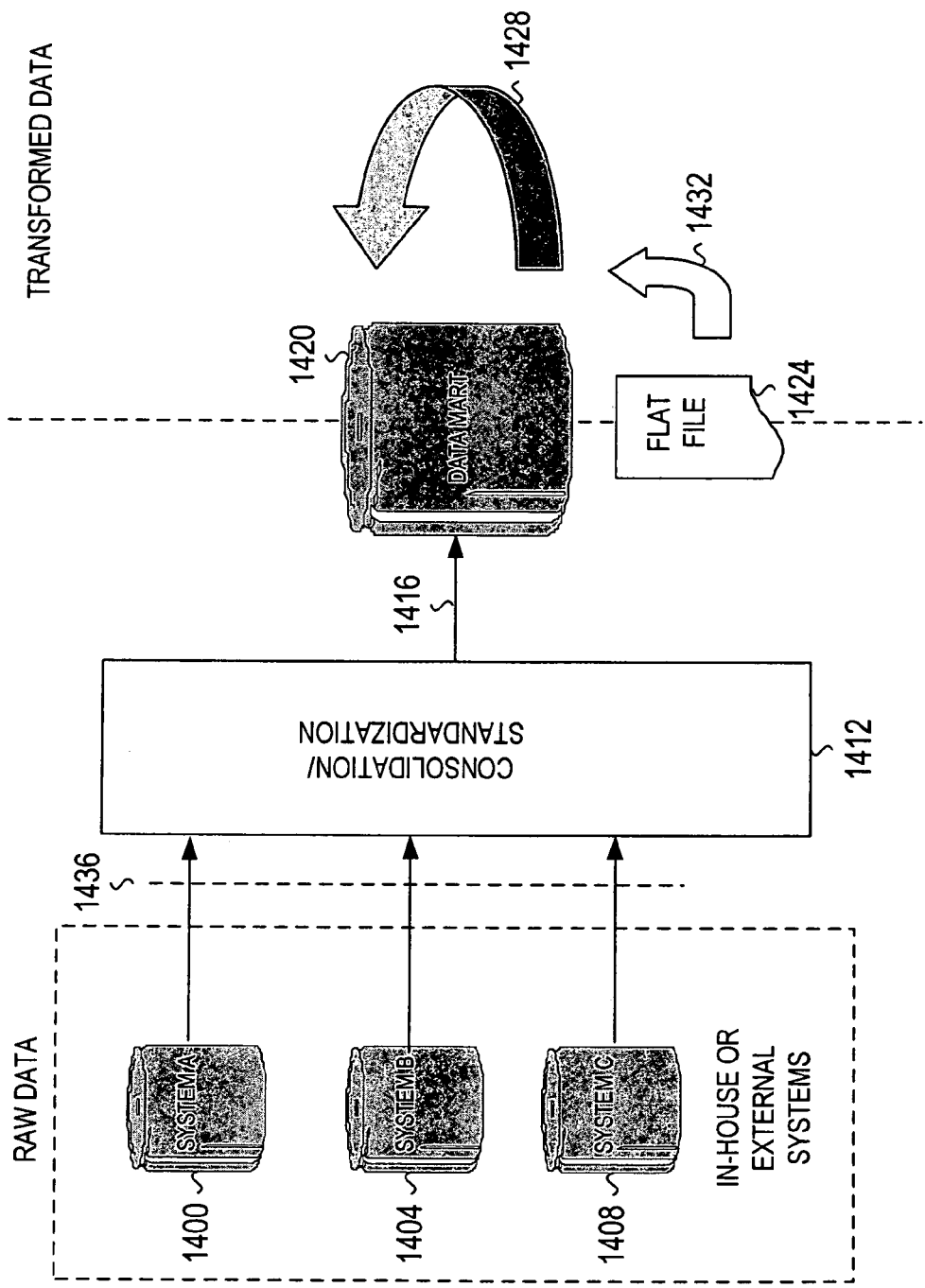
FIG. 14A represents a data transformation process.

The advanced scenario-based alert generation and processing system 200 may receive raw data 208 from the data system 204. The advanced scenario-based alert generation and processing system 200 may then transform the data and send back transformed data 212 to the data system 204. The process of transforming data is illustrated in FIG. 14A and described below in the text accompanying FIG. 14A. Preferably, the advanced scenario-based alert generation and processing system 200 may provide verification 216 of the data integrity through any of a variety of error detection processes that will be readily known to those skilled in the art. The advanced scenario-based alert generation and processing system 200 may then send a data query 220 to the data system 204 in which historical data 224 may be retrieved as input for the advanced scenario-based alert generation and processing system 200. Once the historical data 224 is available for the advanced scenario-based alert generation and processing system 200, detection algorithms 228 may be accessed for selection 232 and execution 236 of the desired and appropriate algorithm.

Figure 4:
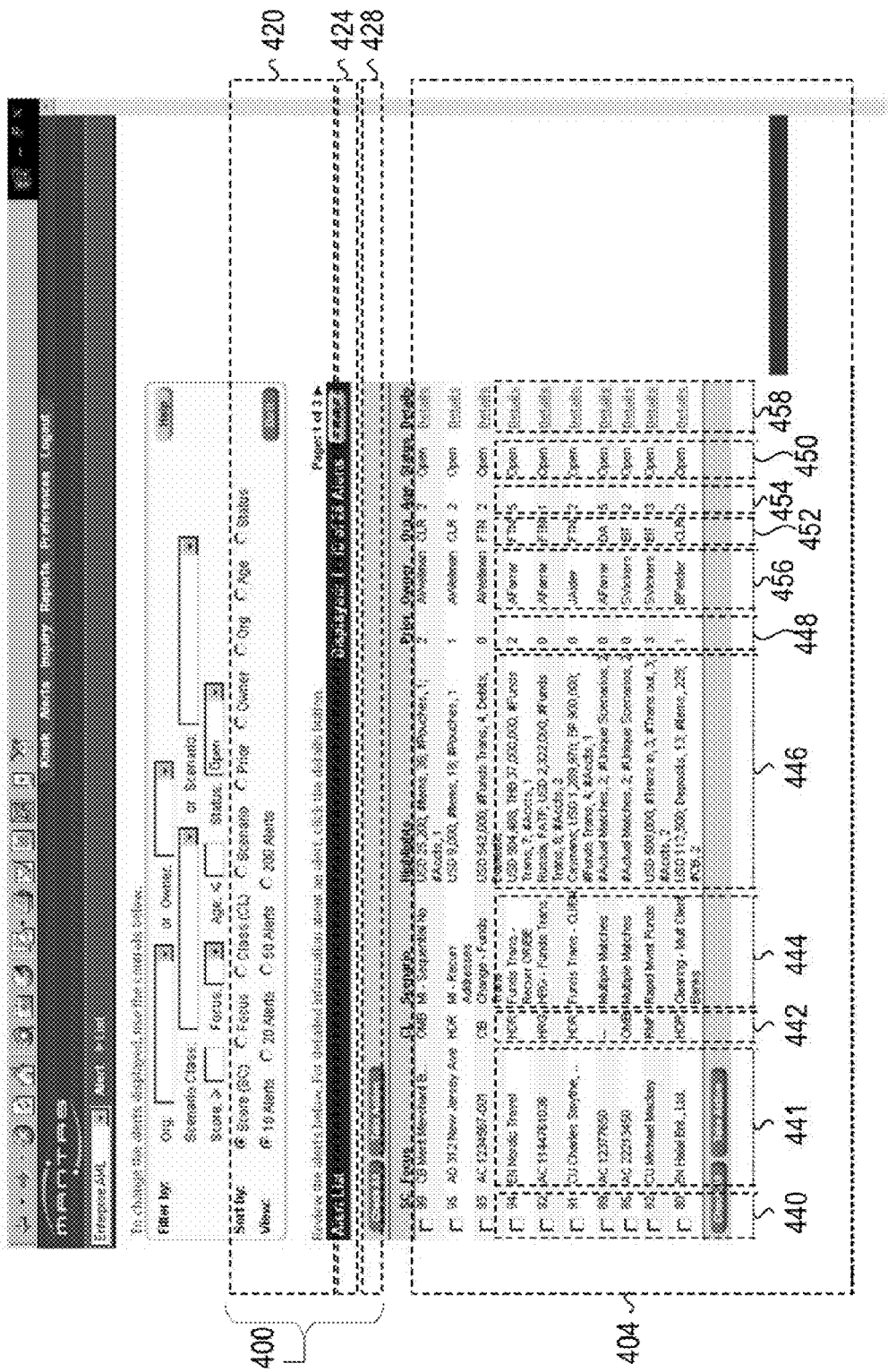
FIG. 4 illustrates a graphical user interface for alert display, alert filtering and alert viewing.
Figure 5:
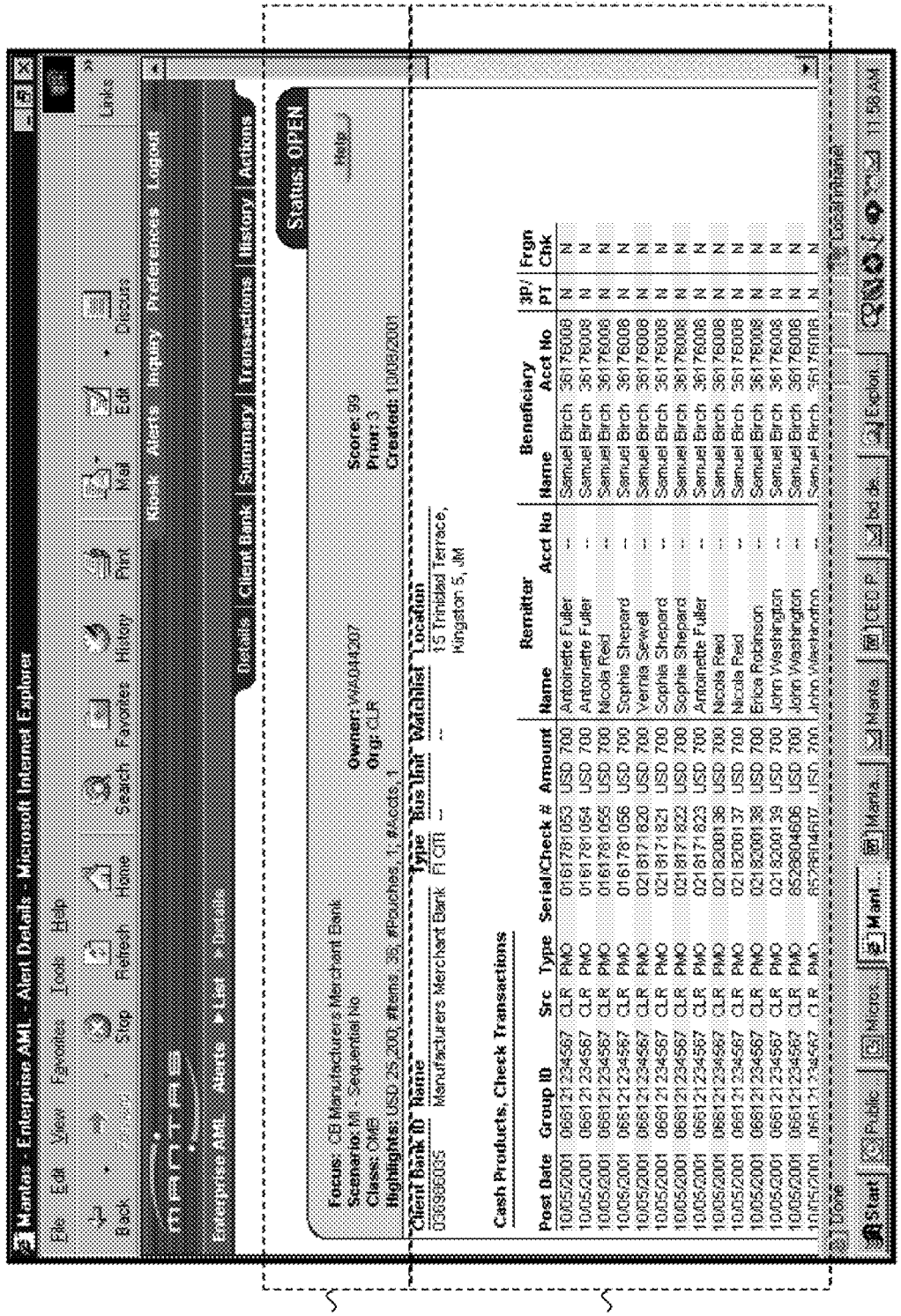
FIG. 5 illustrates the upper half of a graphical user interface for viewing of alert details.
Figure 20:
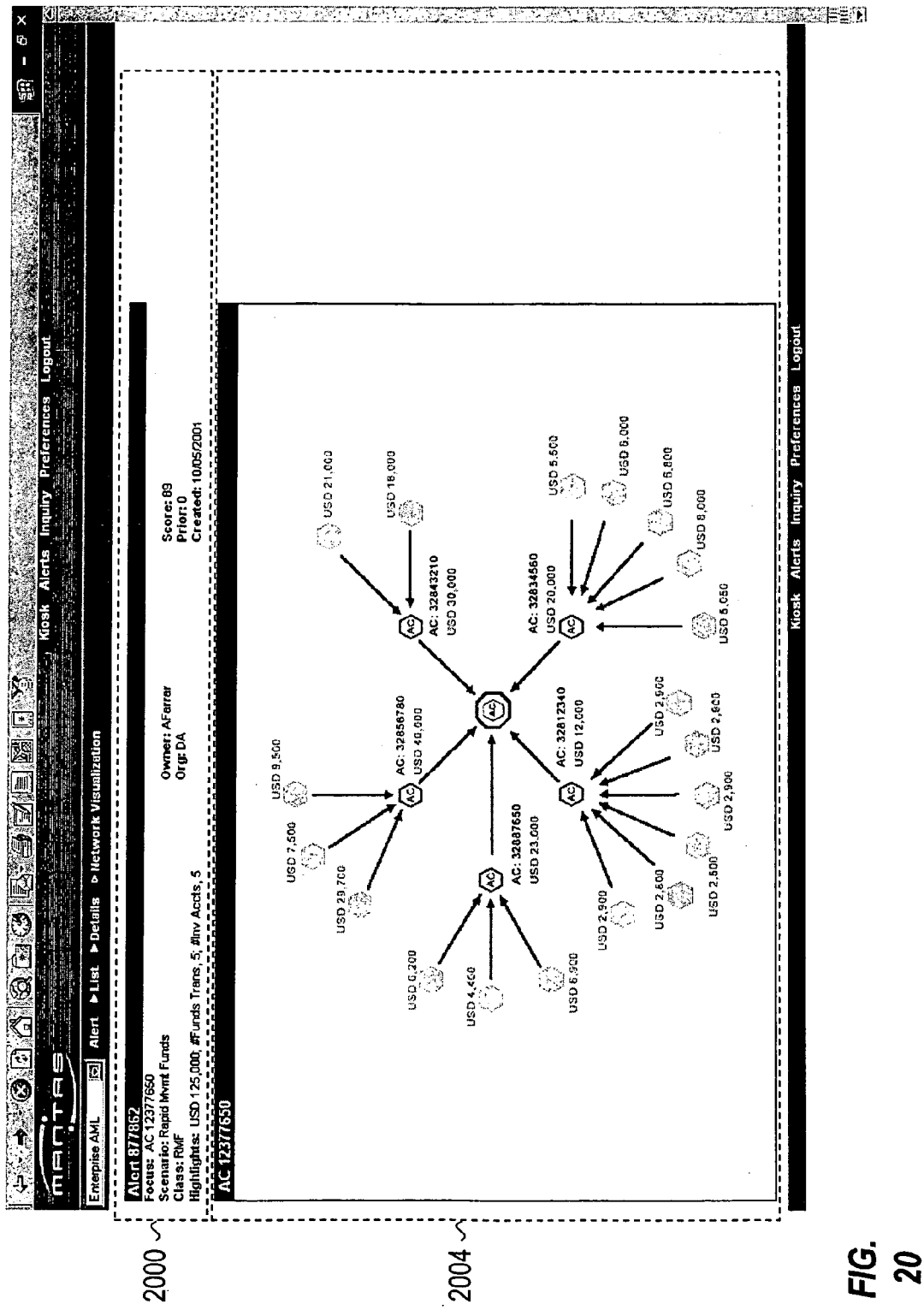
FIG. 20 illustrates a graphical user interface and display for network visualization of alerts.

A variety of detection algorithms 228 may be applied. The types of algorithms may include, but are not limited to, link analysis, sequence matching, outlier detection, rule patterns, text mining, decision trees and neural networks. Link analysis is an advanced behavior detection algorithm that analyzes seemingly unrelated accounts, activities, events and behaviors to determine whether possible links and/or hidden relationships exist. FIG. 20, which will be described in greater detail later in this document, is illustrative of link analysis. Sequence matching may be used to identify a range of events, behaviors or activities in a pattern of relevant sequences. While a single event, behavior or activity may not always be interesting, when compared to the position of such event, behavior or activity within a larger context, certain interesting trends or sequences may be detected. FIG. 4, which will be described in greater detail later in this document, is illustrative of sequence matching. Outlier detection examines data values to determine specific events, behaviors or activities that fall outside of a specified statistical range. A simplistic approach is to use regression modeling in identifying outliers, which are beyond a specified standard deviation. A more sophisticated approach is to identify outliers in the context of data clusters where multiple data clusters may exist rendering a regression model ineffective. FIG. 5, which will be described in greater detail later in this document, is illustrative of outlier detection. Rule pattern detection implements conditional statements when analyzing data, generally in the form of "if-then" statements. Text mining algorithms examine the data for specific text phrases, sequences or information that may be provided as inputs to a behavior detector. Decision trees and neural networks are related approaches that examine sequence of events, behaviors or activities using logical rules or specific networks well known by those skilled in the art.

Additional algorithms may also be accessed by the advanced scenario-based alert generation and processing system 200 in identifying interesting behaviors, events, activities or transactions. Once a detection algorithm has been selected, the advanced scenario-based alert generation and processing system 200 may access the scenario library 284 to apply the relevant and appropriate scenario, in conjunction with the detection algorithm, to create matches of desired behaviors, activities or events in a complex environment. The scenario library 284 may contain a plurality of advanced scenarios and basic scenarios for identifying activities, behaviors or events of interest.

The advanced scenario-based alert generation and processing system 200 may send a query 304 to the scenario library 284 accessing a specific scenario. The scenario library 284 may then retrieve 300 the selected scenario and send it back to the advanced scenario-based alert generation and processing system 200. Based on the specific scenario retrieved, the advanced scenario-based alert generation and processing system 200 may then send a data query 220 to the data system 204 in which historical data 224 may be retrieved as input for the advanced scenario-based alert generation and processing system 200. In addition, the advanced scenario-based alert generation and processing system 200 may send requests to modify a scenario 296 or create a scenario 292 to the scenario library 284. The scenario library 284 may confirm the library 288 to the advanced scenario-based alert generation and processing system 200. The flexibility and capability to add or modify elements of the scenario library 284 and detection algorithms 228 allow the advanced scenario-based alert generation and processing system 200 to be continuously upgraded and dynamically maintained. Once the desired and appropriate detection algorithm has been selected and the desired and appropriate scenario applied, the advanced scenario-based alert generation and processing system 200 may process the data by creating an alert generation 244 that may be sent to the user 128. Furthermore, the advanced scenario-based alert generation and processing system 200 may send a data summary 248 related to the alert generation 244 to the user 128 in order to provide immediate access to relevant information related to the detected activity, behavior or circumstances. The user 128 may send a request for data detail 252 to the advanced scenario-based alert generation and processing system 200, which then provides additional underlying data related to the data summary 248 and alert generation 244. The advanced scenario-based alert generation and processing system 200 may send the data detail 256 to the user 128 based on the request for data detail 252.

This additional information, when combined with the original information received, allows the user 128 to elect an alert status change 260 which is transmitted back to the advanced scenario-based alert generation and processing system 200. Furthermore, the user 128 may provide supporting information 264 back to the advanced scenario-based alert generation and processing system 200. This supporting information 264 may include, but is not limited to, comments, findings, opinions or other data that support the user's request to implement an alert status change 260. In addition, user 128 may request additional historical information 268 from the advanced scenario-based alert generation and processing system 200. This may provide the user 128 with additional information in which to place the context of the alert generation 244. The advanced scenario-based alert generation and processing system 200 may then send the requested history information 272 to the user 128. Furthermore, the user 128 may send a report request 276 to the advanced scenario-based alert generation and processing system 200, which may then provide the desired information through report generation 280 back to the user 128.

Figure 3:
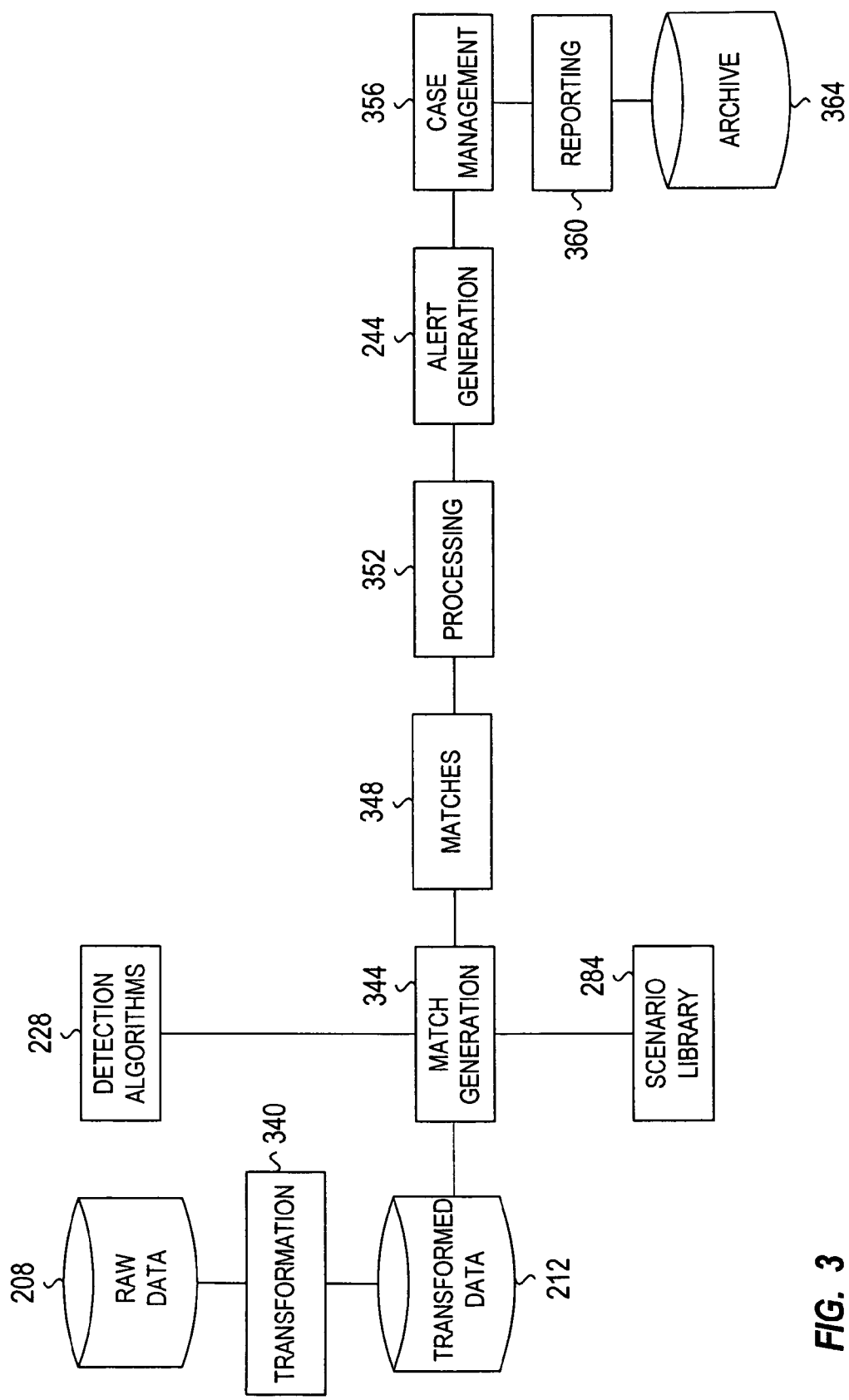
FIG. 3 is a block diagram representing an embodiment of the advanced scenario based alert generation and processing system.

FIG. 3 represents a block diagram of the advanced scenario based alert generation and processing system 200. Raw data 208 is converted through a transformation step 340, elements of which are described below and in FIG. 14A. The output of the transformation may be saved as transformed data 212. Match generation 344 may then access the transformed data 212, detection algorithms 228 and scenario library 284. The scenarios in scenario library 284 may be represented as parameters and logic that specifically relate to the behavior of interest. In one embodiment, these parameters and logic are coded in Extensible Markup Language (XML). In one embodiment, match generation 344 is written in C++ and retrieves the parameters and logic from the XML representation in scenario library 284, allowing the detection algorithms written in C++ to operate on the transformed data. The match generation 344 then generates matches 348, which undergo processing 352 where they are grouped and prioritized. Preferably, processing 352 is a key component of the overall system. Incorporated in processing 352 is the ability to prioritize or weigh different elements of the activity, event or, behavior of interest. Alert generation 244 may receive processed (grouped and prioritized) matches from processing 352, and in one embodiment, store those matches as an XML file. In many cases, individually identified events, behaviors or activities of interest may be relatively minor. However, when viewed within a broader context as part of other transactions, then the cumulative value becomes much greater than the individual elements. As such, a grouping of activities, events and behaviors of interest provides an advanced capability not presently available. Furthermore, the prioritization allows for greater segmentation of the data so that matches with higher impact or importance receive greater attention or are more quickly considered.

Figure 7:
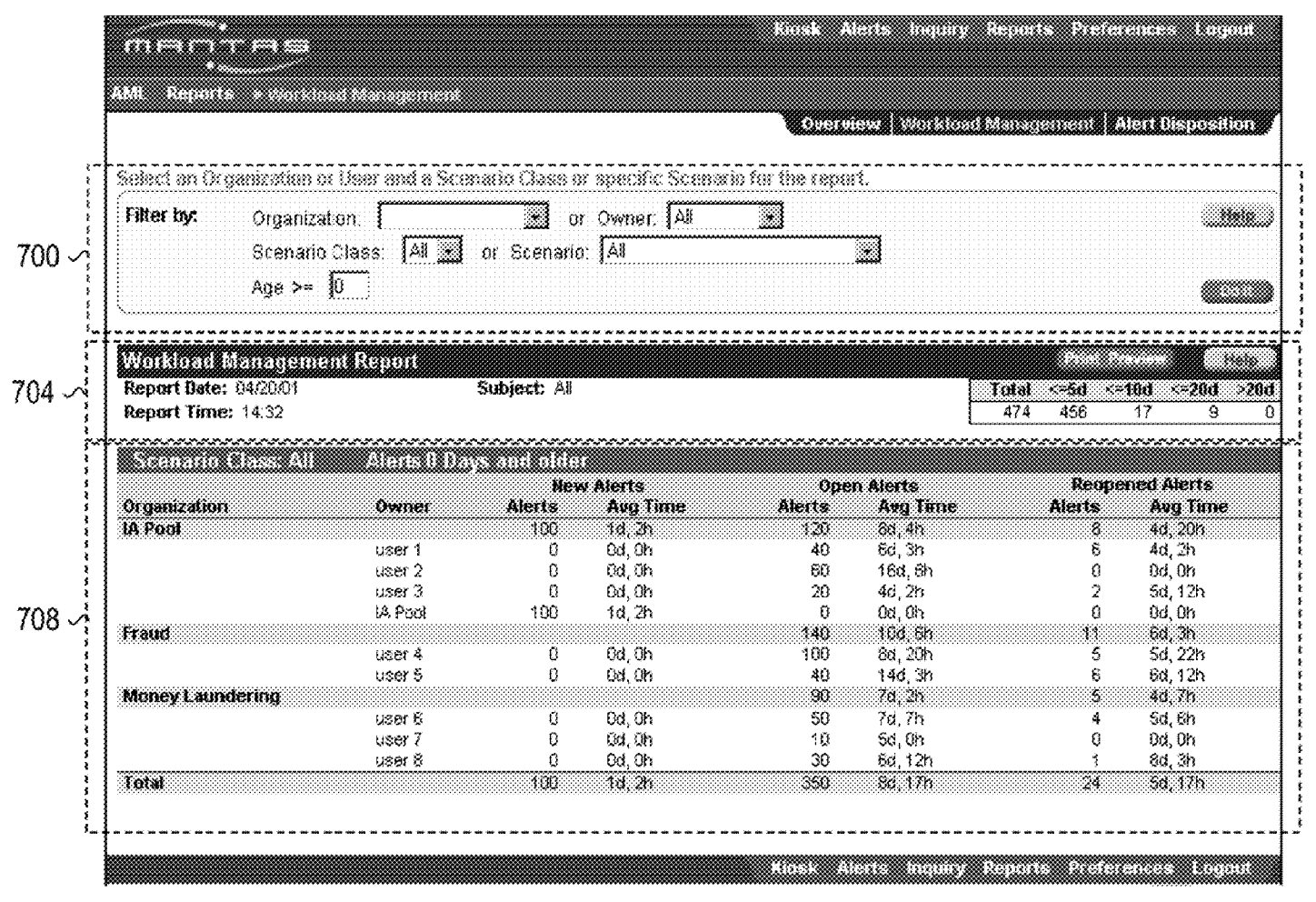
Figure 8:
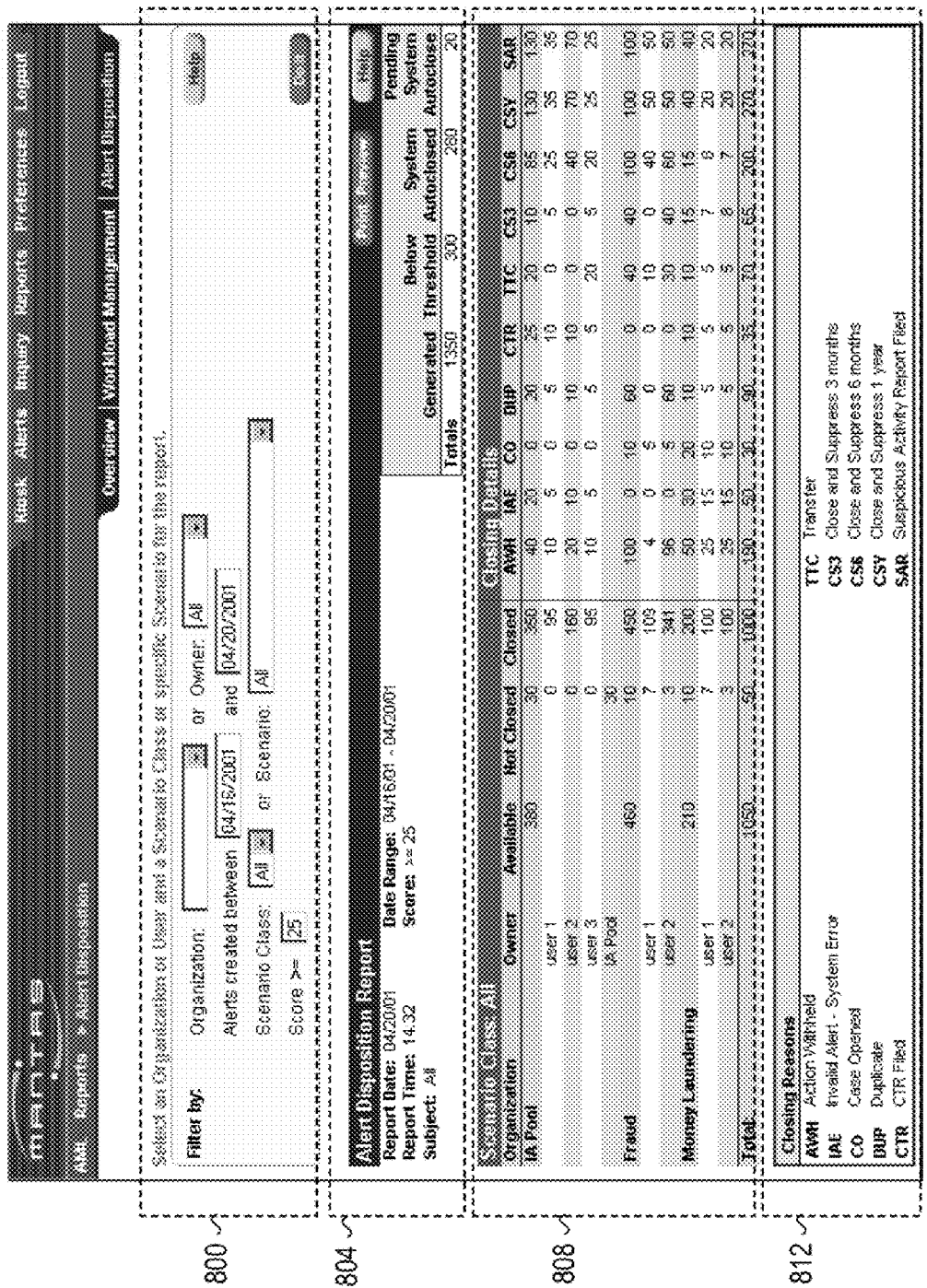
FIG. 8 illustrates a graphical user interface for alert disposition.

Referring again to FIG. 3, the alert generation 244 transfers relevant information regarding behaviors, activities and events of interest into case management 356. In case management 356, the information is further reviewed, analyzed and investigated. Case management 356 is a set of tools and user interfaces that allow alerts to be reviewed, analyzed and investigated by a human operator. Case management 356 also allows a user 128 to enter data related to an alert, close an alert, refer an alert to another user or perform other types of case management tasks on an individual alert. In one embodiment, case management provides a user interface, such as that shown in FIG. 4, including a high-level description of the alert. Case management 356 also supports the filtering of the alerts using, for example, the fields shown in filtering elements 400. Case management 356 may also provide user interfaces such as those shown in FIGS. 5 and 6. When alerts are stored in an XML format, a number of commercially available case management tools may be used to access and assist a human in processing those alerts. Examples of commercially available case management tools include, but are not limited to, TightLink CIS 3™ and Syfact™. In one embodiment, a web-based application written in Java is used for case management 356. Additional information is saved and the alert is processed, at which point, the information is transferred to reporting 360 and later saved in archive 364. Examples of the output of reporting 360 are illustrated in FIGS. 7 and 8 where workload management and alert dispositioning are shown respectively. A number of commercially available reporting tools may be used to report on workload management, dispositioning and other areas of interest. Examples of commercially available case reporting tools include, but are not limited to Crystal Reports™ sold by Crystal Decisions, the product manufactured by Statewide Data Warehouse and sold under the product name Brio™, or the e.Reporting Suite™ offered by Actuate. In one embodiment, a web-based application written in Java is used for reporting 360. The ability to save the alert data and related workflow activities in archive 364 is beneficial because it allows the methodology used to create the alert data and the methodology used to establish workflow to be recalled and modified as necessary.

Representative code included herein includes sub-sections describing link analysis, sequence matching, outlier detection and rules-based detection as it pertains to match generation 344. These sub-sections instruct the system to access transformed data 212, select detection algorithms 228 and apply the appropriate scenario library 284 in the match generation process 344. Once match generation 344 has been completed, then the next step in the advanced scenario-based alert generation and processing system 200 is the processing 352 of matches 348 identified in the match generation sequence 344. Processing 352 includes the processes of prioritization, group and alert prioritization of the matches 348. The prioritization sub-section in the representative code describes a computer-based approach for receiving match information and prioritization strategy logic. This sub-section then evaluates the matches 348 based in order to assign a ranking or prioritization which is an output of the advanced scenario-based alert generation and processing system 200. The grouping sub-section in the representative code describes a computer-based approach for accessing a set of prioritized matches and grouping strategy logic. The grouping process then evaluates prioritized matches and creates group associations based on the grouping strategy logic. The grouped prioritized matches form an output of the advanced scenario-based alert generation and processing system 200. The alert prioritization sub-section in the representative code describes a computer-based approach for receiving a set of grouped matches and alert prioritization strategy logic. The alert prioritization process then evaluates the grouped matches based on the alert prioritization strategy logic in order to assign an alert prioritization. The group matches may then be output based on alert prioritization by the advanced scenario-based alert generation and processing system 200 which would proceed on to the next step of alert generation 244.

FIG. 4 is an illustration of an exemplary graphical user interface for alert display, alert filtering and alert viewing. Prioritization column 440 displays the numeric value associated with the alert prioritization. A user 128, domain expert 108, developer 104 or administrator 136 may modify the visual presentation of alerts based on the alert prioritization.

The filtering elements 400 contain a plurality of sub-fields that may be used to modify the presentation of alerts. For example, the sub-fields may include organization or owner, scenario class or scenario, prioritization, focus, age and status. Organization refers to a list of internally defined groups involved in the detection process. Owner refers to individuals or groups that have been assigned various alerts. A user 128, administrator 136, domain expert 108 or developer 104 may select the filtering elements 400 sub-fields in affecting what information is displayed and in what order.

Referring to the user interface shown in FIG. 4, multiple alerts are shown in alert list 404. Alert list 404 may contain a prioritization column 440, where the prioritization SC represents a numeric value derived from the application of the scenarios and the parameterized values within the scenarios. A focus column 441 may be present to indicate the centralized event or entity of interest. A class column 442 labeled CL may indicate the general class of behavior (e.g. money laundering). The scenario column 444 may list the scenario name. The highlights column 446 may provide the summary information of the individual events and entities. Prior column 448 may indicate the history of alerts on that focus (e.g. the number of prior alerts). Owner column 450 may indicate the user 128 who has been assigned the alert. Organization column 1652 may indicate the organization in which the user 128 resides. Age 452 may indicate and age such as the number of days since the alert was created. Status column 456 may indicate the status of the alert, examples of which are open, closed, pending and transferred. Details column 458 provides links, preferably in the form of hyperlinks to alert details, such as those illustrated in FIG. 5.

In the user input section 400, the user 128, administrator 136, domain expert 108 or developer 104 may select how the data is to be presented by sorting the output based on, for example, the prioritization, focus, class, scenario, prior alerts (prior), owner, organization (org), age or status followed by the number of views retrieved at one time (e.g., 10, 20, 50 or 200 alerts). In one embodiment, these selections are made through the use of pull down entry fields and numerical entry fields. Within the filtering elements section 420, the user 128, administrator 136, domain expert 108 or developer 104 may filter based on organization, owner, scenario class, scenario, prioritization, focus, age and status. Within the sort-by section 424 the user 128, administrator 136, domain expert 108 or developer 104 may have the information displayed by ranking or grouping based on prioritization, focus, class, scenario, prior alerts (prior), owner, organization, age and status.

FIG. 5 represents a user interface for alert detail. Alert status 500 section contains summary and status information relevant to the alert in question including, without limitation, focus, scenario, class, highlights, owner, organization, prioritization, priority and date the alert was created. Focus refers to an event or entity of interest. Scenario refers to a specific type of detected behavior or activity of interest. Class may be a general description of the type of scenario. Highlights may provide summary information on the alert. Owner may refer to an individual or group assigned to investigate the alert. Organization may refer to a department overseeing this activity. Prioritization may refer to a numeric value associated with the alert derived from the advanced behavior detection and alert generation system. Priority is a value associated with the importance and urgency of the alert, which may be based on several factors. Created may refer to the date the alert was generated. Alert details 504 section may provide specific detailed behavior, event and activity-based information on the alert in question. Information on the customer bank, name, type, business unit, watchlist and location may be provided automatically by the system. The information contained in the remaining section may be dependent upon the type of alert generated and may vary accordingly. The visual presentation of the detailed information may expedite the users' ability to quickly and more accurately identify behaviors, activities or events of interest that require further review or investigation or that enable the user to determine that the behaviors, events or activities in question are legitimate.

Figure 6:
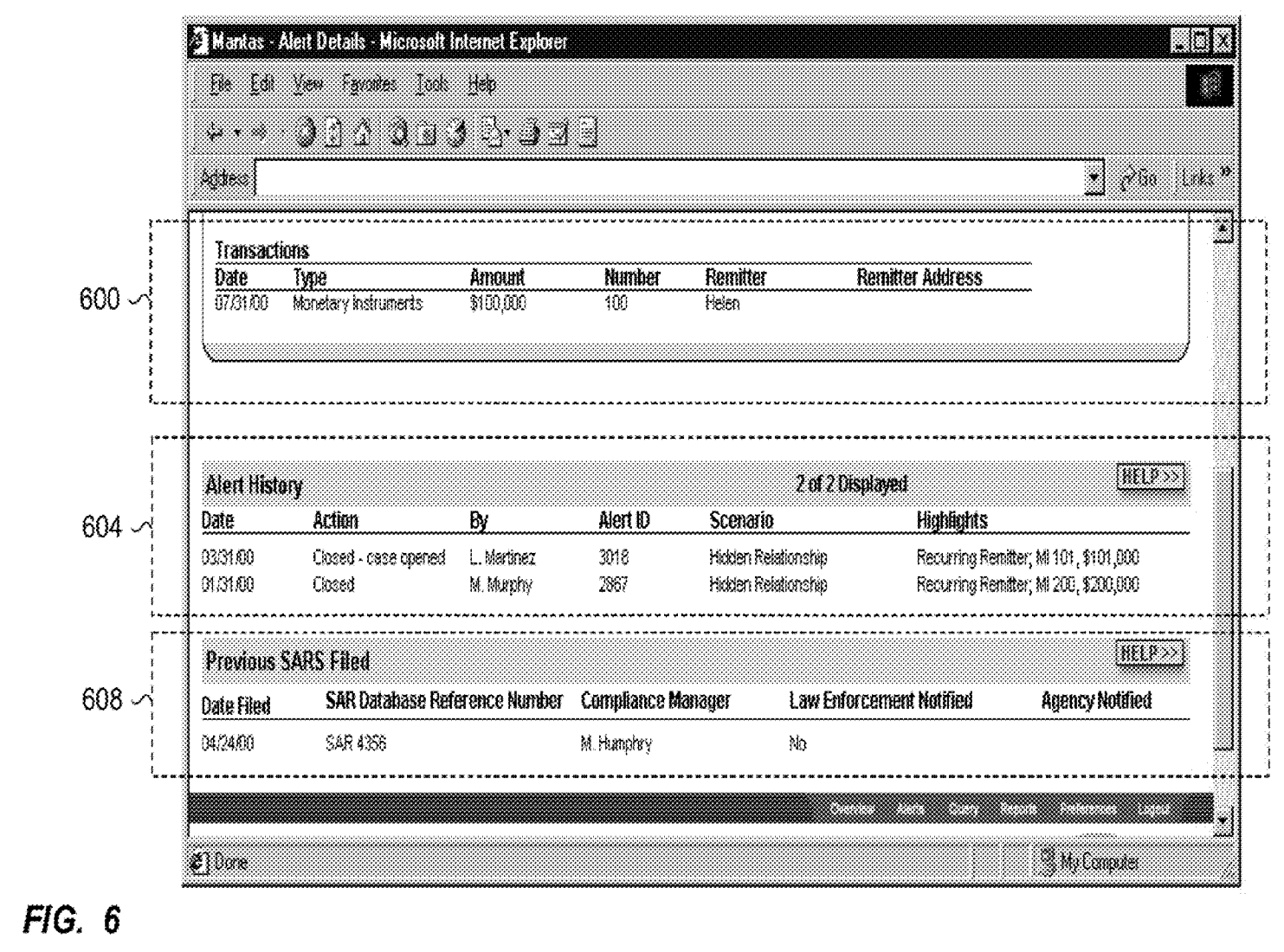

FIG. 6 represents a user interface for alert history. Alert transaction 600 section may provide information on current alerts. Alert history 604 may provide history information on related elements of the alert transaction 600. The history information may be linked through a plurality of fields or sub-fields. Previous alert transactions 608 section may provide information on past transactions that were completed based on earlier events. The alert history screen capture may then allow current alert information to be reviewed in context with past alert history and transactions. While an investigation or review of a single event may not provide any meaningful insights or understandings, having historical and transactional data may be extremely valuable then in creating a contextual overview of behavior, events or actions.

FIG. 7 represents a user interface for workload management report screen capture. Workload management filters 700 section may contain a plurality of fields or sub-fields wherein information or values may be altered to affect the filtering of associated data. Such sub-fields may include organization or owner, scenario class or scenario and age. Workload management report 704 section may provide information related to the report generation. Information included in this section contains report generation date and time along with a segmentation of selected alerts based on age of the alert. Workload management detail 708 section may provide specific alert information based on filtering elements provided in workload management filters 700 section. In this section, information may be presented based on the filtering elements contained in the workload management filters 700 section. The presented information may be grouped by organization and by owner. New alerts, open alerts and reopened alerts columns may provide numeric values both for the number of alerts affect and the age of the alerts. The workload management detail 708 section may also provide information on the average time of alert age by organization and for the total of each column, which may facilitate more efficient and effective workload process management.

FIG. 8 represents a user interface for alert disposition. Alert disposition filter 800 section may contain a plurality of fields or sub-fields wherein information or values may be altered in affecting the filtering of associated data. Fields may include, without limitation, organization or owner, alerts created during a specific period, scenario class or scenario and prioritization. Alert disposition report 804 section provides information related to the alert disposition report. Filtering information provided in alert disposition filter 800 may be confirmed in alert disposition report 804 section along with summary information of the number of relevant alerts broken down into further classifications. The generated field provides a numeric value of the total number of alerts based on the filters. The Below Thresholds field is a numeric value for alerts that do not meet certain threshold limits. A user 128 may modify the threshold if the Below Thresholds value is too large. The System Autoclosed field represents a numeric value of alerts the system automatically evaluated and closed without requiring further review or investigation based on applying intelligence and system rules. Pending system autoclose are alerts that are in the process of being closed through user review and investigation. Alert disposition detail 808 section provides specific alert information may be grouped based on filtering elements provided in alert disposition filter 800 section. The alert information is group based on organization. Owners within the organization are further segmented with information provided based on their workload results. An additional category is also provided in the alert disposition detail 808 section providing closing details. This category contains a plurality of columns in which alerts have been assigned. The numeric values in these columns and rows are related to the numeric values associated with individual owners. AWH refers to action withheld. IAE refers to invalid alert or system error. CO refers to case opened. DUP refers to duplicate. CTR refers to CTR filed. TTC refers to transfer.

CS3 refers to close and suppress for 3 months. CS6 refers to close and suppress for 6 months. CSY refers to close and suppress for one year. SAR refers to suspicious activity report filed. Alert disposition definitions section 812 contains definitions related to the alert disposition detail section 808.

FIGS. 5 and 6 are representative of an exemplary graphical user interface for display information related to case management 356. FIGS. 7 and 8 are representative of an exemplary graphical user interface displaying information related to reporting 420. The representative code that facilitates these processes may be written in a variety of computer languages including, but not limited to, Java, C and C++.

Figure 9:
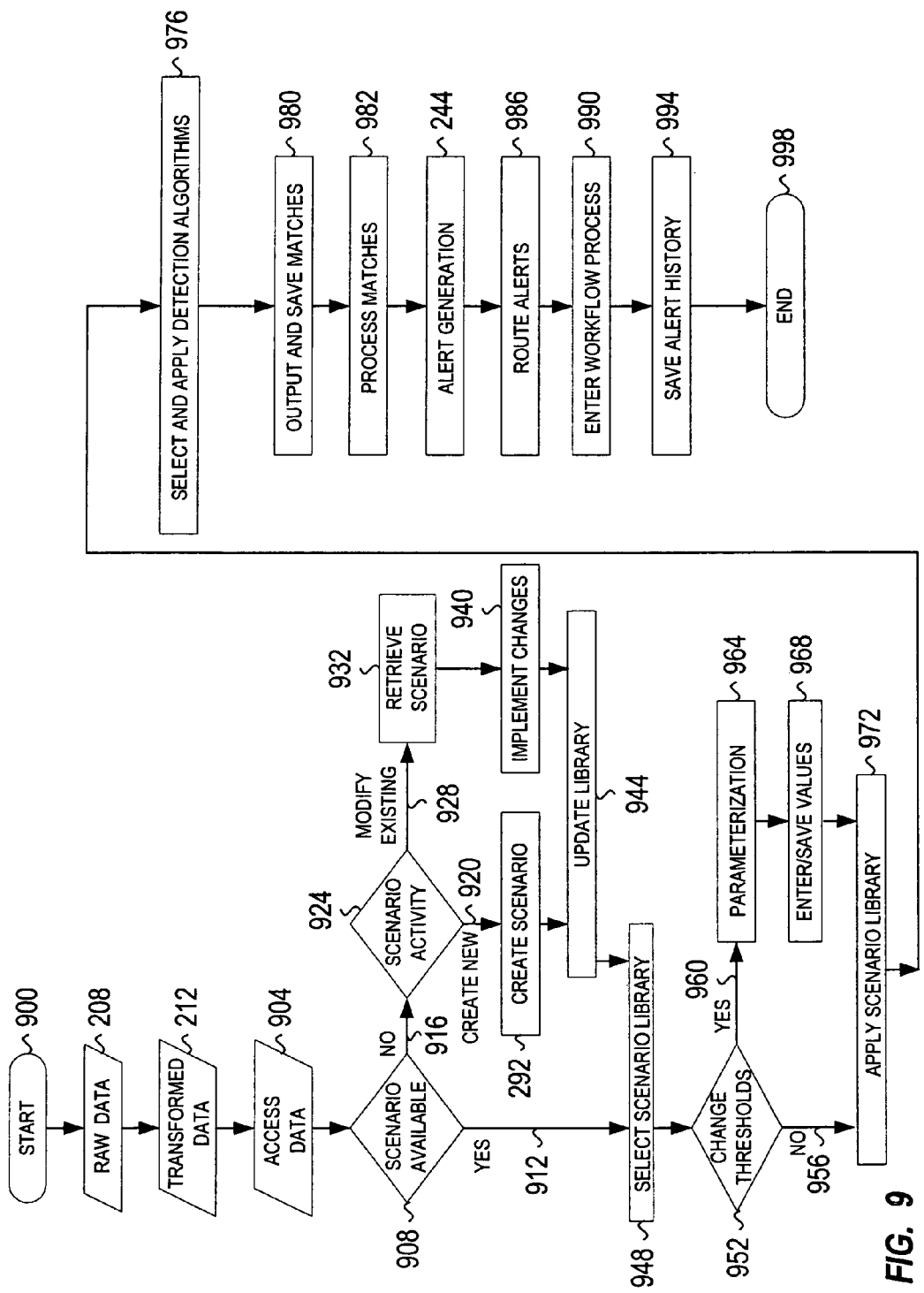
FIG. 9 is a flowchart representing an embodiment of the advanced scenario based alert generation and processing system.

FIG. 9 illustrates a flow diagram of several exemplary elements of an advanced scenario-based alert generation and processing system 200. Upon system start 900, raw data 208 is accessed by the system which is then transformed resulting in stored transformed data 212. The advanced scenario-based alert generation and processing system 200 may then access data 904, which is included in the match generation 344 process. A scenario available test 908 may then be performed resulting in a scenario available result 912 or a scenario not available result 916. A decision may be made as to whether or not a scenario available 908 exists. If a scenario available test 908 results in a scenario available result 912, then the system may select scenario library 948. If the scenario available test 908 results in a scenario not available result 916, then another decision point scenario activity test 924 may be performed to consider whether to modify 928 an existing scenario or create a new 920 scenario. If decision point scenario activity test 924 results in a new scenario being created 920, then the flow proceeds to the create scenario process 292. Once the new scenario has been created, the library is updated 944 and the system selects a scenario library 948.

If the result of the scenario activity test 924 is to modify an existing scenario 928, then the system must retrieve the scenario 932 and implement changes 940 prior to updating the library 944. Again, once the library is updated 944, then the system selects the scenario library process 948. In one embodiment, the create scenario 292, implement changes 940 and parameterization 964 processes are performed during an off-line sequence and not as part of the advanced scenario-based alert generation and processing system 200.

At that point, another decision must be made as to whether or not to change thresholds 952. If thresholds are not changed 956, then the system proceeds to apply scenario library 972. If thresholds are changed 960, then the system may allow the user to enter parameterization 964 and values may be entered/saved 968 prior to applying the scenario library 972.

Figure 10:
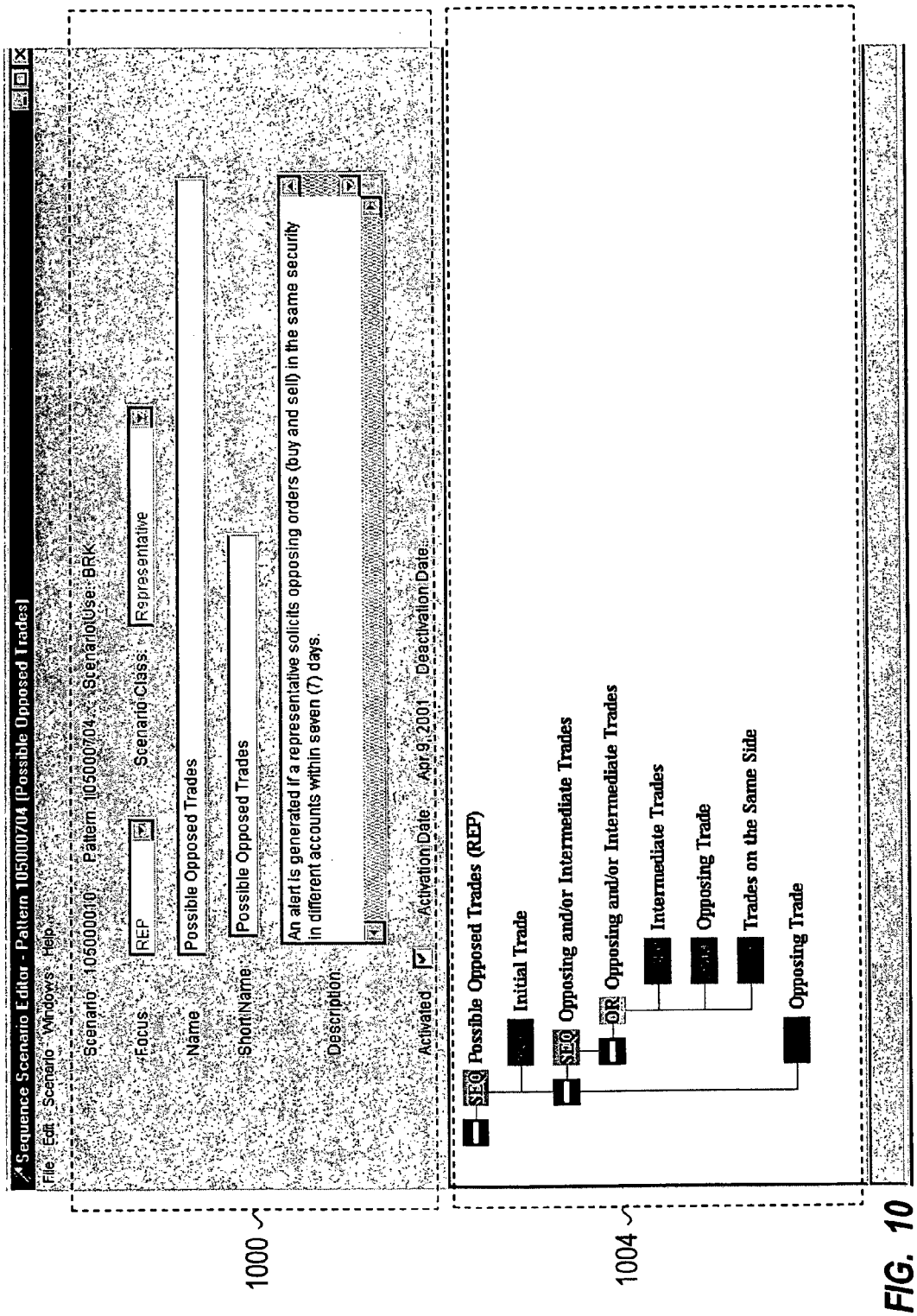
FIG. 10 illustrates a graphical user interface for a sequence scenario editor.

FIG. 10 represents one example of a scenario from the scenario library 948 displayed by a graphical user interface. FIG. 10 describes the selected scenario and provides a high-level description of the process flow that the advanced scenario-based alert generation and processing system 200 may execute. Scenario editor descriptive elements 1000 may contain information used to describe a particular scenario that is being considered. Certain sub-fields may be fixed and provided by the system, such as "Pattern" and "Scenario Use," whereas the remaining fields may be modified to provide additional information on the particular scenario. Scenario representation 1004 may describe the associated scenario by providing information on the process, steps, loops or other elements be involved in a particular application. In the example shown in FIG. 10, scenario representation 1004 may illustrate the advanced scenario of possible opposed trades in which a broker (the focus) may be soliciting both buy and sell orders on the same security, an unethical and therefore unacceptable (to the NASD) behavior. Scenario representation 1004 shows that an initial trade for a security is registered. Once that initial trade has been completed, opposing and/or intermediate trades may be reviewed to identify if those trades have been on the same security.

Figure 11:
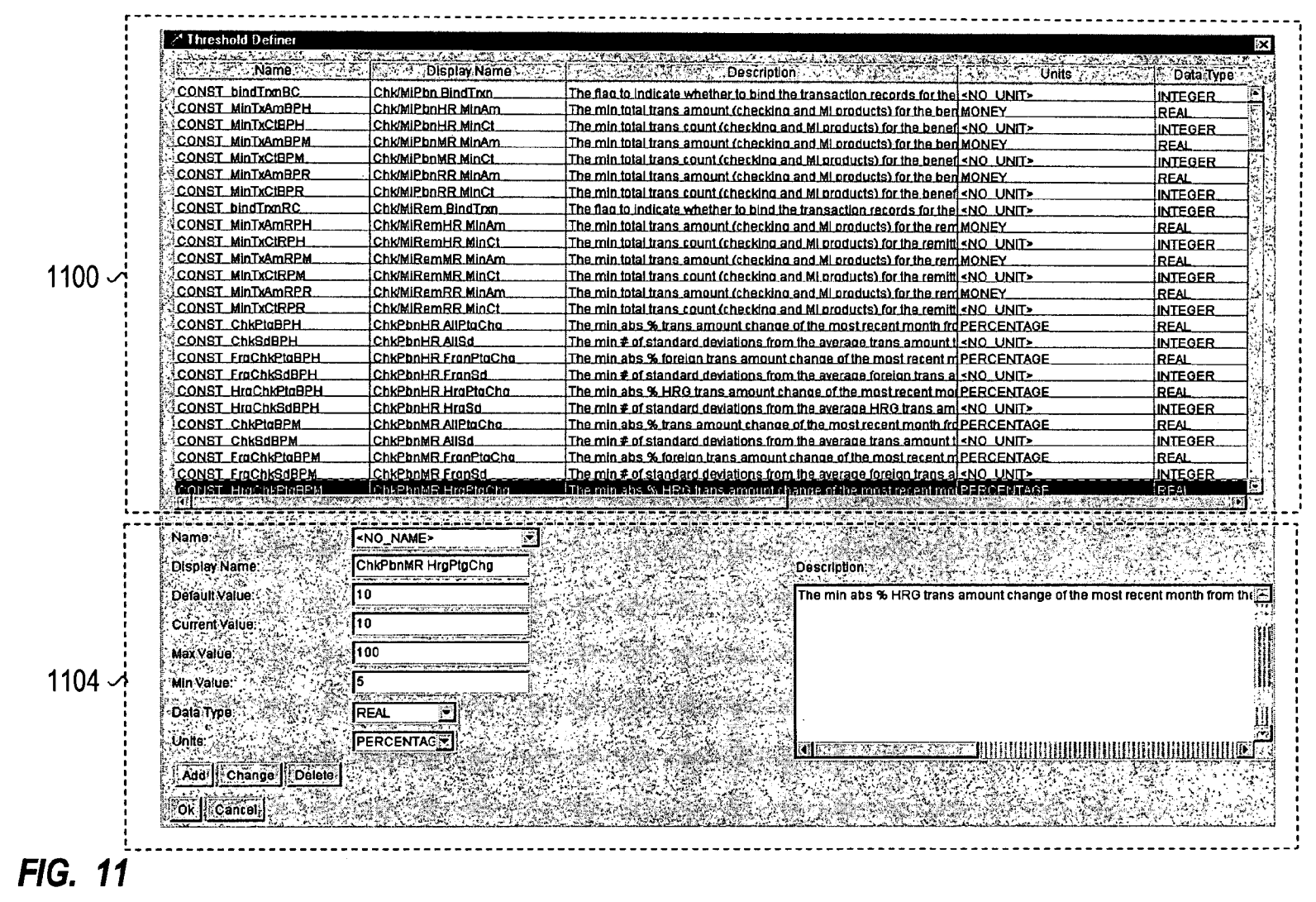

FIG. 11 depicts exemplary parameter values at the parameterization step 964. Parameter elements 1100 may provide a list of variables within the appropriate scenario. Furthermore, parameter elements 1100 may provide additional information, including, but not limited to "Name", "Display Name", "Description", "Units" and "Data Type" to more fully describe the variable, its attributes and its use. Threshold parameters 1104 may provide a user 128, developer 104, domain expert 108 or administrator 136 with the ability to modify or change threshold or parameter values associated with underlying variables. As an example, the thresholds and parameters that can be modified in threshold parameters include name, display name, default value, current value, max value, min value, data type and units. Sub-field elements may also contain drop down menus to simplify use. By highlighting a row within parameter elements 1100, the associated information may then be retrieved and displayed in the threshold parameters 1104 section.

A basic scenario is a simplified approach to defining events and entities that are known to be indicative of a behavior of interest. Basic scenarios typically have a single type of event or entity, or a small number of events and entities that operate on a set of data to determine if the scenario of interest is present. An example of a basic scenario is an exception report. An exception report flags individual transactions and simply produces a list of transactions abstracted from the context in which they occurred. Evaluation of the exceptions based solely on the information provided in the exception report is difficult and in some cases impossible.

Basic behavior detection is a method of detection that hinges on the observance of a single event or a simple aggregate of events. As an example, basic behavior detection of money laundering could be performed by defining a basic money laundering scenario of "all cash transactions over $10,000" and generating an exception report indicating all of those transactions. One difficulty with implementing this approach is that the exception report would merely indicate all events fitting that particular basic scenario definition and would inherently have a high false alarm rate. In the example given, many, if not all of the transactions identified would be legitimate and not indicative of fraudulent behavior.

Figure 12:
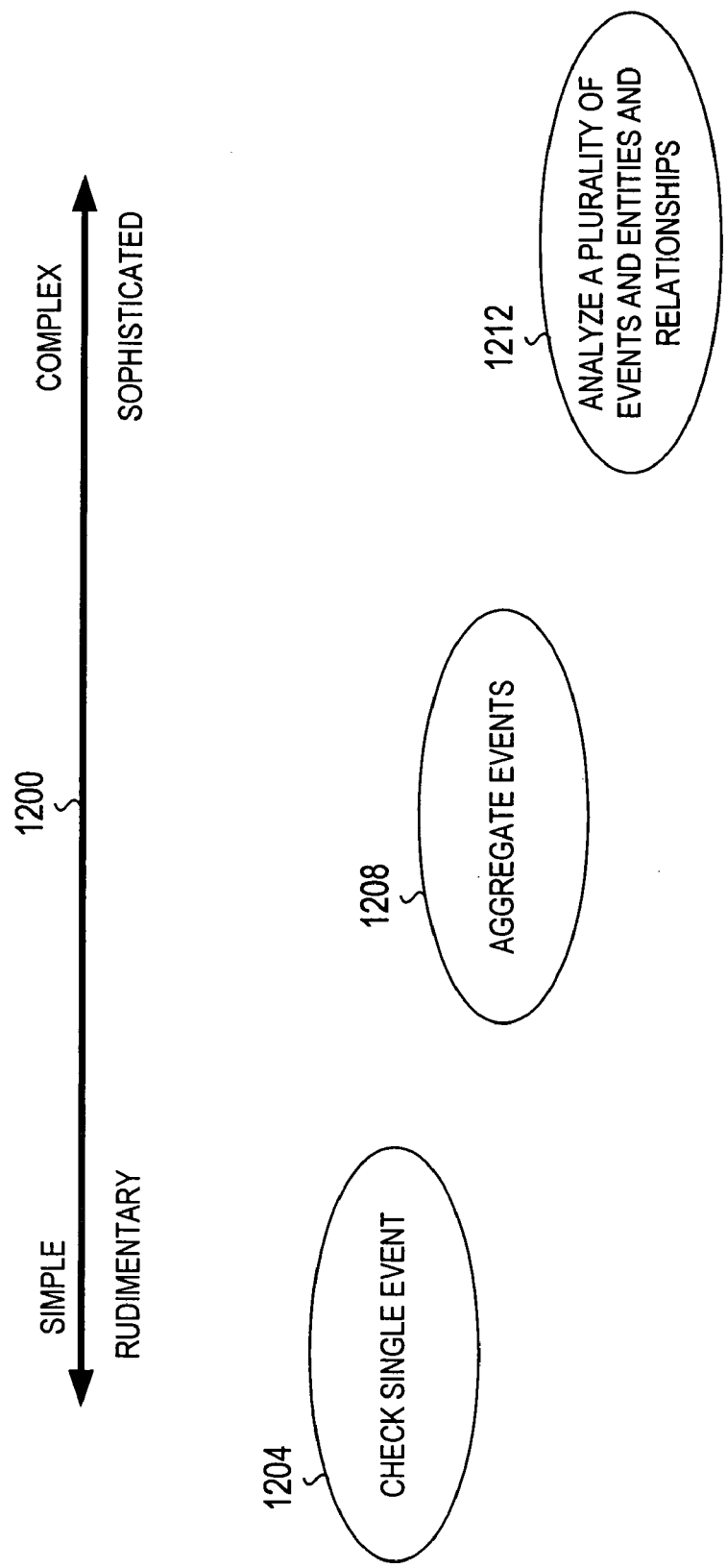
FIG. 12 illustrates a range of complexity in behavior detection problems.

FIG. 12 represents a scale of complexity for behavior detection. Scale 1200 represents the spectrum of simple detection using rudimentary approaches to complex detection using advanced scenarios. Checking a single event 1204 represents solutions based on the evaluation of a single data event or transactions in assessing behavior. Examples include, but are not limited to, currency transactions above a certain size, phone calls made by a consumer above/below certain thresholds or web site visits to a particular site. Filtering or other approaches may identify behaviors, activities or events of interest based on a single criterion, but the reliability with which the behavior is detected will typically be low. Aggregate events 1208 represent approaches incorporating the use of multiple event tests for determining behavior, activities or events of interest. An example could be to identify customers whose total purchases equal a certain threshold during a period of time. This would then aggregate all customer purchases by a customer to identify those customers whose behaviors are of interest.

Other basic scenarios for fraud might include premature IRA distribution, identifying entities or account holders that are high-risk or are in high-risk geographies, and other such scenarios or attributes that are known to be indicators of the specified behavior. Although these basic scenarios may be useful in identifying the behavior of interest, those committing the behavior are often aware of the basic scenarios, and they may modify their behaviors, actions and activities to avoid detection.

An advanced scenario creates a rich package of information that allows the behavior of interest to be observed or investigated in context. An advanced scenario may contain the elements of focus, highlights and specific events and entities. In the embodiments, an advanced scenario may also include parameterized logic.

A focus is a centralized event or entity upon which the behavior may be further investigated. As an example, a customer that is suspected of laundering money may form a focus. Another example would be a central account that is linked to a number of other accounts. Although all of the accounts would be subject to investigation and tied to the alert, the focus is the central account. An illustration of the presentation of focus is shown in the focus column 441 of alert list 404 as shown in FIG. 4.

Highlights are summarizations of the events and entities involved in an alert representing a behavior. An example would be the total dollar amount passed through an account or the total number of transactions in that account. A highlight summarizes and specifically points out why a set of events, a set of entities or a set of events and entities is of interest, but does not list those specific events and/or entities. An illustration of the presentation of highlights is shown in the highlights column 446 of alert list 404 as shown in FIG. 4.

An advanced scenario links the alert to the specific events and entities that have resulted in the generation of that alert. An example would be a set of accounts that are allegedly part of a money laundering ring (entities) and the deposits into and withdrawals from those accounts (events). An illustration of the specific events and entities that may result in the generation of an alert are shown in alert details 504 of FIG. 5.

An advanced scenario contains logic that determines whether or not a match and alert may be generated. This logic contains parameters, accessible to the user 128 or administrator 136 through a user interface that may be varied to set a threshold or vary a rule to generate a match and alert. An example of parameterized logic is "a money laundering ring must include x different accounts and y different transactions." In this example, x and y could be set to 3 and 40 respectively, and those values would be altered, by a machine or a user, based on the number of false positives generated. An illustration of parameterized logic is shown in the threshold parameters section 1104 of FIG. 11.

Advanced behavior detection requires the analysis of a plurality of events and entities, and the relationships between events, between entities or between events and entities. As an example: a drug dealer wants to get large amounts of cash into the banking system, but knows that if he/she deposits cash, the bank will file a government form on him/her. To avoid detection the dealer decides to buy money orders with the cash because money orders are regulated less rigorously. The dealer also knows that if he/she buys $3,000 or more in money orders at one time, the dealer has to supply a personal identification. To avoid this the dealer travels around to several convenience stores, and at each the dealer buys five $500 money orders. The dealer then deposits all the money orders at the bank, but to avoid suspicion, the dealer makes the deposits at several branches over several days into several accounts. The dealer later consolidates the money into one account and wires it to an account in the Cayman Islands. The dealer used several bank accounts that on the surface looked independent (e.g., by using different names, addresses, etc.), but were in fact controlled by one person in order to launder money. The serial numbers on his money orders also were in sequential groups of five. Even if these were deposited into separate accounts, the repeating sequences of five $500 money orders could point to someone trying to stay below the $3,000 ID threshold if the relationship among the deposits is detected. One embodiment of the invention uses link analysis and sequence matching algorithms designed to find hidden relationships among events and entities. Link analysis takes pairs of linked entities and pieces this information into larger webs of interrelated entities. Sequence matching is employed when the sequence of events (such as the time sequence) contains some important clue into hidden relationships. Many of the most insidious scenarios may only be solved with this type of complex analysis because the behavior is spread over many events over multiple entities over a range of time.

The use of advanced behavior detection 1212 is illustrated in FIG. 12 wherein a plurality of events and entities are monitored, and wherein the relationships between those events and entities may be tabulated, analyzed and monitored using algorithms as described herein. Alerts may be generated based on the events and entities monitored, and the alert reporting may include references to these specific events and entities such that the details of those events and entities may be readily accessed.

One way of viewing advanced behavior detection is an n-dimensional approach in which several types of events and entities are simultaneously considered across at least products and lines of business in order to identify the behavior of interest. The advanced behavior detection may be based not only on the events and entities that are known to be indicative of a behavior of interest, but also on the relationships, whether temporal or spatial (e.g. physical or electronic location) between those elements.

Figure 13:
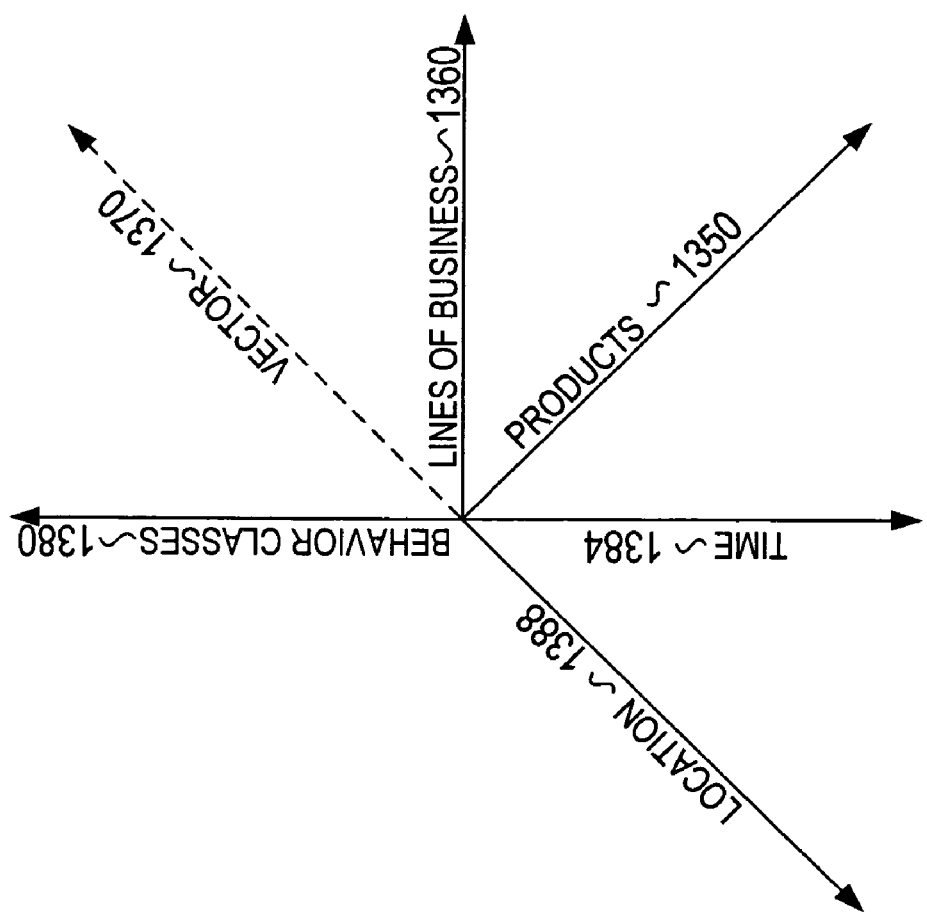
FIG. 13 illustrates an n-dimensional space describing the problem of behavior detection.

FIG. 13 illustrates an n-dimensional representation of the problem of behavior detection. Time axis 1384 represents the time at which an event occurs. Location axis 1388 represents the virtual or physical location of an entity or an event. Products axis 1350 may relate to a variety of goods or services with examples including, but not limited to, financial services, telecommunications, healthcare and consumer goods. As an illustration, products axis 1350 for the financial services industry may include equity, bonds, commodities and/or options; for the telecommunications industry it may include data, wireless services, land-line and/or pager services; for the healthcare industry it may include MRI, X-ray, office visits and/or blood work; and for the consumer goods industry it may include food, cosmetics, over-the-counter medicines and/or jewelry. Lines of business axis 1360 may be defined as the type of business involved. Examples include, but are not limited to, retail, wholesale, private and institutional types of business. Behavior classes axis 1380 represents a range of behaviors that is of interest. In the case of financial services these behaviors may include fraudulent behavior, money laundering or other licit or illicit activities. In the case of health care or insurance, the behavior of interest may also include fraudulent behavior. Although fraudulent behavior is frequently the behavior of interest, positive behaviors may also be specified. The vector 1370 of FIG. 13 represents one or more additional vector(s) that may be created or used to provide an additional dimension for identifying targeted behaviors of interest. As an example, vector 1370 could be, as applied to health care, the provider type, with the provider type being doctor, medical device, pharmaceuticals and non-doctor service.

Referring to FIG. 13, events and entities lie somewhere within the n-dimensional space described by the basis vectors. A basic behavior may be understood to be a single point or clustered set of points in the n-dimensional space. Basic behavior detection is the process of locating the points of interest. Advanced behavior may be understood to be a complex set of points in the n-dimensional space, not necessarily in close proximity. Advanced behavior detection is the process of identifying those points by examining the relationships among those points and mapping those relationships to the advanced scenario.

FIG. 14A illustrates a data transformation process that may be applied to the advanced scenario based alert generation and processing system 200. System A 1400, system B 1404 and system C 1408 represent external data sources or information systems containing raw or pre-transformed data. For illustration purposes, FIG. 14A represents these three systems, although the data transformation process may access data from any number of data sources or information systems. Transfer 1436 represents an exchange interface that transfers raw data 208 from the data source(s) or information systems to a consolidation/standardization process 1412 where the data is converted to a consistent format. Transfer 1416 represents the transfer of the transformed data 212 to a data mart 1420 where the transformed data 212 is stored. Data mart 1420 may include a storage device and a database application in which the transformed data 212 may be stored, retrieved and analyzed. Process 1428 represents manipulation of the transformed data 212. Flat file 1424 represents a pre-processed set of data that already conforms to the data format required by the system and does not need to go through the transfer step 1436. Flat file 1424 may be stored in the data mart 1420 through interface 1432. This description represents one possible embodiment of the invention for transferring raw data into a defined data model wherein transformed data 212 may be accessed.

Figure 14B:
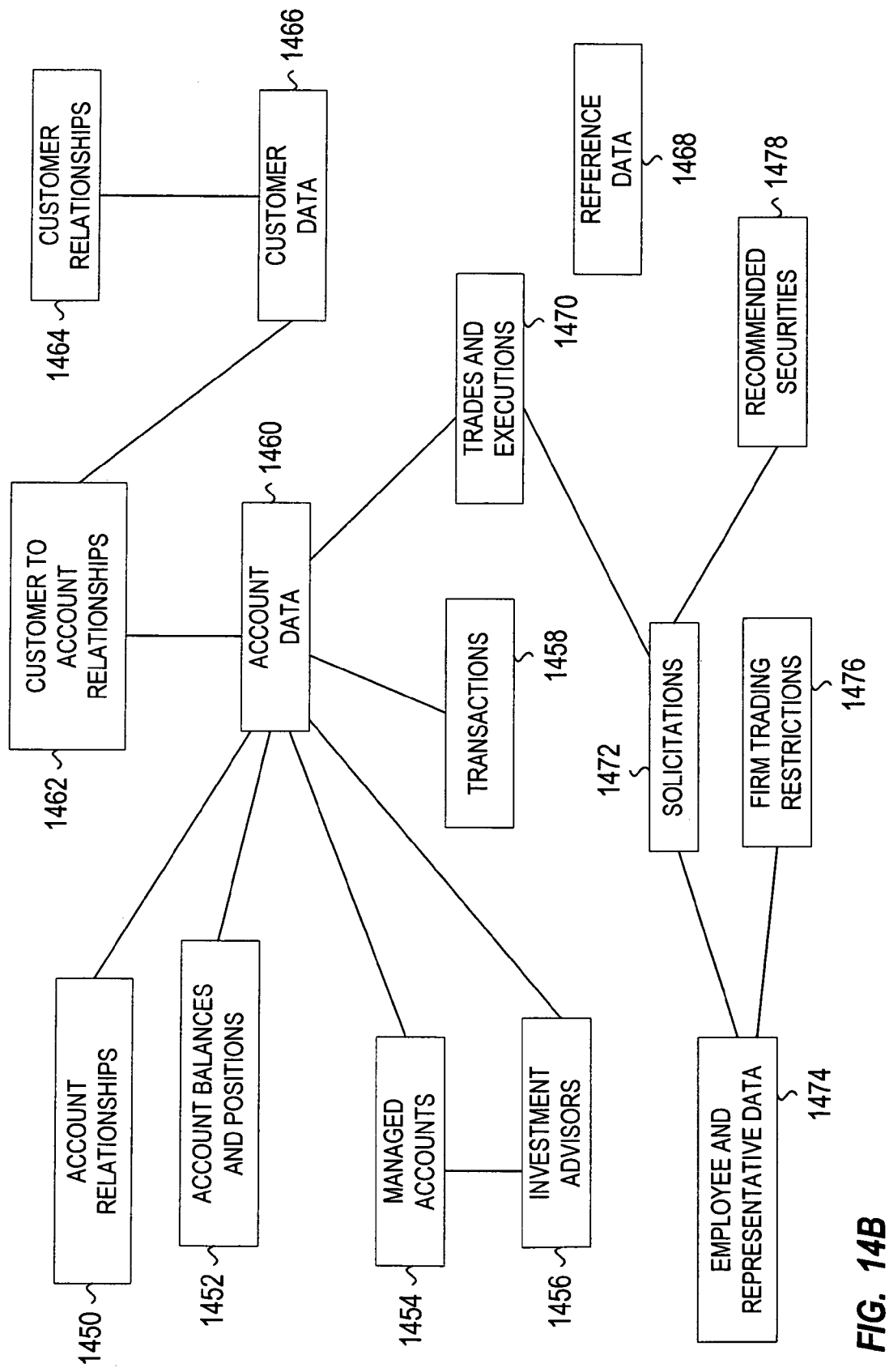
FIG. 14B illustrates representative tables involved in a data transformation process.

FIG. 14B is representative of tables involved in the data transformation 340 process. The table configuration and extracted data may vary depending upon the specific scenario or analysis being performed. FIG. 14B is representative of information that is extracted and transformed for a particular situation or purpose. Other types of tables, extracted data and associations may be used as part of the data transformation 340 process. In one embodiment, account relationships table 1450 may contain information such as account restrictions, relationships between accounts and servicing organization(s) for the account. Account balance and position table 1452 may contain information such as current balance, current positions, group, investment objectives, option pairing and features. Managed accounts table 1454 may contain information such as accounts managed by advisor, knowledge and approval. Investment accounts table 1456 may contain information such as advisor, objectives, level of authority and accounts managed. Transactions table 1458 may contain information such as open trade executions and electronic transfer of funds. Account data 1460 may contain information such as the account holder's name, address, social security, phone number, email address and group. Customer to account relationship table 1462 contains information such as relationships between customers and accounts, roles that customers can assume and anticipated transaction profile. Customer relationship table 1464 contains information such as relationships between customers, trading restrictions, product knowledge and experience. Customer data table 1466 may contain information such as customer name, gender, age, employer and income level. Reference data table 1468 may information such as news, exchanges, indexes, code translator, history of changes, customers with controlling interest, lists of customers, security, users, logon, list and type. Trade and execution table 1470 may contain information on completed transactions and electronic transfers. Solicitations table 1472 may contain information on securities approved for solicitation and buy/sell orders for securities approved for solicitation. Employee and representative data table 1474 may contain information on employee, representative and non-representative names, addresses, emails, groups, phone numbers, trading restrictions, organizations, relationships, locations and non-trade activities. Firm trade restrictions table 1476 may contain information on employees with trading restrictions, securities watchlist and watchlist sources. Recommended securities table 1478 may contain a list of securities that a firm is recommending, inventory lists, pending transactions in recommended securities, transaction histories of recommended securities and records of agents or brokers involved in the transaction of recommended securities. These tables or databases may be developed in a variety of computer-based languages or applications including, but not limited to, Java, C, C++, Access, dBase and products offered by Oracle and Sybase. Also, the field names may be customized to meet individual preferences, and the structure of the tables may be constructed to account for different possible implementations. The tables represented in FIG. 14B are extracted from data contained in transformed data 212.

Link analysis provides the ability to transform customer-to-customer business activities from a data representation where they appear as individual activities between customers, to a third-party network representation where they become group activities confined in each third-party network. One advantage of link analysis is that group behaviors become more evident, and therefore they are more effectively and efficiently analyzed in a third-party network representation since each group of customers connected through customer-to-customer activities becomes a single object in the network representation. The new network representation forms a third-party network platform.

Figure 15:
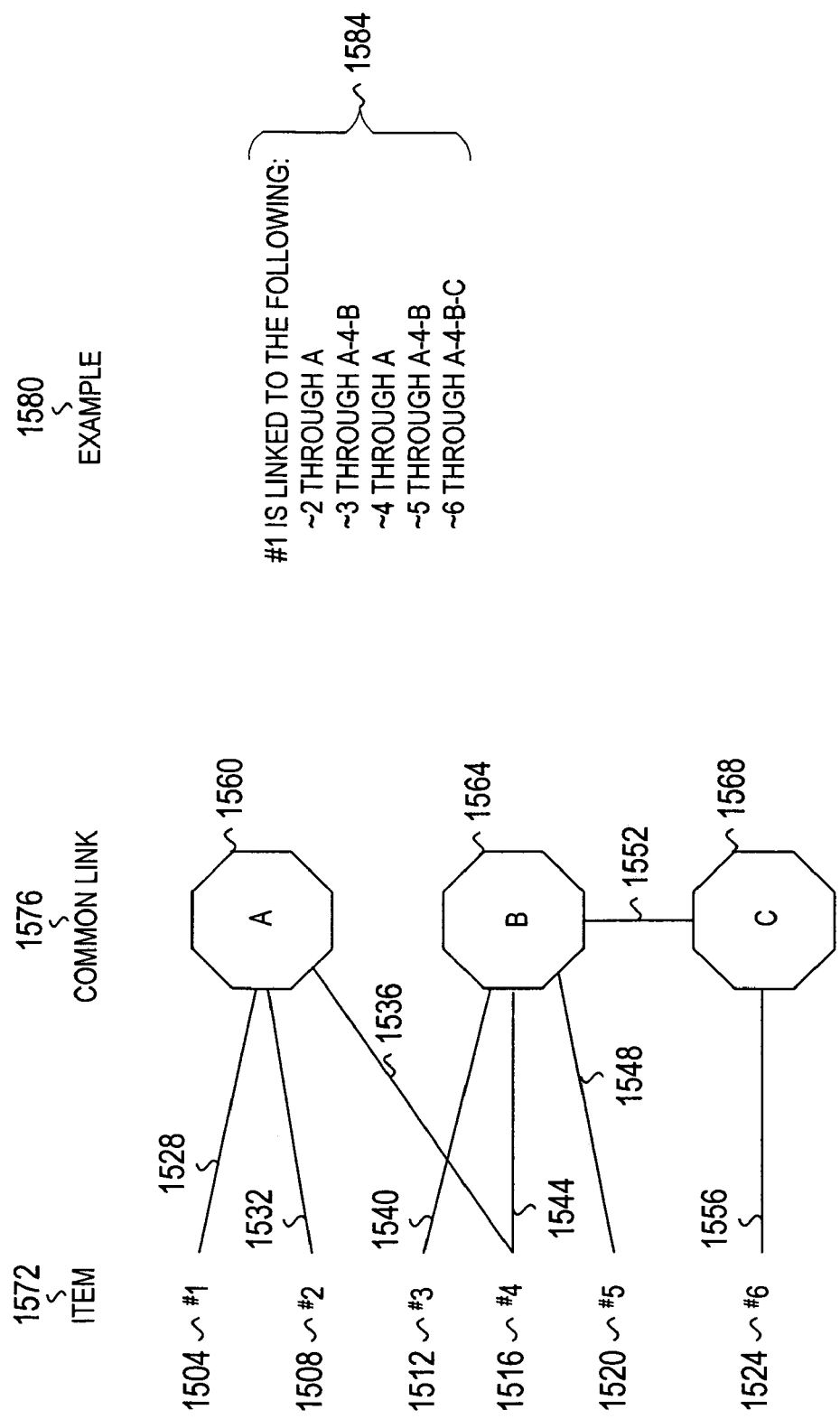
FIG. 15 is a representation of link analysis.

FIG. 15 illustrates a link analysis algorithm. Item 1572 is a descriptive element for a variety of possible categories including, but not limited to, account, entity, transaction or individual. Common link 1576 is also a descriptive element for a variety of possible categories including, but not limited to, account, entity, transaction or individual. Example 1580 is another descriptive element providing a specific description of linkages based on the information provided in the diagram.

Item numbers #1 1504, #2 1508, #3 1512, #4 1516, #5 1520 and #6 1524 represent similar categories for which behavior detection techniques and analysis are to be performed. Common link 1576 categories A 1560, B 1564 and C 1568 represent similar categories for which behavior detection techniques and analysis are to be performed. Line 1528 illustrates a link between #1 1504 and A 1560. Line 1532 illustrates a link between #2 1508 and A 1560. Line 1540 illustrates a link between #3 1512 and B 1564. Line 1536 illustrates a link between #4 1516 and A 1560. Line 1544 illustrates a link between #4 1516 and B 1564. Line 1548 illustrates a link between #5 1520 and B 1564. Line 1552 illustrates a link between B 1564 and C 1568. Line 1556 illustrates a link between #6 1524 and C 1568. Descriptive field 1584 describes the link between #1 1504 and all other descriptive items 1572 through the various common link 1576 connections.

A network detection algorithm, such as link analysis, may be utilized to identify common elements between a plurality of events, entities and activities. As the associations extend beyond the original sources, the link analysis may identify common elements through direct or indirect association among the various events, entities and activities. Elements of interest may be retrieved, collected or processed from a general data source and may be stored in a separate database or dataset. As additional elements are evaluated, the matches and the link between matching elements may also be stored. This process may continue for the various elements and data sources.

Link analysis may be understood from the following example: if two accounts (A&B) were registered in different names but had a common address, then the network detection algorithm would link the two accounts because of the matched address as a result of the direct connection. If another account were introduced (Z) which shared the same phone number as account A, then accounts A and Z would be linked through that direct association. In addition, accounts B and Z would be linked through their indirect association via account A. The network detection algorithm may be applied on a variety of elements, fields, datasets and databases in identifying connected, directly or indirectly, events, activities and entities. By creating and storing matches between elements, network detection algorithms may be able to extract data from a general data source in identifying events, entities and activities that have either direct or indirect associations.

A specific link analysis algorithm is presented in the co-pending, commonly-owned patent application entitled "Analysis of Third Party Networks," the inventors of which are Tao Zhang and Steven Kirk Donoho, which was filed as a utility patent application on Jan. 13, 2003, having a serial number of 10/341,073, and which is incorporated herein by reference in its entirety, but is not admitted to be prior art. In addition, representative code corresponding to a link analysis method is provided below in the section entitled "Representative Code."

FIG. 16 illustrates the functionality of the sequence matching detection algorithm. FIG. 16 provides three examples: example #1 1600, example #2 1604 and example #3 1608. Under example #1 1600, there is a descriptive element 1612, along with data sequence 1616, followed by sequence matches 1620, 1624 and 1628 that meet the test criteria established in descriptive element 1612. Under example #2 1604, there is a descriptive element 1632, along with data sequence 1636, followed by sequence matches 1640, 1644 and 1648 that meet the test criteria established in descriptive element 1632. Under example #3 1608, there is a descriptive element 1652, along with data sequence 1656, followed by sequence matches 1660, 1664, 1668, 1672 and 1676 that meet the test criteria established in descriptive element 1652. This detection algorithm is particularly useful when evaluating events, activities or behaviors in a certain sequence.

Sequence detection and matching algorithms analyze data for specific time-based patterns. As the data is analyzed, potentially significant and meaningful data may be temporarily stored in a separate database until further analysis of the remaining data stream(s) may be completed. Since a sequence detection algorithm analyzes data for specific time or occurrence sequencing of events, activities and behaviors, the detection algorithm may analyze the entire dataset and save potential matches until its rule-based approach determines whether the temporarily stored data meets the sequence detection requirements. If a particular sequence of events, activities or other behaviors have met established constraints, then a match may be confirmed and the complete dataset capturing the events, behaviors and activities of interest may be saved at which point an alert may be generated. If the analyzed data does not meet the established constraints, then the temporarily stored data may be discarded with no alert being generated. In addition, sequence detection algorithms may be used not only to identify events, activities or behaviors that have occurred, but also to identify ones that have not occurred.

Representative code corresponding to a sequence detection method is provided below in the section entitled "Representative Code."

Figure 17:
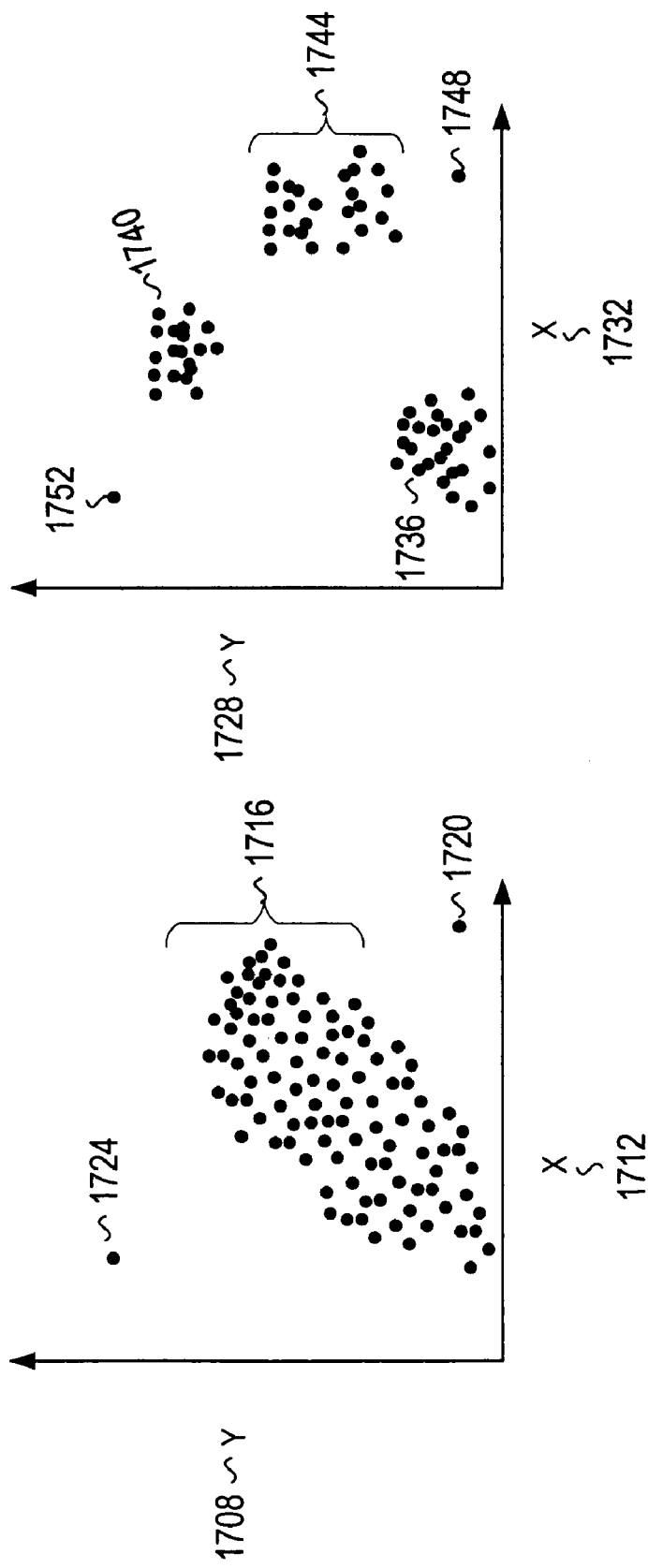
FIG. 17 is a representation of outlier detection.

FIG. 17 illustrates examples of outlier detection algorithms. Example #1 1700 and example #2 1704 provide two such specific examples of this algorithm, which is not an exhaustive list of potential examples. Under example #1 1700, Y-axis 1708 and X axis 1712 define the parameters for the data. Cluster 1716 represents various data points based on the Y-axis 1708 and X-axis 1712. Datapoints 1720 and 1724 represent outliers that are significantly beyond the cluster 1716. In example #1 1700, an approach to detect outliers may be to use statistical analysis and regression modeling to identify points which are statistically significant (i.e., beyond several standard deviations away from the mean). Example #2 1704 includes Y-axis 1728, X-axis 1732, clusters 1736, 1740 and 1744 with datapoints 1748 and 1752. In example #2 1704, traditional statistical analysis and regression analysis may not be effective. The clustering effect would create a higher standard deviation and make it more difficult to detect outliers. Another approach, especially when used when multiple clusters are present, is to compare distances between data points within a cluster first and then compare that information with other points outside the clusters to determine whether or not they are outliers. In example #2 1704, cluster 1744 is relatively close to datapoint 1748. As such, in example #2 1704, the only outlier identifiable is datapoint 1752 which is significantly separate from plotted clusters. In either example, outliers represent behaviors, activities or other events well beyond the average, mean or other benchmark calculation.

Representative code corresponding to an outlier detection method is provided below in the section entitled "Representative Code."

Algorithms for link analysis, sequence matcher, outlier detection, rule pattern, text mining, decision tree and neural networks are commercially available from a variety of vendors, including, but not limited to SAS Institute and their Enterprise Mining application, SPSS Inc. and their Predictive Analytics™ application, International Business Machines (IBM) and their DB2 Intelligent Miner™ application, Visual Analytics and their VisuaLinks™ application and NetMap Analytics with their NetMap™ Link Analysis application with these various applications containing software and algorithm technologies.

As matches are identified through the detection algorithm analysis, the matches may be prioritized based on a rules-based methodology. Identified events, entities or transactions of interest may be evaluated based on user defined logic to determine the relative prioritization of the match. The prioritization value may be saved with the match. In addition, the invention may group events, activities and transactions prior to transferring the alert into the routing and workflow process. The prioritization and grouping operations may be performed based on pre-defined criteria including parameters related to amounts, number of events, types of events, geographic location of entities and events, parties involved in the events, product lines, lines of business and other parameters relevant to the type of behavior of interest. The user 128, administrator 136, domain expert 108 or developer 104 may modify these parameters. During this step, summary information of the alert and associated dynamic link to the alert details may be saved along with prioritization and grouping information.

The alert details may vary based on the event and entity of interest, but examples of such details include the account holder's name, address and phone number, account balance, amount of a transaction or series of transactions, recipient of a transfer or deposit.

Representative code corresponding to prioritization and grouping methods are provided below in the section entitled "Representative Code."

Once an alert has been prioritized and grouped, the invention allows for a computer-based approach in routing the alert and managing the workflow process for greater efficiency and effectiveness. Based on the prioritization and grouping of the alert, the invention routes the alert based on pre-determined instructions. As the alert is reviewed, investigated and processed, the invention provides highlight information and dynamic links to detailed information thereby expediting and facilitating this step. In addition, the invention stores the historical data and investigation data for later review and retrieval if necessary. The invention allows the alert to be visually presented in a variety of formats, which may be selected by the user 128, administrator 136, domain expert 108 or developer 104 and modified based on filtering elements.

Figure 18:
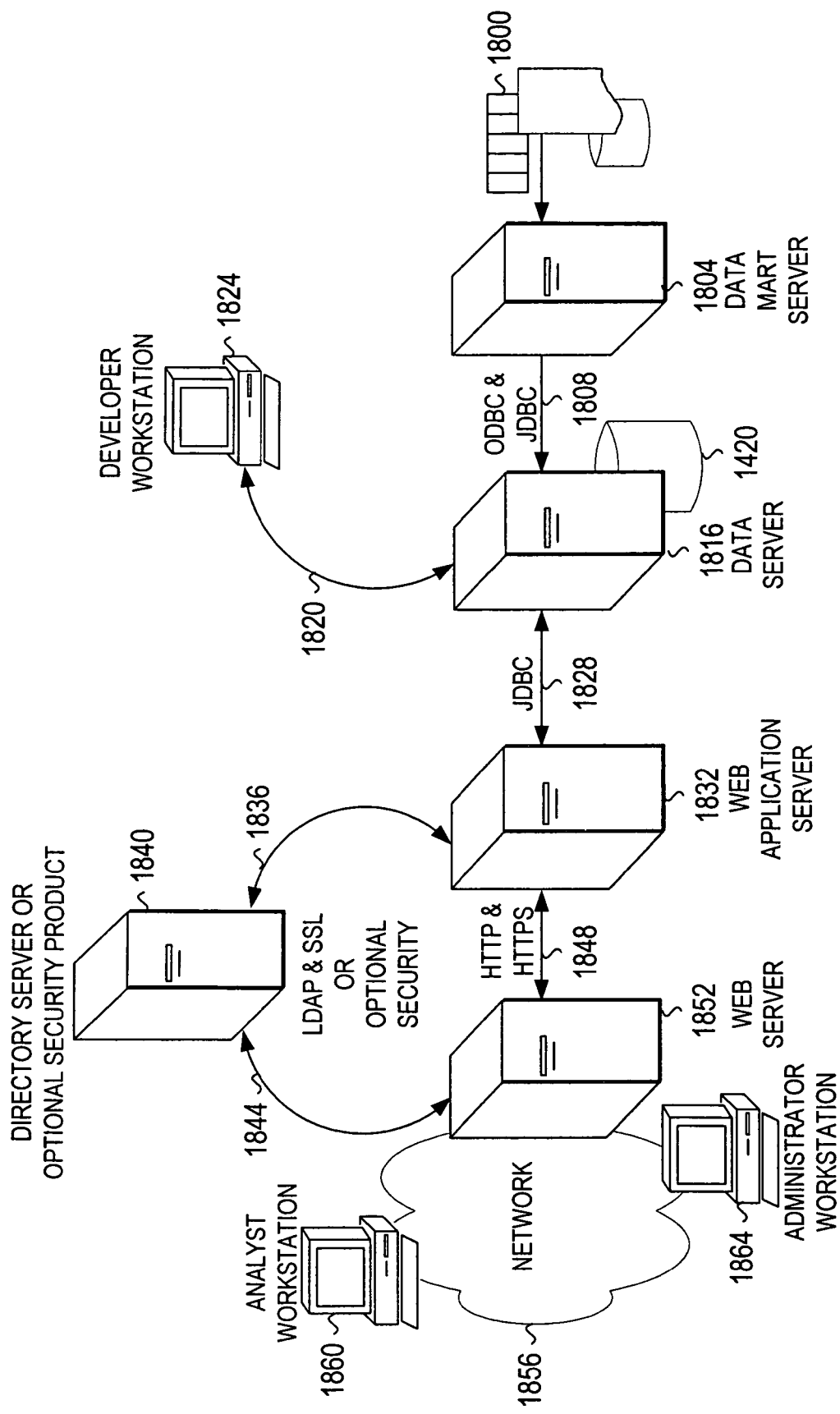
FIG. 18 represents a networked infrastructure suitable for implementation of the system.

FIG. 18 illustrates a network configuration on which the invention may be practiced. Business data 1800 may be the equivalent of the raw data 208 (pre-transformed) and may come from a variety of data sources and information systems, including, but not limited to files, queues and databases that are contained on a data server 1804. The business data 1800 may be transferred 1808 to a data server 1816 and data mart 1420. A developer interface 1820 is provided to a developer workstation 1824 enabling interaction with the data mart server 1816. Information from the data mart server 1816 may be transferred 1828 to a web application server 1832 at which point an interface 1836 to a directory server/optional security product 1840 may be available. Data between the web application server 1832 and web server 1852 may be transferred through a link 1848. The web server 1852 may have an interface 1844 to the directory server/optional security product 1840 and may connect to a network 1856. Analyst workstation 1860 and administrator workstation 1864 may be connected to network 1856.

Workstations, network connections and databases for the implementation of the system are commercially available and integration of these platforms is known to those skilled in the art. As an example of units that may be used to assemble the system, the servers described in FIG. 18 can be based on operating systems such as Solaris™, AIX™, Linux™, UNIX™, Windows NT™ or comparable platforms. Workstation and server equipment may be sourced from a variety of vendors, including, but not limited to Dell, Hewlett-Packard, IBM and Sun. The network 1856 may include an intranet, Internet, LAN, WAN or other infrastructure configurations that connect more than one workstation or server. The data mart 1420 represents database structure including, but not limited to relational or hierarchal databases which products are commercially available through vendors such as Oracle, IBM and Sybase among others, whose products sell under the trade names Oracle 8, DB2 and Adaptive Server respectively. Protocols in transferring data, commands or alerts between the workstations, servers, data sources and network devices are based on industry standards and may be written in a variety of programming languages. FIG. 18 represents one particular system configuration encompassing multiple servers. Different configurations are also possible in deploying the advanced scenario-based alert generation and processing system 200. For example, it is possible to consolidate functions thereby reducing the number of servers needed.

Figure 19:
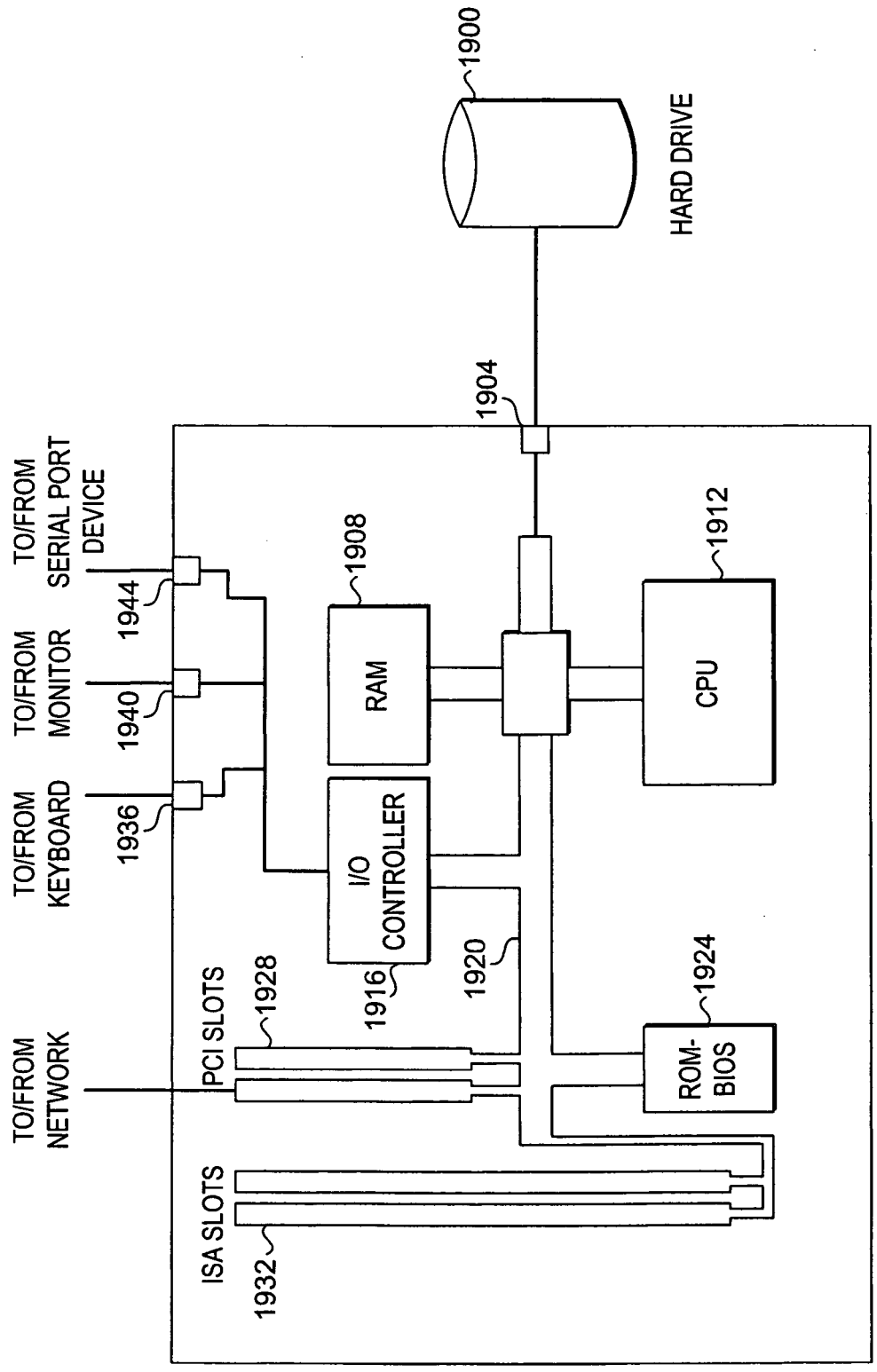
FIG. 19 represents a computer on which the system can be implemented.

FIG. 19 shows the block diagram of an exemplary computer system for a realization of the subscriber monitoring system based on the reception of multimedia signals from a bi-directional network. A system bus 1920 transports data among the CPU 1912, the RAM 1908, Read Only Memory—Basic Input Output System (ROM-BIOS) 1924 and other components. The CPU 1912 accesses a hard drive 1900 through a disk controller 1904. The standard input/output devices are connected to the system bus 1920 through the I/O controller 1916. A keyboard is attached to the I/O controller 1916 through a keyboard port 1936 and the monitor is connected through a monitor port 1940. The serial port device uses a serial port 1944 to communicate with the I/O controller 1916. Industry Standard Architecture (ISA) expansion slots 1932 and Peripheral Component Interconnect (PCI) expansion slots 1928 allow additional cards to be placed into the computer. In an embodiment, a network card is available to interface a local area, wide area or other network.

The present invention may be realized in a number of programming languages including C, C++, Perl, HTML, Pascal and Java, although the scope of the invention is not limited by the choice of a particular programming language or tool. Object oriented languages have several advantages in terms of construction of the software used to realize the present invention, although the present invention may be realized in procedural or other types of programming languages known to those skilled in the art.

FIG. 20 represents a user interface for a network alert visualization. Alert summary information 2000 may provide summary information related to the alert including focus, scenario, class, highlights, owner, organization, prioritization and the date the alert was created. Alert visualization 2004 is a graphically generated representation of the behavior, activity or event of interest. In FIG. 20, an example of networks of related accounts is provided. In the alert summary information 2000 section, a unique alert ID has been generated in order to track this event. Additional information has also been provided identifying the amount of money in question, along with the number of accounts and activities involved. As part of the case management process 356, an owner and organization have been assigned to this alert. The alert visualization 2004 section then provides a visualization of the transfers and amounts in question.

Figure 21:
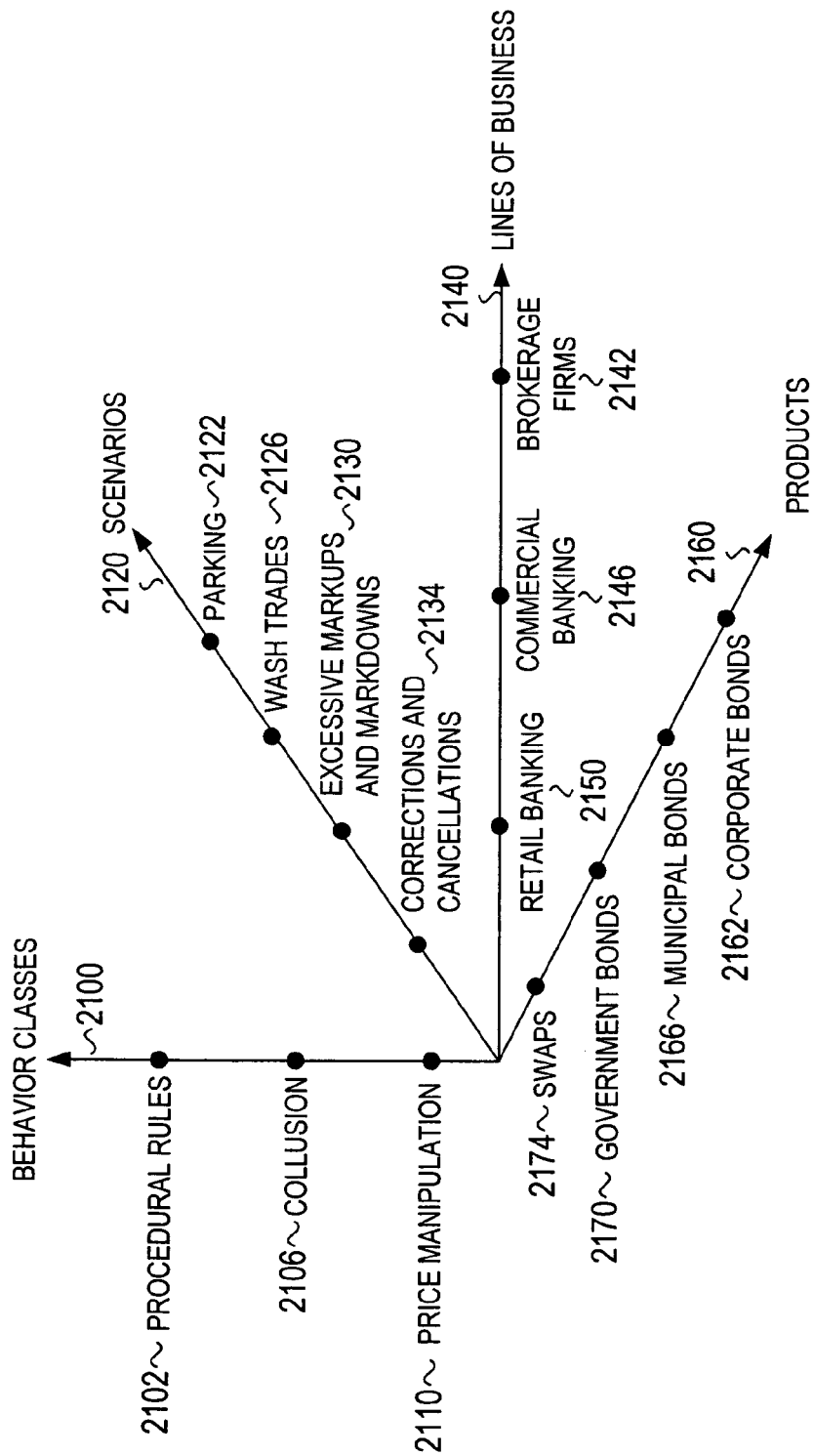
FIG. 21 illustrates an n-dimensional representation of the elements of trading compliance violations for fixed income securities.

FIG. 21 is a representation of a plurality of axes that could be used when applying the advanced scenario-based alert generation and processing system 200. The Behavior Classes axis 2100 is represented as having Procedural Rules 2102, Collusion 2106 and Price Manipulation 2110 categories. Behavior classes 2100 are a general description for a variety of activities, events or behaviors of interest that the advanced scenario-based alert generation and processing system 200 is trying to detect. The Scenarios axis 2120 represents a plurality of possible focus points in which the advanced scenario-based alert generation and processing system 200 may center its analysis and evaluation. In FIG. 21, Scenarios 2120 include Parking 2122, Wash Trades 2126, Excessive Markups and Markdowns 2130, and Corrections and Cancellations 2134. The Lines of Business axis 2140 represents a spectrum of entities in which the advanced scenario-based alert generation and processing system 200 may analyze data, events, transactions and other types of information. Examples may include, but are not limited to, Brokerage Firms 2142, Commercial Banking 2146 and Retail Banking 2150. The Products axis 2160 represents a range of goods or services that the advanced scenario-based alert generation and processing system 200 may analyze. For fixed income securities, this may include Corporate Bonds 2162, Municipal bonds 2166, Government Bonds 2170 and Swaps 2174. For behavior classes 2100, scenarios 2120, lines of business 2140 and products 2160, additional categories may be included or substituted by a user 126, administrator 138 or developer 104. The invention has the capability to analyze behaviors, events and transactions across a plurality of categories within behavior classes 2100, scenarios 2120, lines of business 2140 and products 2160. For example, the invention has the ability of analyzing products 2160, across lines of business 2140, with a focus of Wash Trades 2126 in identifying Collusion 2106 activities. As the transformed data 212 is accessed, detection algorithms 228 applied and the match generation 404 process performed, an n-dimensional graph may be created based on a plurality of axes as illustrated in FIG. 21. By so doing, the invention may apply a variety of tests in identifying events, transactions and behaviors of interest through plot, outlier or vector analysis techniques.

The following section describes unique and advanced capabilities in detecting behavior, activities and entities of interest primarily for the purposes of detecting trading compliance violations for fixed income securities. These descriptions represent complex methods for identifying transactions, patterns, behaviors and events associated with illegal activities. Some or all of these advanced scenarios may be contained in the scenario library 284, which is part of the advanced scenario-based alert generation and processing system 200.

The many features and advantages of the invention are apparent from the detailed specification. Since numerous modifications and variations will readily occur to those skilled in the art, it is not desired to limit the invention to the exact construction and operation illustrated and described. Accordingly, all appropriate modifications and equivalents may be included within the scope of the invention.

Representative Code

The following text represents code that is representative of preferred embodiments of various functions and features described above. The description set forth below is only exemplary and the invention is not limited to the specific description set forth as representative code.

Link Analysis/Network Detection

Read input parameters: One or more datasets, list of internal node characteristics, description of external node characteristics, logic constraints.

For each dataset:
Read a row consisting of a From node, a To node and a Link Type
If one of the existing networks contains either the From node or To node, then add this row to that network.
If one existing network contains the From node and a different existing network contains the To node, then merge those two networks and add this row to the merged network.
If no existing networks contain either the From node or To node, then create a new network consisting solely of this row.
Return to "Read a row" step until all rows are read from all datasets.
Examine each network that has been constructed; if it does not meet the minimum size parameter; delete it.
For each remaining node, if the node is of a prunable type and is only linked to one other node, discard it and all links associated with it.
Examine each remaining network; if it does not meet the minimum size parameter, delete it and all links and nodes that are members.
For each network: Capture Internal Characteristics (e.g., Number of nodes in the network, ID of the Primary Node in the network, Number of nodes to which the Primary Node is linked, Primary Node total measure (sum of the weight of the links associated with the Primary Node, both incoming and outgoing links), Primary Node incoming measure (sum of the weight of links with directionality into the Primary Node), Primary Node outgoing measure (sum of the weight of links with directionality away from the Primary Node), Number of links in the network, Average weight of the links in the network, Maximum weight of a link in the network, Earliest timestamp of a link in the network, Latest timestamp of a link in the network, Number of links with directionality into the Primary Node, Number of links with directionality away from the Primary Node, Number of links associated with the Primary Node with no directionality, Business ID of the Primary Node).

For each network: Capture External Characteristics. These are characteristics of the network that can only be measured by accessing external data sources in conjunction with the network nodes.
Compare each network against Logic Constraints.
Create a match for each network that matches the Logic Constraints.
Output all Matches.

Sequence Detection

Read input parameters: One or more Datasets, Sequence pattern. Sequence pattern consists of:
A Top Level Sequence Node. The Top Level Sequence Node contains a "Longest/Shortest" flag that tells whether the longest or shortest match found should be saved. The Top Level Sequence Node may contain a "Distance Range" that specifies the time range within which the matched rows must fall.
Sequence Nodes have one or more child nodes. The node types of these children may be: another Sequence Node, an Or Node or a Row Node.
Sequence Nodes may contain a "Looping Range" that specifies how many times the Sequence may match.
Or Nodes may have one or more child nodes. The node types of these children may be: a Sequence Node, another Or Node or a Row Node.
Row nodes contain the following parameters:
A dataset to be matched ("Dataset")
A "Looping Range"
A Boolean logic constraint ("Logic Constraint")
A set of variable to bind ("Variables") and expressions for calculating the Variable's value ("Expressions")
A Record/No-record Flag
Initialize datasets
Read each Dataset. Each Dataset has a list of fields that should be used to sort the dataset.
Sort each dataset individually.
Find matches:
Select the next row to be matched. If there are multiple datasets, this is done by examining the next row in each individual dataset and picking the one with the lowest value of shared ordering attributes.
Create a Partial Match State positioned at the Top Level Sequence Node.

For each Partial Match State:

If it is positioned at a Sequence Node, create a new Partial Match State positioned at the first child node. The new Partial Match State is added to the list of States yet to be evaluated.

If it is positioned at an Or Node, create a new Partial Match State for each child node. Position each at the corresponding child node. The new Partial Match States are added to the list of States yet to be evaluated.

If it is positioned at a Row Node, do the following:

Check if the dataset row comes from the same dataset as the Dataset specified in this Row Node.

If so, proceed to next step. Otherwise, continue with the next Partial Match State.

Compare the Logic Constraint to the Dataset rows contents.

If Logic Constraint evaluates to true, proceed to next step. Otherwise, continue with the next Partial Match State.

Bind all Variables to value resulting from evaluating corresponding Expression.

If Record/No-record flag is set to Record, store matched row to be output with alert.

Create new Partial Match States that point to nodes following this Row Node. If this Row Node is a child of a Sequence Node, then a new state is added positioned at the next child. If this Row Node has a Looping Range that has not reached its maximum value, then also create a new state positioned at this Row Node. If this Row Node is a child of an Or Node or the last child of a Sequence Node then also create a new state positioned after the parent node. If this Row Node the last child of a Sequence Node that has a Looping Range that has not reached its maximum value, then also create a new state positioned at the parent Sequence Node. These new Partial Match States are saved until the next dataset row is read.

If it is positioned after the last child of the Top Level Sequence Node, then create a Match consisting of matched rows and bound Variables if the time between the first matched event and the last matched event within the Top Level Sequence Node's Distance Range. If a previous Match exists that started with the same dataset row, then:

If the Top Level Sequence Node Longest/Shortest flag is set to Longest, throw out previous match and keep this match.

If the Top Level Sequence Node Longest/Shortest flag is set to Shortest, throw out this match and keep previous match.

Return to initial step, "Select the next row to be matched" unless there are no more rows to examine in any datasets.

Output all matches.

Outlier Detection

Read input parameters: Dataset and Outlier Detection Pattern. Outlier Detection Pattern consists of:

Multiple sets of one or more Dimensions ("Dimension Set"). Each Dimension is mapped to a field in the dataset.

A Target Point. This is a value for each Dimension in each Dimension Set.

A Neighborhood Size.

A Minimum Dimension Set Count.

Find matches:

For each Dimension Set:

For each row in the dataset, calculate the distance between that row and the target point (both as projected onto the Dimension Set).

Find the K rows closest to the target point where K=Neighborhood Size. These K rows compose this Dimension Set's Neighbors.

For each row in the dataset, count the number of Dimension Sets that include that row as a Neighbor.

If that count is >=the Minimum Dimension Set Count, create a match for that row consisting of the row.

Output all matches.

Rules-Based Detection

Read input parameters: Primary Dataset, zero or more Secondary Datasets, Rule pattern. Rule pattern consists of (for each dataset):

Set of Boolean logic constraints ("Logic Constraints")

A number range constraining the number of rows matched ("Rows Matched Range")

A set of variable to bind ("Variables") and expressions for calculating the Variable's value ("Expressions")

A Record/No-record Flag

A field in dataset that maps to Scenario Focus ("Focus Field")

Find matches:

Read row from Primary Dataset.

Compare Primary Dataset's Logic Constraints to row contents.

If Primary Dataset's Logic Constraints evaluate to true, then proceed to next step. Otherwise go back to "Read row from Primary Dataset" step.

Bind all Variables to value resulting from evaluating corresponding Expression.

If Record/No-record flag is set to Record, store matched row to be output with alert.

Bind Focus to value in Focus Field

For each Secondary Dataset:

Read rows from Secondary Dataset with Focus Field value matching Focus.

For each row, compare Secondary Dataset's Logic Constraint to row contents.

Count number of rows that match Logic Constraint.

If count is within Rows Matched Range, then proceed to next step. Otherwise, go back to "Read row from Primary Dataset" step.

Bind all Variables to value resulting from evaluating corresponding Expression.

If Record/No-record flag is set to Record, store matched rows to be output with alert.

Create alert. If constraint is met for Primary Dataset and Rows Matched Range is satisfied for all Secondary Datasets, then create alert consisting of Focus, recorded rows and variables.

Return to "Read row from Primary Dataset" step.

Output all alerts.

Prioritization

Read input parameters: Set of Matches, Match Prioritization Strategy Logic

For each Match in Set of Matches:

Set Match Score (MS)=0

If Scenario Lookup Strategy is included in Match Prioritization Strategy Logic, then look up Score (S) associated with this Match's Scenario. MS=MS+S.

If Simple Lookup Strategy is included in Match Prioritization Strategy Logic, then compare the value of the specified Match Binding with the associated value in the Simple Lookup Strategy. If the two are equal, then look up the Score (S) associated with the Simple Lookup Strategy. MS=MS+S.

If Graduated Lookup Strategy is included in the Match Prioritization Strategy Logic, then:
  Look up the Scoring Input Value (SIV) of the specified Match Binding.
  Read parameters from the Graduated Lookup Strategy: Lower Value (LV), Minimum Value (MIV), Upper Value (UV), Max Value (MAV)
  Compute the rise of the point value (M) between the lower and upper bounds. M=(MAV−MIV)/(UV−LV)

$MS=MS+(M*(SIV-LV)+MIV)$

If Graduated Count Strategy is included in Match Prioritization Strategy Logic:
  Read parameters from the Graduated Count Strategy: Time Window (TIM), Lower Value (LV), Minimum Value (MIV), Upper Value (UV), Max Value (MAV), Same Scenario (SS)
  Find the count (CO) of prior matches within TIM that have the same Focus as this Match. If SS is "Yes" then only include matches that are the same scenario as this Match.
  Compute the rise of the point value (M) between the lower and upper bounds.

$M=(MAV-MTV)/(UV-LV)$ $MS=MS+(M*(CO-LV)+MIV)$

Output Set of Prioritized Matches (matches may be prioritized by Match Score)

Grouping

Read input parameters: Set of Prioritized Matches, Match Grouping Strategy
  If the Match Grouping Strategy is "Bind Match" then group Matches together that have the same Focus and have the same Match Binding values for a set of Match Bindings specified in the Match Grouping Strategy.
  If the Match Grouping Strategy is "Bind Behavior Scenario" then group Matches together that have the same Focus, the same Scenario and the same Match Binding values for a set of Match Bindings specified in the Match Grouping Strategy.
  If the Match Grouping Strategy is "Single Alert Match" then each Match is its own group.
  Output groups of Matches. Groups of one are also groups.

Alert Prioritization

Read input parameters: Set of Match Groups, Alert Prioritization Strategy Logic
Each Match Group is an Alert. Set of Match Groups is Set of Alerts.
For each Alert in Set of Alerts:
  If Max Match Score is specified in Alert Prioritization Strategy Logic, then Alert Score is set to maximum of scores of matches in this Alert.
  Else if Avg Match Score is specified in Alert Prioritization Strategy Logic, then Alert Score is set to average of scores of matches in this Alert.
Output Set of Prioritized Alerts (Alerts may be prioritized by Alert Score).

Scenarios And Behaviors

Parking to Conceal Position

Scenario Objective

The prearranged transfer of a security position from one party to another with the understanding that said transfer will be reversed at a pre-arranged time and price in the future is known as "Parking." The practice is usually undertaken in order to conceal positions that, for example:
  Might have expensive or adverse capital or balance sheet implications (the latter especially across accounting periods)
  Might attract disclosure obligations
  Might breach internal trading limits Technically, "parking" does involve a change in ownership, but the rationale behind the transactions are abusive or manipulative in nature, thereby establishing regulatory concern. Parking to Conceal Position is accomplished by executing a pre-arranged sale of a security and then buying it back several days later at the same or nearly the same price.

Scenario Implementation Approach

This scenario identifies potentially prearranged transactions between a trader and another party on the basis of trades executed within a finite time window at a price equal to or very close to the original sale or purchase price. A transaction is particularly suspect if it is executed at a price close to the original sale or purchase price and such price is outside the market at the time of the purchase or sale. The scenario covers product, trade and account types that are defined in the scenario filters section. Also, the scenario coverage may be limited to certain types of trading desks. Most of the filters are tunable and their default values are documented in FIG. 22.

The scenario processes only the final version (within the current detection process) of a trade record. Therefore, the following rules are applied:
  All known corrections are applied to a trade record before processing.
  Cancelled records are excluded from processing.
  As-of trades are included in the processing.
  Trades that have a trade date greater than the current processing date ("future as-of trades") are not processed in the current detection cycle. They are included in the later processing cycle when the processing date is equal to the trade date.
  The scenario detects parking cases that might have started any time during the scenario look-back period and that end on the current processing day. Therefore, to account for trades reported late (as-ofs) and for trade corrections that might have caused parking cases, the scenario applies the following logic:
    a list of trade dates that have trades either reported or corrected on the current processing day is constructed,
    the scenario is run for each date on that list that is within the look-back period of the scenario, and
    the scenario assumes that the trade dates from the list indicate an end of the parking period.

The scenario does not apply any special rules regarding riskless principal trades. The scenario logic is defined by the following conditions:

1. The net amount exchanged on a current day between a trader and a third party account for all buy and sell trades in a given security must meet or exceed a threshold. The intent of including a condition where the net amount exchanged during the current day must exceed the Min Net Amount Exchanged threshold is to provide the ability for firms to ignore "insignificant" exchanges. This threshold may be set to Zero to include all possible parking occurrences.

$$\text{Current Day Net Amount Exchanged} = |\text{Sum of All Buys} - \text{Sum of All Sells}| \quad \text{(Eqn. 1)}$$

$$|\text{Sum of All Buys} - \text{Sum of All Sells}| >= \text{Min Net Amount Exchanged} \quad \text{(Eqn. 2)}$$

2. The total number of trades executed on the current day between the identified pair of counter parties in a given security must not exceed a specified threshold. Numerous executions between the parties during the current day are not considered evidence of Parking. The Max Current Day Trade Count threshold may be set to a very large number to bypass this condition.

$$\text{Number of Current Day Trades} <= \text{Max Current Day Trade Count} \quad \text{(Eqn. 3)}$$

3. For the remaining look-back period, excluding the current day, compute the net amount exchanged between the identified pair of counter parties for the same security.

$$\text{Look-back Period Net Amount Exchanged} = \text{Sum of All Buys} - \text{Sum of All Sells} \quad \text{(Eqn. 4)}$$

If the amounts exchanged between the counter parties during the current day and the look-back period indicate a net flow of assets in opposite directions (different signs), then compute the delta between the net amount exchanged on the current day and the net amount exchanged during the look-back period.

$$\text{Delta Between Net Amounts} = |\text{Current Day Net Amount} - \text{Look-back Period Net Amount}| \quad (5)$$

Next, compute the percentage difference of the delta between amounts exchanged and the amount exchanged on the current day.

$$\text{Percent Delta} = (\text{Delta Between Net Amounts}/\text{Current Day Net Amount}) * 100 \quad \text{(Eqn. 6)}$$

The delta between amounts exchanged should be a significant percentage of the current day net amount exchanged, and it must not exceed a specified threshold.

$$\text{Percent Delta} <= \text{Max Parking Percentage} \quad \text{(Eqn. 7)}$$

The Max Parking Percentage threshold allows a user to control how close the amounts exchanged should be. If it is set to zero, then the scenario will be looking for exactly the same amount exchanged.

4. The total number of trades executed during the look-back period, excluding the current day, between a pair of counter parties in a given security must not exceed a specified threshold. Also, the distinct number of days on which trading occurred between the two parties during the look-back period should not exceed a specified threshold. Parking cases are most evident when a small number of trades occurred during the look-back period, usually within a small date range (one or two days), and all the other conditions were satisfied.

$$\text{Number of Trades During Look-back} <= \text{Max Look-back Period Trade Count} \quad \text{(Eqn. 8)}$$

$$\text{Number of Distinct Trade Days During Look-back} <= \text{Max Trade Day Count} \quad \text{(Eqn. 9)}$$

5. The price spread between the volume weighted average price of buys (sells) on the current day and the volume weighted average price of sell (buys) during the look-back period should not exceed a specified threshold. An appropriate combination of volume weighted average prices (buys or sells) should be used, depending on the flow of assets indicated by the net amount exchanged on the current day. If the net amount indicates that a trader sold more shares to a counter party account than he bought, then the volume weighted average price of sells for the current day should be used in comparison with the volume weighted average price of buys for the look-back period.

$$\text{Price Spread} = |\text{VWAP of Current Buys (Sells)} - \text{VWAP of Look-back Sells (Buys)}| \quad \text{(Eqn. 10)}$$

$$\text{Price Spread Percentage} = [\text{Price Spread}/\text{VWAP of Current Buys (Sells)}] * 100 \quad \text{(Eqn. 11)}$$

$$\text{Price Spread Percentage} <= \text{Max Price Spread Percentage} \quad \text{(Eqn. 12)}$$

A maximum of one alert per trader and counter party pair per security per detection run is generated. Each alert contains two or more trade records that are indicative or a Parking case. If a corrected trade or As-Of trade enters the system, the scenario may use a look-back period ending on the trade date of the corrected or As-Of trade. The scenario may only allow this change if the corrected or As-Of trade occurs within a separate time window called the Max Rerun Range.

Parameters and Highlights

FIG. 22 shows the parameters for the Parking to Conceal Position scenario. FIG. 23 shows the highlights for the Parking to Conceal Position scenario.

Focal Types

Trader

Application Frequency

Daily

Look-back Period 10 days

Parking Via Settlement Date

Scenario Objective

The prearranged transfer of a security position from one party to another with the understanding that said transfer will be reversed at a pre-arranged time and price in the future is known as "Parking." The practice is usually undertaken in order to conceal positions that, for example:

Might have expensive or adverse capital or balance sheet implications (the latter especially across accounting periods)

Might attract disclosure obligations

Might breach internal trading limits

Technically, "parking" does involve a change in ownership, but the rationale behind the transactions is abusive or manipulative in nature, thereby establishing regulatory concern. Parking via Settlement Date is accomplished by executing a pre-arranged sale and purchase of a security on the same trade day, but setting different settlement dates for the trades.

Scenario Implementation Approach

This scenario identifies potentially prearranged sales and purchases of the same security between a trader and another party within a single day at prices that are equal or very close. The sale and purchase are considered to be parking behavior only if they have different settlement dates. Such transactions are particularly suspect if they are executed at prices outside the market prices for that day. The scenario covers product, trade and account types that are defined in the scenario filters section. Also, the scenario coverage may be limited to certain types of trading desks. Most of the filters are tunable and their default values are documented in FIG. 24.

The scenario processes only the final version (within the current detection process) of a trade record. Therefore, the following rules are applied:

All known corrections are applied to a trade record before processing.

Cancelled records are excluded from processing.

As-of trades are included in the processing.

Trades that have a trade date greater than the current processing date ("future as-of trades") are not processed in the current detection cycle. They are included in the later processing cycle when the processing date is equal to the trade date.

The scenario detects parking cases that are executed by a trader and another party on the same trade day. Since trades may be reported late (as-ofs) or may be corrected on days different than the original execution day, the scenario may search for parking trades on all trade days that had at least one trade executed by the trader with another party and that are either reported or corrected on the current processing day.

The scenario does not apply any special rules regarding riskless principal trades. The scenario logic is defined by the following conditions:

1. The net amount of all sell trades on the current day between a trader and a third party account in a given security must meet or exceed a threshold. Parking typically begins with a trader selling a security and buying it back later. Including such a condition provides the ability for firms to ignore "insignificant" exchanges. This threshold may be set to zero to include all possible Parking occurrences.

$$\text{Sum of All Sells} >= \text{Min Amount Sold} \quad \text{(Eqn. 13)}$$

2. The total number of trades executed on the current day between the identified pair of counter parties in a given security must not exceed a specified threshold. Numerous executions between the parties during the current day are not considered evidence of Parking. The Max Current Day Trade Count threshold may be set to a very large number to bypass this condition.

$$\text{Number of Current Day Trades} <= \text{Max Current Day Trade Count} \quad \text{(Eqn. 14)}$$

3. Compute the percentage difference between the net amount sold and the net amount bought on the current day.

$$\text{Percent Delta} = |\text{Sum of All Buys} - \text{Sum of All Sells}| / \text{Sum of All Sells} * 100 \quad \text{(Eqn. 15)}$$

The delta between amounts exchanged should be a significant percentage of the net amount sold on the current day, and it must not exceed a specified threshold.

$$\text{Percent Delta} <= \text{Max Parking Percentage} \quad \text{(Eqn. 16)}$$

The Max Parking Percentage threshold allows a user to control how close the net amounts should be. If it is set to zero, then the scenario will be looking for exactly the same amount exchanged.

4. The price spread between the volume weighted average price (VWAP) of buys and the volume weighted average price of sell (with respect to sells) should not exceed a specified threshold.

$$\text{Price Spread} = |\text{VWAP of Buys} - \text{VWAP of Sells}| \quad \text{(Eqn. 17)}$$

$$\text{Price Spread Percentage} = [\text{Price Spread}/\text{VWAP of Sells}] * 100 \quad \text{(Eqn. 18)}$$

$$\text{Price Spread Percentage} <= \text{Max Price Spread Percentage} \quad \text{(Eqn. 19)}$$

The activity is only considered parking if trading occurred within a single day, but the trades have differing settlement dates. A maximum of one alert per trader and counter party pair per security per detection run is generated. The alert may contain two or more trade records indicative of a Parking case.

Parameters and Highlights

FIG. 24 shows the parameters for the Parking via Settlement Date scenario. FIG. 25 shows the highlights for the Parking via Settlement Date scenario.

Focal Types

Trader

Application Frequency

Daily

Look-back Period 1 day

Wash Trades

Scenario Objective

The term "wash trades" has a variety of interpretations across financial institutions. For purposes of this scenario a wash trade occurs when a trader purchases and sells a security either simultaneously or within a relatively short period of time for no economic benefit. In identifying potential wash trades, only the current day's trading activity in a security is observed to identify a round trip trade (a buy and sell of security with nearly equivalent quantity and price) that results in no net economic benefit to the firm. To qualify as a wash trade, the round trip trade between two parties must occur within a short (configurable) period of time.

Since market participants cannot observe trades in most fixed income securities in real time, this scenario simply identifies individual wash trade pairs. The scenario does not attempt to detect price manipulation in a given security between two counter-parties over a time period (e.g., through a series of buys and sells between two parties that collectively result in a significant price difference between initial and ending trades in the series, but when viewed cumulatively, have provided an insignificant net amount exchanged between the two parties.

Scenario Implementation Approach

The scenario covers product, trade and account types that are defined in the scenario filters section. Also, the scenario coverage may be limited to certain types of trading desks. Most of the filters are tunable and their default values are documented in FIG. 26.

The scenario processes only the final version (within the current detection process) of a trade record. Therefore, the following rules are applied:

All known corrections are applied to a trade record before processing.

Cancelled records are excluded from processing.

As-of trades are included in the processing.

Trades that have a trade date greater than the current processing date ("future as-of trades") are not processed in the current detection cycle. They are included in the later processing cycle when the processing date is equal to the trade date.

The scenario detects wash trade pairs that are executed on the same trade day. Since trades may be reported late (as-ofs) or may be corrected on days different than the original execution day, the scenario may search for wash trade pairs on all trade days that had at least one trade record either reported or corrected on the current processing day.

The scenario does not apply any special rules to the master trades, master trade allocations or the riskless principal trades. The scenario logic is defined by the following conditions:

1. Identify pairs of trades, a buy and a sell, in the same security between the same trader and the same customer account that have occurred within a relatively short (configurable) time window.

> Time difference between Trader Buys from Account A and Trader Sells to Account A<=Max Time Difference or Time difference between Trader Sells to Account A and Trader Buys from Account A<=Max Time Difference    (Eqn. 20)

where the Max Time Difference is a configurable parameter that does not exceed 1 day.

2. Trades that qualify to wash trade pairs should have the principal amount greater or equal to a specified threshold. Very small trades may be excluded. Setting the Min Principal Amount to a small value bypasses the following constraint.

> Principal Amount>=Min Principal Amount    (Eqn. 21)

3. Trades that qualify as wash trade pairs must have the same settlement date. Trades with different settlement dates that are executed on the same day are covered by the Parking via Settlement Date scenario.

4. Next, a spread is computed between the principal amounts of a detected pair of trades (a buy followed by a sell or a sell followed by a buy). The spread is compared to an upper limit threshold. The threshold has a default value of zero because the most interesting behavior occurs when pairs of trades are found with no difference between the principal amounts. However, flexible tuning of the scenario occurs if more relaxed constraints on the principal amount spread are permitted.

> |Principal Amount(buy/sell)−Principal Amount(sell/buy)|<=Max Principal Amount Spread    (Eqn. 22)

5. An alert is generated if at least one pair of trades between the same trader and customer account occurs satisfying the above constraints and if the total number of transactions in a security in a current day between the trader and the customer account is less than a specified threshold. The threshold may be used to eliminate cases of very active trading between two counter parties.

> Trade Count between Trader and Account<=Max Trade Count    (Eqn. 23)

Alerts may be eliminated if the counter parties executed any trades in between the trades identified in a wash trade pair by toggling the Inter Trades Flag. A maximum of one alert per trader, security, customer account and trade date is generated in each detection run. Each alert may contain one or more wash trade pairs.

Parameters and Highlights

FIG. 26 shows the parameters for the Wash Trades scenario. FIG. 27 shows the highlights for the Wash Trades scenario.

Focal Types
Trader
Application Frequency
Daily
Look-back Period
1 day

Excessive Markups and Markdowns

Scenario Objective

This scenario evaluates whether markups and markdowns are reasonable in order to maintain adherence to internal management or regulatory agency established limits. The scenario evaluates traders by their buys and sells, per security, to identify trades with unusually high markups or markdowns.

Scenario Implementation Approach

The scenario may compare pairs of buys and sells within a short time window (e.g., five minutes or less) and/or those that occur over a longer time window (e.g., greater than five minutes). The Coverage parameter selects between short, long or short and long windows. The time window break point value may be set by the Trade Time Difference in Minutes parameter. The scenario may cover Riskless Principal Trades if the Exclude Riskless Principal Transactions parameter is not set. In addition, the first trade of the day may be compared to a derived attribute of the previous trading day if the Exclude First Trade Comparison is disabled. The scenario covers the product, trade and account types defined in the scenario filters section. The scenario coverage may be limited to certain types of trading desks. Most of the filters are tunable and their default values are documented in FIG. 28.

The scenario processes only the final version (within the current detection process) of a trade record. Therefore, the following rules are applied:

All known corrections are applied to a trade record before processing.
Cancelled records are excluded from processing.
As-of trades are included in the processing.
Trades that have a trade date greater than the current processing date ("future as-of trades") are not processed in the current detection cycle. They are included in the later processing cycle when the processing date is equal to the trade date.
The scenario detects trade pairs that are executed on the same trade day. Since trades may be reported late (as-ofs) or may be corrected on days different than the original execution day, the scenario may search for trade pairs on all trade days that had at least one trade record either reported or corrected on the current processing day.

The scenario finds pairs of buys and sells executed by a focal entity (a trader) and then compares trade unit quantities and prices to determine if excessive markups or markdowns were found. The scenario may include finding pairs of buys and sells during regular trading hours, processing the first buy or sell of the day and comparing quantities and prices for a trade pair.

Finding pairs of buys and sells during regular trade hours

A time window is opened with respect to each buy (sell) that closes with the next buy (sell). For example, in looking to identify markups in Table 1, $B_1$ would open a time window, which would compare $B_1$ to $S_2$, $S_3$ and $S_4$. $B_5$ marks the end of the first window, as well as the beginning of the second window, i.e., a comparison of $B_5$ to $S_6$, $S_7$ and $S_8$.

TABLE 1

| Markup |
|---|
| $B_1$ |
| $S_2$ |
| $S_3$ |
| $S_4$ |
| $B_5$ |
| $S_6$ |
| $S_7$ |
| $S_8$ |
| $B_9$ |

This approach requires two logical passes through the data to compare (i) buys and sells from the markup perspective and (ii) sells and buys from the markdown perspective. For example, Table 2 presents a list of sorted trades by a trader for a given security.

TABLE 2

| Trades | Markups | Markdowns |
|---|---|---|
| $B_1$ | $B_1$ | $B_1$ |
| $S_1$ | $S_1$ | $S_1$ |
| $B_2$ | $B_2$ | $B_2$ |
| $B_3$ | $B_3$ | $B_3$ |
| $B_4$ | $B_4$ | $B_4$ |
| $S_2$ | $S_2$ | $S_2$ |
| $S_3$ | $S_3$ | $S_3$ |
| $S_4$ | $S_4$ | $S_4$ |
| $S_5$ | $S_5$ | $S_5$ |
| $B_5$ | $B_5$ | $B_5$ |

To detect excessive markups, the scenario starts with a first buy, $B_1$, and compares it to a first available sell, $S_1$. Similarly, pairs of ($B_4$ and $S_2$), ($B_4$ and $S_3$), ($B_4$ and $S_4$) and ($B_4$ and $S_5$) would be considered for markups. To detect excessive markdowns, the scenario starts with a first sell, $S_1$, and compares it to a first available buy, $B_2$. Similarly, pairs of ($S_1$ and $B_3$), ($S_1$ and $B_4$) and ($S_5$ and $B_5$) would be considered for markdowns.

Processing the first trade of the day

The first trade or set of trades (a string of buys or sells) of the day cannot be compared to any preceding sells or buys for the same day. One of three values may be applied to determine an appropriate reference price. Preferably, if the mark-to-market (MTM) price is available, it may be used as the reference price. Alternatively, the scenario may compare the price of the first trade of the current day to the price of the last known inter-dealer-broker (IDB) trade for the security. If the IDB trade price is not available, the scenario may compare the first trade of the current day to the last firm trade for the security of the previous trading day. If no reference price is found, no comparison is made.

Regardless of the value used, the first trade or trades of the day are evaluated only based on the reference price. Trade unit quantities may not be evaluated when processing these trades. Additionally, first trade analysis may be bypassed.

Comparing quantities and prices for a found pair of trades

The found pair of buy and sell trades is evaluated in three ways:

1. The time difference between trades is used as a distinguishing factor that determines which set of thresholds should be used for evaluating the price spread.

If time difference between found trades<=Trade Time Difference in Minutes, then use the Near Time Spread Percentage parameters to evaluate trade prices, else use the Longer Time Spread Percentage parameters to evaluate trade prices. (Eqn. 24)

2. The trade unit quantities are used to compute the quantity delta between the evaluated trades and the quantity delta percentage. The formula for the quantity delta percentage is:

Quantity Delta Percentage=|Buy Qty−Sell Qty|/Buy Qty if it is a B-S pair (Eqn. 25)

Quantity Delta Percentage=|Sell Qty−Buy Qty|/Sell Qty if it is a S-B pair (Eqn. 26)

In order to effectively compare prices between Buys and Sells of varying quantities, the following threshold values may be established.

If Quantity Delta Percentage<Low Quantity Delta, use Low Price Spread Percentage parameters to evaluate trade prices, If Quantity Delta Percentage>=Low Quantity Delta and Quantity Delta Percentage<Med Quantity Delta, use Med Price Spread Percentage parameters to evaluate trade prices, If Quantity Delta Percentage>=Med Quantity Delta and Quantity Delta Percentage<High Quantity Delta, use High Price Spread Percentage parameters to evaluate trade prices, If Quantity Delta Percentage>=High Quantity Delta, no comparison is made. (Eqn. 27)

3. The trade prices may be used to compute the price spread used to evaluate excessive markups or markdowns.

Price Spread Percentage=(Sell Price−Buy Price)*100/Buy Price (Eqn. 28)

An alert is generated for a trader for a given security if an occurrence of at least one pair of a Buy and Sell results in a price spread percentage that exceeds the appropriate price spread percentage threshold that is set for the appropriate quantity delta category and for the appropriate time window. Table 3 shows an exemplary distribution of threshold values per the quantity category and the price spreads.

TABLE 3

| | | Price Spread Percentage | |
|---|---|---|---|
| Quantity Category | Quantity Delta Percentage | Near Time (<5 min) | Longer Time (>= 5 min) |
| Low Quantity Delta Percentage | QDP < 1% | 1% | 2% |
| Med Quantity Delta Percentage | 1% <= QDP < 20% | 2% | 4% |
| High Quantity Delta Percentage | 20% <= QDP < 200% | 3% | 6% |

Note 1: All numerical values are configurable by product category and type.

Note 2: If the High Quantity Delta Percentage is exceeded, no comparison is made.

EXAMPLE

Buy 10m bonds@102
Sell 9m bonds@105
Price Spread %=(105−102)/102=2.941%
Quantity Delta %=(10000−9000)/10000=10% (implies Med QDP according to Table 3)
Comparable Price Spread %-=2%
Time difference: 3 minutes, 15 seconds
Result: Generate Alert For the first trade of the day, the Longer Time Medium Spread Percentage parameter may be used to compare trade prices.

Parameters and Highlights

FIG. 28 shows the parameters for the Excessive Markups and Markdowns scenario. FIG. 29 shows the highlights for the Excessive Markups and Markdowns scenario.

Focal Types
Trader
Application Frequency
Daily
Look-back Period
1 day

Excessive Markups and Markdowns RPT

Scenario Objective

This scenario evaluates whether markups and markdowns are reasonable in order to maintain adherence to internal management or regulatory agency established limits. The scenario evaluates traders by their buys and sells, per security, to identify trades with unusually high markups or markdowns. This scenario only examines Riskless Principal Trades (RPT).

Scenario Implementation Approach

RPTs generally include a buy and one or more sells or a sell and one or more buys. The set of related trades may be tagged with an RPT identifier. Only buys and sells having the same RPT identifier will be examined. The scenario covers the product, trade and account types defined in the scenario filters section. The scenario coverage may be limited to certain types of trading desks. Most of the filters are tunable and their default values are documented in FIG. 30.

The scenario processes only the final version (within the current detection process) of a trade record. Therefore, the following rules are applied:

All known corrections are applied to a trade record before processing.
Cancelled records are excluded from processing.
As-of trades are included in the processing.
Trades that have a trade date greater than the current processing date ("future as-of trades") are not processed in the current detection cycle. They are included in the later processing cycle when the processing date is equal to the trade date.
The scenario detects trades that are executed on the same trade day. Since trades may be reported late (as-ofs) or may be corrected on days different than the original execution day, the scenario may search for trades on all trade days that had at least one trade record either reported or corrected on the current processing day.

Finding marked buys and sells during regular trade hours

A time window is opened with respect to each buy (sell) that closes with the next buy (sell). For example, in looking to identify markups in Table 4, $B_1$ would open a time window, which would compare $B_1$ to $S_2$, $S_3$ and $S_4$ since all of the sell trades have the same RPT reference number as the buy trade. $S_5$ marks the beginning of the second window, i.e., a comparison of $B_5$ to $S_6$, $S_7$ and $S_8$ since those trades are marked and linked as RPT trades.

TABLE 4

| Markup Markdown | RPT Indicator | RPT Reference Number |
|---|---|---|
| $B_1$ | Y | 2234 |
| $S_2$ | Y | 2234 |
| $S_3$ | Y | 2234 |
| $S_4$ | Y | 2234 |
| $S_5$ | Y | 7866 |
| $B_6$ | Y | 7866 |
| $B_7$ | Y | 7866 |
| $B_8$ | Y | 7866 |

To detect excessive markups, the scenario starts with a first buy, $B_1$, and compares it to a first available sell, $S_2$. Similarly, pairs of ($B_1$ and $S_3$) and ($B_1$ and $S_4$) would be considered for markups. To detect excessive markdowns, the scenario starts with a first sell, $S_5$, and compares it to a first available buy, $B_6$. Similarly, pairs of ($S_5$ and $B_7$) and ($S_5$ and $B_8$) would be considered for markdowns.

Comparing quantities and prices for a found pair of trades

The found pair of buy and sell trades is evaluated in three ways:

1. The trade unit quantities are used to compute the quantity delta between the evaluated trades and the quantity delta percentage. The formula for the quantity delta percentage is:

$$\text{Quantity Delta Percentage} = |\text{Buy Qty} - \text{Sell Qty}|/\text{Buy Qty if it is a B-S pair} \quad \text{(Eqn. 29)}$$

$$\text{Quantity Delta Percentage} = |\text{Sell Qty} - \text{Buy Qty}|/\text{Sell Qty if it is a S-B pair} \quad \text{(Eqn. 30)}$$

In order to effectively compare prices between Buys and Sells of varying quantities, the following threshold values may be established.

If Quantity Delta Percentage<Low Quantity Delta, use Low Price Spread Percentage parameters to evaluate trade prices, If Quantity Delta Percentage>=Low Quantity Delta and Quantity Delta Percentage<Med Quantity Delta, use Med Price Spread Percentage parameters to evaluate trade prices, If Quantity Delta Percentage>=Med Quantity Delta and Quantity Delta Percentage<High Quantity Delta, use High Price Spread Percentage parameters to evaluate trade prices, If Quantity Delta Percentage>=High Quantity Delta, no comparison is made. (Eqn. 31)

2. The trade prices may be used to compute the price spread used to evaluate excessive markups or markdowns.

$$\text{Price Spread Percentage} = (\text{Sell Price} - \text{Buy Price}) * 100 / \text{Buy Price} \quad \text{(Eqn. 32)}$$

An alert is generated for a trader for a given security if an occurrence of at least one pair of a Buy and Sell results in a price spread percentage that exceeds the appropriate price spread percentage threshold that is set for the appropriate quantity delta category and for the appropriate time window. Table 5 shows an exemplary distribution of threshold values per the quantity category and the price spreads.

TABLE 5

| Quantity Category | Quantity Delta Percentage | Price Spread Percentage |
|---|---|---|
| Low Quantity Delta Percentage | QDP < 1% | 0% |
| Med Quantity Delta Percentage | 1% <= QDP 20% | 0% |
| High Quantity Delta Percentage | 20% <= QDP < 200% | 0% |

Note 1: All numerical values are configurable by product category and type.
Note 2: If the High Quantity Delta Percentage is exceeded, no comparison is made.

Parameters and Highlights

FIG. 30 shows the parameters for the Excessive Markups and Markdowns RPT scenario. FIG. 31 shows the highlights for the Excessive Markups and Markdowns RPT scenario.

Focal Types
Trader
Application Frequency
Daily
Look-back Period
1 day

Significant Corrections

Scenario Objective

Traders may cancel or correct trades to take advantage of market movements after the trade, resulting in a potential benefit to themselves or their customers. The Significant Corrections scenario detects and alerts corrections that result in a significant economic advantage or disadvantage to a customer based on changes in market prices or firm trade prices in the same security where market prices are not available.

Scenario Implementation Approach

The scenario detects corrections that take advantage of market movements after the trade that result in a potential benefit to a trader or customer. The scenario may cover the following types of changes to a trade where the economic impact on the customer is quantifiable: quantity changes, price changes, customer account identifier changes, changes in the buy-sell indicator and changes in the security. The scenario covers product, trade and account types that are defined in the scenario filters section. Also, the scenario coverage may be limited to certain types of trading desks. Most of the filters are tunable and their default values are documented in FIG. 32. The scenario does not apply any special rules to the master trades, master trade allocations or the riskless principal trades.

Derivation of the reference price

The trade reference price is intended to capture the "market price" of a traded security at a trade time. The reference price is derived from either market reference trades or firm trades that are close in time. The reference price may come from a trade that is in the future with respect to a trade event if it is closer in time than the most recent past trade. The Same Day Market Reference Price may be defined as the price of the closest market or IDB trade in the same security on the same day. The Same Day Firm Reference Price may be defined as the price of the closest firm trade in the same security on the same day. The Last Mark-to-Market Price may be defined as the last available MTM price set by the firm. The Last IDB Trade Price may be defined as the price of the last available IDB trade in the same security that was not executed on the current trading day. The Last Trade Price is the price of the last firm trade in the same security, excluding IDB trades, that was not executed on the current trading day.

The scenario applies the following algorithm for calculating the reference price. If none of the five possible options for the reference price are within the Reference Price Relevance Time Window, then the reference price is unknown and no alert is generated. Otherwise, if the Same Day Market Reference Price is within a Market Preference Time Window, use the Same Day Market Reference Price. If not, then if the Last Mark-to-Market or Last IDB Trade Price is within the Market Preference Time Window, use the one that is closer in time. If neither is within the Market Preference Time Window, pick the closer in time of the Same Day Market Reference Price and the Same Day Firm Reference Price (if either is known). If neither of those prices is known, pick the closest in time of the Last Mark-to-Market Price, the Last IDB Trade Price and the Last Trade Price.

EXAMPLE

Market Preference Time Window: 48 hours
Reference Price Relevance Time Window: 1 week
Trade event occurs at 10:00 AM, Friday 8/7
Same Day Market Reference Price is unknown. No market or IDB trades on 8/7.
Same Day Firm Reference Price is 100.25 at 9:45 AM, Friday 8/7
Last Mark-to-Market Price is not available.
Last IDB Trade Price is 101 at 11:00 AM, Thursday 8/6
Last Firm Trade Price is 100.5 at 3:00 PM, Thursday 8/6
The Reference Price is 101 from the Last IDB Trade Price because it is within the 48-hour Market Preference Time Window.

The market movement may allow computation of a Change Significance Factor, which measures an economic impact of the change. If multiple changes occur due to a series of corrections or an update to a trade where more than one of the above changes were introduced, an alert may be generated, but the Change Significance Factor may not be calculated. If only a single change occurs, the formula for the Change Significance Factor may be dependent on the change type as specified below. The notation shown in Table 6 is used in calculating the Change Significance Factor.

TABLE 6

| Data Element | Original Trade | Corrected Trade |
|---|---|---|
| Reference Price | R1 | R2 |
| Trade Price | P1 | P2 |
| Trade Quantity | Q1 | Q2 |
| Principal | W1 = P1*Q1 | W2 = P2 * Q2 |

Quantity change

If only the quantity changes, the economic impact is the amount of the quantity change multiplied by the change in reference price. Table 7 lists the possible situations and the impact.

TABLE 7

| Firm Buy/Sell | Ref Price Moves | Quantity | Comment |
|---|---|---|---|
| B | Up | Increased | Customer disadv - The market went up and cust sold more |
| B | Up | Decreased | Firm disadv - Cust decreased sell quant after knowing mkt went up |
| B | Down | Increased | Firm disadv - Cust increased sell quant after knowing mkt went dn |
| B | Down | Decreased | Customer disadv - The market went dn and cust sold less |
| S | Up | Increased | Firm disadv - Cust increased buy quant after knowing mkt went up |
| S | Up | Decreased | Customer disadv - The market went up and cust was given less |
| S | Down | Increased | Customer disadv - The market went dn and cust was given more |
| S | Down | Decreased | Firm disadv - Cust decreased buy quant after knowing mkt went dn |

$$\text{Change Significance Factor} = (R2-R1)*(Q2-Q1) \text{ (if firm bought)} \quad \text{(Eqn. 33)}$$

$$\text{Change Significance Factor} = -(R2-R1)*(Q2-Q1) \text{ (if firm sold)} \quad \text{(Eqn. 34)}$$

If the Change Significance Factor is positive, the customer is disadvantaged; if negative, the firm is disadvantaged. An alert is generated if the absolute value of the Change Significance Factor is greater than a threshold.

Price Change

If only the price changes, then the economic impact is the amount of the price change multiplied by the quantity. Table 8 lists the possible situations and the impact.

TABLE 8

| Firm Buy/Sell | Ref Price Moves | Price | Comment |
|---|---|---|---|
| B | Up | Increased | Firm disadv - bought at higher price |
| B | Up | Decreased | Customer disadv - sold at lower price |
| B | Down | Increased | Firm disadv - bought at higher price |
| B | Down | Decreased | Customer disadv - sold at lower price |
| S | Up | Increased | Customer disadv - bought at higher price |
| S | Up | Decreased | Firm disadv - sold at lower price |
| S | Down | Increased | Customer disadv - bought at higher price |
| S | Down | Decreased | Firm disadv - sold at lower price |

$$\text{Change Significance Factor} = -(P2-P1)*Q1 \text{ (if firm bought)} \quad \text{(Eqn. 35)}$$

$$\text{Change Significance Factor} = (P2-P1)*Q1 \text{ (if firm sold)} \quad \text{(Eqn. 36)}$$

If the Change Significance Factor is positive, the customer is disadvantaged; if negative, the firm is disadvantaged. An alert is generated if the absolute value of the Change Significance Factor is greater than a threshold.

Customer account ID change

If only the customer account identifier changes (from customer account #1 to customer account #2), then one customer is advantaged and a second customer is disadvantaged. Table 9 lists the possible situations and the impact.

TABLE 9

| Firm Buy/Sell | Ref Price Moves | Comment |
|---|---|---|
| B | Up | Customer account #2 disadv - Customer #2 now sold before market increase |
| B | Down | Customer account #1 disadv - Customer #1 now sold after market decrease |
| S | Up | Customer account #1 disadv - Customer #1 now bought after market increase |
| S | Down | Customer account #2 disadv - Customer #2 now bought before market decrease |

$$\text{Change Significance Factor} = W1*(R2-R1)/R1 \text{ (if firm sold)} \quad \text{(Eqn. 37)}$$

$$\text{Change Significance Factor} = -W1*(R2-R1)/R1 \text{ (if firm bought)} \quad \text{(Eqn. 38)}$$

If the Change Significance Factor is positive, customer #1 is disadvantaged; if negative, customer #2 is disadvantaged. An alert is only generated if a change in beneficial ownership occurs and the absolute value of the Change Significance Factor is greater than a threshold.

Buy-Sell indicator change

If only the buy-sell indicator changes, Table 10 lists the possible situations whether the customer or firm is disadvantaged.

TABLE 10

| Firm Buy/Sell Changes | Ref Price Moves | Comment |
|---|---|---|
| B to S | Up | Firm disadvantaged - after price rise, firm buy changed to sell |
| B to S | Down | Customer disadvantaged - after price drop, cust sell changed to buy |
| S to B | Up | Customer disadvantaged - after price rise, cust buy changed to sell |
| S to B | Down | Firm disadvantaged - after price drop, form sell change to buy |

$$\text{Change Significance Factor} = 2*W1*(R2-R1)/R1 \text{ (if firm sold)} \quad \text{(Eqn. 39)}$$

$$\text{Change Significance Factor} = -2*W1*(R2-R1)/R1 \text{ (if firm bought)} \quad \text{(Eqn. 40)}$$

If the Change Significance Factor is positive, the customer is disadvantaged; if negative, the firm is disadvantaged. The factor of two in the Change Significance Factor equations accounts for both the asset appreciation that would have been realized and the loss in asset appreciation that was realized due to the correction. An alert is only generated if a change in beneficial ownership occurs and the absolute value of the Change Significance Factor is greater than a threshold.

Security ID change

If only the security identifier changes (from security #1 to security #2), Table 11 lists the possible situations and whether the firm or the customer is disadvantaged.

TABLE 11

| Firm Buy/Sell | Reference Price Diff | Comment |
|---|---|---|
| B | R2(sec-1) > R2(sec-2) | Firm disadv - firm buy switched to less valuable security |
| B | R2(sec-1) < R2(sec-2) | Customer disadv - cust sell switched to more valuable security |
| S | R2(sec-1) > R2(sec-2) | Customer disadv - cust buy switched to less valuable security |
| S | R2(sec-1) < R2(sec-2) | Firm disadv - firm sell switched to more valuable security |

$$\text{Change Significance Factor} = -W1*[R2(\text{sec}-2)-R2(\text{sec}-1)]/R2(\text{sec}-1) \text{ (if firm sold)} \quad \text{(Eqn. 41)}$$

$$\text{Change Significance Factor} = W1*[R2(\text{sec}-2)-R2(\text{sec}-1)]R2(\text{sec}-1) \text{ (if firm bought)} \quad \text{(Eqn. 42)}$$

If the Change Significance Factor is positive, the customer is disadvantaged; if negative, the firm is disadvantaged. An alert is only generated if a change in beneficial ownership occurs and the absolute value of the Change Significance Factor is greater than a threshold. This table is only applicable if security #1 and security #2 have the same issuing securities. If the two securities have different issuing securities, an alert may not be generated.

Parameters and Highlights

FIG. 32 shows the parameters for the Significant Corrections scenario. FIG. 33 shows the highlights for the Significant Corrections scenario.

Focal Types
Trader
Application Frequency
Daily
Look-back Period
1 month

Cancellation Trend

Scenario Objective

Traders may cancel trades to take advantage of market movements after the trade, resulting in a potential benefit to themselves or to customers. A high percentage of trade cancellations may be indicative of a manipulative trading pattern even if no discernible economic benefit is identified. This scenario detects a trend of outright cancellations by a focal entity. The objective is to detect traders or customer accounts that have a relatively large number of cancelled trades compared to their overall trading volume. Legitimate cancellations due to normal business practices such as mortgage rolls may be excluded from the analysis to reduce false alerts.

Scenario Implementation Approach

The scenario covers product, trade and account types that are defined in the scenario filters section. Also, the scenario coverage may be limited to certain types of trading desks. Most of the filters are tunable and their default values are documented in FIG. 34.

The scenario processes only the final version (within the current detection process) of a trade record. Therefore, the following rules are applied:

All known corrections are applied to a trade record before processing.

As-of trades are included in the processing.

Trades that have a trade date greater than the current processing date ("future as-of trades") are processed in the current detection cycle. They are included because they should have a valid settlement date that can be used in the scenario logic.

The scenario logic covers trades that have been either loaded or updated within the scenario look-back period.

To avoid redundant alerts, the detection process only identifies cases where at least one applicable cancellation has occurred since the last time the scenario was run.

The scenario does not apply any special rules to riskless principal trades. The scenario captures a trend of outright cancellations exhibited by a focal entity. The criterion for the outright cancellation may include that it is for a trade cancellation that is not followed by any corrections as of the latest recorded data update. Only trades for "significant" amounts may be examined and evaluated. One alert is generated per trader or customer account displaying all trades showing the pattern of outright cancellations when:

$$\text{Number of cancellations} >= \text{Min Number of Cancellations and} \quad \text{(Eqn. 43)}$$

$$\text{Number of cancellations/Total distinct trades} >= \text{Min Percent of Cancellations} \quad \text{(Eqn. 44)}$$

Parameters and Highlights

FIG. 34 shows the parameters for the Cancellation Trend scenario. FIG. 35 shows the highlights for the Cancellation Trend scenario.

Focal Types

Trader/Account

Application Frequency

Weekly

Look-back Period 2 weeks

Correction Trend

Scenario Objective

Traders may cancel or correct trades to take advantage of market movements after the trade, resulting in a potential benefit to themselves or to customers. A high percentage of trade cancellations or corrections may be indicative of a manipulative trading pattern even if no discernible economic benefit is identified. This scenario detects a pattern of frequent trade corrections by a focal entity. No apparent economic advantage or disadvantage to the customer (e.g., changes to the trader or trading account) is required for alert generation. The objective is to detect traders or customer accounts that have a relatively large number of corrected trades compared to their overall trading volume.

Scenario Implementation Approach

The scenario covers product, trade and account types that are defined in the scenario filters section. Also, the scenario coverage may be limited to certain types of trading desks. Most of the filters are tunable and their default values are documented in FIG. 36.

The scenario processes only the final version (within the current detection process) of a trade record. Therefore, the following rules are applied:

All known corrections are applied to a trade record before processing.

As-of trades are included in the processing.

Trades that have a trade date greater than the current processing date ("future as-of trades") are processed in the current detection cycle. They are included because they should have a valid settlement date that can be used in the scenario logic.

The scenario logic covers trades that have been either loaded or updated within the scenario look-back period.

To avoid redundant alerts, the detection process only identifies cases where at least one applicable cancellation has occurred since the last time the scenario was run.

The scenario does not apply any special rules to riskless principal trades. The scenario captures a trend of outright cancellations exhibited by a focal entity. The criterion for the outright cancellation may include that it is for a trade cancellation that is not followed by any corrections as of the latest recorded data update. Only trades for "significant" amounts may be examined and evaluated. One alert is generated per trader or customer account displaying all trades showing the pattern of outright cancellations when:

$$\text{Number of corrections} >= \text{Min Number of Corrections and} \quad \text{(Eqn. 45)}$$

$$\text{Number of corrections/Total distinct trades} >= \text{Min Percent of Corrections} \quad \text{(Eqn. 46)}$$

Parameters and Highlights

FIG. 36 shows the parameters for the Correction Trend scenario. FIG. 37 shows the highlights for the Correction Trend scenario.

Focal Types

Trader/Account

Application Frequency

Weekly

Look-back Period 2 weeks

Regulation T Extended Settlements

Scenario Objective

The scenario captures trades that are in violation of the Regulation T requirements to settle trades within five business days. Both the areas covered by the settlement requirements and the maximum settlement duration may be implemented as adjustable parameters so that the scenario may be applied wherever settlement regulations are in effect. The objective of the scenario is to ensure that an immediate action is taken when an attempt to violate a settlement duration regulation is detected.

Scenario Implementation Approach

The scenario covers product, trade and account types that are defined in the scenario filters section. Also, the scenario coverage may be limited to certain types of trading desks. Most of the filters are tunable and their default values are documented in FIG. 38.

The scenario processes only the final version (within the current detection process) of a trade record. Therefore, the following rules are applied:

All known corrections are applied to a trade record before processing.

Cancelled records are excluded from the processing.

As-of trades are included in the processing.

Trades that have a trade date greater than the current processing date ("future as-of trades") are processed in the current detection cycle. They are included because they should have a valid settlement date that can be used in the scenario logic.

Trades are considered for alerts whenever they are loaded into the system or uploaded due to a correction event. A correction may trigger a second alert involving the same trade, if the settlement period still exceeds the allowable duration.

The scenario does not apply any special rules to riskless principal trades. The scenario examines trades executed by the focal entity and identifies when the issuing currency for the security is eligible for consideration (as specified by an Included Currency Codes parameter), the executing desk of the trader is eligible for consideration (as indicated by an Desk Location Country Codes parameter), the issuing country code of the security is eligible for consideration (as indicated by an Issuing Country Code parameter), the trade has not been granted an exception from the standard settlement requirements, and the settlement period for the trade exceeds the allowable duration specified by a Reg T Days parameter. Preferably, the default value of Reg T Days may be set to 5 days to follow the US T+5 regulation. If the above conditions are met, an alert may be generated. One alert per trader or customer account per day may be generated displaying all trades that exhibited extended settlements that avoided Regulation T. Preferably, the default value of Reg T Days may be set to 5 days to follow the US T+5 regulation.

Parameters and Highlights

FIG. 38 shows the parameters for the Regulation T Extended Settlements scenario. FIG. 39 shows the highlights for the Regulation T Extended Settlements scenario.

Focal Types
Trader/Account
Application Frequency
Daily
Look-back Period
1 day

Trend of Shortened or Extended Settlements

Scenario Objective

The scenario detects a pattern of extended or shortened settlements by a trader or a customer account. The objective is to detect traders or customer accounts that have a relatively large number of shortened or extended settlement dates compared to their overall trading volume. The trend of shortened or extended settlements may have either a Trader or an Account focus, and may be implemented as two scenarios that have the same logic but different focal types.

Scenario Implementation Approach

The scenario covers product, trade and account types that are defined in the scenario filters section. Also, the scenario coverage may be limited to certain types of trading desks. Most of the filters are tunable and their default values are documented in FIG. 40.

The scenario processes only the final version (within the current detection process) of a trade record. Therefore, the following rules are applied:

All known corrections are applied to a trade record before processing.
Cancelled records are excluded from the processing.
As-of trades are included in the processing.
Trades that have a trade date greater than the current processing date ("future as-of trades") are processed in the current detection cycle. They are included because they should have a valid settlement date that can be used in the scenario logic.
The scenario logic covers trades that have been either loaded or corrected since the last time the scenario was run (the scenario frequency period).

The scenario does not apply any special rules to riskless principal trades. The regular settlement duration that is maintained on a security master record is used as a basis to determine a shortened or extended settlement. The scenario identifies cases in which there is a frequent occurrence of shortened or extended settlements by a trader or a customer account. The detection process computes the number of trades with shortened or extended settlements for each trader or focal account for the look-back period. An alert is generated in cases where:

Number of Trades with Shortened/Extended Settlement >=Min Number of S/E Settlements and (Eqn. 43)

Number of Trades with Shortened/Extended Settlements/Total Trades >=Min Percentage of S/E Settlements (Eqn. 44)

To avoid redundant alerts, the detection process only identifies cases where at least one non-standard settlement has occurred since the last time the scenario was run. One alert per trader or customer account may be generated displaying the trades demonstrating the pattern of shortened or extended settlements.

Parameters and Highlights

FIG. 40 shows the parameters for the Trend of Shortened or Extended Settlements scenario. FIG. 41 shows the highlights for the Trend of Shortened or Extended Settlements scenario.

Focal Types
Trader/Account
Application Frequency
Weekly
Look-back Period
2 weeks

What is claimed is:

1. A system for detecting a trading compliance violation for a fixed income security, the system comprising:
a processor; and
a processor readable storage medium in communication with the processor,
wherein the processor readable storage medium contains one or more programming instructions for:
receiving data associated with a plurality of fixed income security transactions involving one or more fixed income securities, wherein the data comprises data representative of a plurality of events and a plurality of entities, wherein the plurality of events and the plurality of entities are not predetermined to be related;
identifying a behavior of interest comprising one or more sequence detection requirements that is indicative of a trading compliance violation by determining, for one or more of the fixed income securities, whether a price spread between a volume weighted average price of buys associated with the fixed income security on a current day and a volume weighted average price of sells associated with the fixed income security on the current day exceeds a threshold value;
determining, by a computing device, whether one or more groups of the transactions and the entities collectively satisfy at least one of the one or more sequence detection requirements;
if so, assigning a corresponding priority to each group; and
generating an alert comprising one or more of the groups and the corresponding priority.

2. The system of claim 1, wherein the one or more programming instructions for determining whether one or more groups of the transactions and the entities collectively satisfy at least one of the sequence detection requirements comprise one or more programming instructions for:
    performing sequence matching to identify one or more sequences in the plurality of events; and
    relating the identified sequences to the plurality of entities.

3. The system of claim 1, wherein the one or more programming instructions for determining whether one or more groups of the transactions and the entitles collectively satisfy at least one of the sequence detection requirements comprise one or more programming instructions for performing link analysis and sequence matching to establish relationships between the plurality of events and the plurality of entities.

4. The system of claim 1, wherein the one or more programming instructions for generating an alert comprises one or more programming instructions for generating an alert comprising:
    a focus;
    one or more highlights of the events and entities associated with the identified combinations; and
    one or more parameters that may be varied by a user to set a relationship match and confirm whether the one or more identified behaviors of interest are present.

5. The system of claim 1, wherein the one or more programming instructions for assigning a corresponding priority to each group comprise one or more programming instructions for prioritizing the groups based on user defined logic.

6. The system of claim 1, wherein the one or more programming instructions for generating an alert comprises one or more programming instructions for;
    sending a user a data summary; and
    providing the user with one or more dynamic links to information associated with the alert.

7. The system of claim 1, wherein the one or more programming instructions for generating an alert comprises one or more programming instructions for providing one or more alert visualizations associated with identified events and the identified entities to a user.

8. The system of claim 1, wherein the one or more programming instructions for generating an alert comprises one or more programming instructions for providing history information associated with one or more of the identified events and the identified entities to a user.

9. The system of claim 1, wherein the one or more programming instructions for identifying a behavior of interest that is indicative of a trading compliance violation comprise one or more programming instructions for identifying a behavior of interest that comprises executing a pre-arranged sale and buyback of a fixed income security, wherein the sale and the buyback occur on the same trading day, wherein the sale and the buyback are associated with different settlement dates.

10. The system of claim 9, wherein the one or more programming instructions for identifying a behavior of interest comprise one or more programming instructions for detecting whether a price associated with the sale and a price associated the buyback are outside of a market price range for the trading day.

11. The system of claim 1, wherein the one or more programming instructions for identifying a behavior of interest that is indicative of a trading compliance violation comprise one or more programming instructions for identifying a behavior of interest that comprises purchasing and selling a fixed income security within a specified time period for no economic benefit.

12. The system of claim 1, wherein the one or more programming instructions for identifying a behavior of interest that is indicative of a trading compliance violation comprise one or more programming instructions for identifying a behavior of interest that comprises trading a fixed income security with a price markup that exceeds a predetermined threshold value.

13. The system of claim 1, wherein the one or more programming instructions for identifying a behavior of interest that is indicative of a trading compliance violation comprise one or more programming instructions for trading a fixed income security with a price markdown that exceeds a predetermined threshold value.

14. The system of claim 1, wherein the one or more programming instructions for identifying a behavior of interest that is indicative of a trading compliance violation comprise one or more programming instructions for detecting a correction to a fixed income security trade that takes advantage of market movements after the trade, wherein the correction comprises one or more of the following:
    a change in a price of the trade;
    a change in a quantity of the trade;
    a replacement of a first customer account identification with a second customer account identification for the trade;
    a change in a buy-sell indicator for the trade; and
    a replacement of a first security with a second security in the trade.

15. The system of claim 1, wherein the one or more programming instructions for identifying a behavior of interest that is indicative of a trading compliance violation comprise one or more programming instructions for shortening the settlement of one or more fixed income security trades beyond a predetermined limit.

16. The system of claim 1, wherein the one or more programming instructions for identifying a behavior of interest that is indicative of a trading compliance violation comprise one or more programming instructions for determining one or more amounts exchanged between two parties for the fixed income security on one or more previous days during a look back period.

17. The system of claim 1, wherein the one or more programming instructions for identifying a behavior of interest that is indicative of a trading compliance violation comprise one or more programming instructions for extending the settlement of one or more fixed income security trades beyond a predetermined limit.

18. The system of claim 1, wherein the one or more programming instructions for identifying a behavior of interest that is indicative of a trading compliance violation comprise one or more programming instructions for identifying that one or more of the following conditions constitute a behavior of interest:
    a net amount exchanged between two parties meets or exceeds a first threshold value; and
    a number of transactions between two parties for the fixed income security does not exceed a second threshold value.

19. The system of claim 1, wherein the one or more programming instructions for identifying a behavior of interest that is indicative of a trading compliance violation comprise one or more programming instructions for:
    determining whether a total number of transactions executed during look-back period between two parties for the fixed income security exceeds a threshold value, wherein the look-back period does not include a current day; and
    if so, determining that the behavior of interest exists.

20. The system of claim 1, wherein the one or more programming instructions for identifying a behavior of interest that is indicative of a trading compliance violation comprise one or more programming instructions for detecting a trend of shortened settlement periods of one or more fixed income security trades beyond a predetermined range.

21. The system of claim 1, wherein the one or more programming instructions for identifying a behavior of interest that is indicative of a trading compliance violation comprise one or more programming instructions for detecting a trend of extended settlement periods of one or more fixed income security trades beyond a predetermined range.

22. The system of claim 1, wherein the one or more programming instructions for identifying a behavior of interest that is indicative of a trading compliance violation comprise one or more programming instructions for purchasing and selling a fixed income security within a specified time period for at least one of no economic benefit, a price markup that exceeds a first threshold value and a price markdown that exceeds a second threshold value.

23. The system of claim 1, wherein the one or more programming instructions for determining whether one or more groups of the transactions and the entities collectively satisfy at least one of the sequence detection requirements comprise one or more programming instructions for:
  determining whether a net amount exchanged in all transactions involving a fixed income security during a time period between two parties meets or exceeds a threshold value;
  if so, determining whether a total number of transactions executed on a current day between the two parties involving the fixed income security does not exceed a threshold value;
  if so, determining whether a net amount exchanged between the two parties on the current day and a net amount exchanged between the two parties during a look-back period indicates a flow in opposite directions; and
  if so,
    determining a delta between the net amount exchanged between the two parties on the current day and the net amount exchanged between the two parties during the look-back period, and
    if the delta has a value that exceeds a value corresponding to a threshold percentage of the net amount exchanged between the two parties on the current day, determining that the behavior of interest exists.

24. A system for detecting a trading compliance violation for a fixed income security, the system comprising:
  a processor; and
  a processor readable storage medium in communication with the processor,
  wherein the processor readable storage medium contains one or more programming instructions for:
    receiving data associated with a plurality of fixed income security transactions,
  wherein the data comprises data representative of a plurality of events and a plurality of entities, wherein the plurality of events and the plurality of entities are not predetermined to be related,
    identifying a behavior of interest that is indicative of a trading compliance violation wherein the behavior of interest comprises:
    data indicative of one or more of the following:
    purchasing and selling a fixed income security for at least one of no economic benefit, a price markup that exceeds a first threshold value and a price markdown that exceeds a second threshold value,
    data indicative of whether a total number of transactions exceed during a look-back period between two parties for the fixed income security exceeds a third threshold value, wherein the look-back period does not include a current day, and
    one or more sequence detection requirements,
    determining, by a computing device, whether one or more groups of the transactions and the entities collectively satisfy at least one of the sequence detection requirements,
    if so, assigning a corresponding priority to each group, and
    generating an alert comprising one or more of the groups and the corresponding priority.

25. A system for detecting a trading compliance violation for a fixed income security, the system comprising:
  a processor; and
  a processor readable storage medium in communication with the processor,
  wherein the processor readable storage medium contains one or more programming instructions for:
    receiving data associated with a plurality of fixed income security transactions,
  wherein the data comprises data representative of a plurality of events and a plurality of entities, wherein the plurality of events and the plurality of entities are not predetermined to be related,
    identifying a behavior of interest that is indicative of a trading compliance violation wherein the behavior of interest comprises:
    data indicative of executing a pre-arranged sale and buyback of a fixed income security, wherein the sale and the buyback occur on the same trading day, wherein the sale and the buyback are associated with different settlement dates,
    data indicative of one or more of the following: purchasing and selling the fixed income security for at least one of no economic benefit, a price markup that exceeds a first threshold value and a price markdown that exceeds a second threshold value, and
    one or more sequence detection requirements,
    determining, by a computing device, whether one or more groups of the transactions and the entities collectively satisfy at least one of the sequence detection requirements,
  if so, assigning a corresponding priority to each group, and
  generating an alert comprising one or more of the groups and the corresponding priority. data indicative of one or more of the following purchasing and selling a fixed income security, within a specified time period for at least one of no economic benefits a price markup that exceeds a first threshold value and a price markdown that exceeds a second threshold value, and one or more sequence detection requirements determining by a computing device, whether one or more groups of the transactions and the entities collectively. satisfy at least one of the sequence detection. requirements. if so, assigning a corresponding priority to each group, and generating alert comprising one or more of the groups and the corresponding priority.

26. A system for detecting a trading compliance violation for a fixed income security, the system comprising:
  a processor; and
  a processor readable storage medium in communication with the processor, wherein the processor readable storage medium contains one or more programming instructions for:

receiving data associated with a plurality of fixed income security transactions, wherein the data comprises data representative of a plurality of events and a plurality of entities, wherein the plurality of events and the plurality of entities are not predetermined to be related, identifying a behavior of interest that is indicative of a trading compliance violation wherein the behavior of interest comprises one or more sequence detection requirements, determining, by a computing device. whether one or more groups of the transactions and the entities collectively satisfy at least one of the sequence detection requirements by:

determining whether a net amount exchanged in all transactions involving a fixed income security during a time period between two parties meets or exceeds a threshold value, if so, determining whether a total number of transactions executed on a current day between the two parties involving the fixed income security does not exceed a threshold value, if so, determining whether a net amount exchanged between the two parties of the current day and a net amount exchanged between the two parties during a look-back period indicates a flow in opposite directions, and if so,
  determining a delta between the net amount exchanged between the two parties on the current day and the net amount exchanged between the two parties during the look-back period, and
  if the delta has a value that exceeds a value corresponding to a threshold percentage of the net amount exchanged between the two parties on the current day, determining that the behavior of interest exists, if so, assigning a corresponding priority to each group, and generating an alert comprising one of more of the groups and the corresponding priority.

* * * * *